US012279178B2

United States Patent
Chen et al.

(10) Patent No.: US 12,279,178 B2
(45) Date of Patent: Apr. 15, 2025

(54) AUTOMATED CELL AZIMUTH ESTIMATION AND VALIDATION

(71) Applicant: AT&T Intellectual Property I, L.P., Atlanta, GA (US)

(72) Inventors: Jie Chen, Watchung, NJ (US); Wenjie Zhao, Princeton, NJ (US); Ye Ge, Holmdel, NJ (US); Abraham George, Litchfield, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 874 days.

(21) Appl. No.: 17/322,520

(22) Filed: May 17, 2021

(65) Prior Publication Data
US 2022/0369067 A1 Nov. 17, 2022

(51) Int. Cl.
*H04W 4/029* (2018.01)
*H04W 16/28* (2009.01)

(52) U.S. Cl.
CPC .......... *H04W 4/029* (2018.02); *H04W 16/28* (2013.01)

(58) Field of Classification Search
CPC ... H04W 64/006; H04W 4/023; H04W 24/02; H04W 24/08; H04W 52/0206
USPC ...................................................... 455/422.1
See application file for complete search history.

(56) References Cited

U.S. PATENT DOCUMENTS

| | | | |
|---|---|---|---|
| 9,078,229 B1 | 7/2015 | Vannucci et al. | |
| 9,144,055 B2 | 9/2015 | Sun et al. | |
| 10,082,556 B1 * | 9/2018 | Hopcraft | H04W 64/006 |
| 10,819,434 B1 * | 10/2020 | Rahman | H04L 67/10 |
| 10,827,378 B2 * | 11/2020 | Sawai | H04W 52/0206 |
| 10,848,988 B1 * | 11/2020 | Rahman | H04W 24/08 |
| 10,904,851 B1 | 1/2021 | Henry et al. | |
| 11,460,728 B2 * | 10/2022 | Sakurai | G02F 1/133553 |
| 11,503,480 B2 * | 11/2022 | Rahman | H04W 24/08 |
| 11,570,648 B2 * | 1/2023 | Ratnam | H04B 17/373 |
| 2003/0125046 A1 | 7/2003 | Riley et al. | |
| 2010/0323723 A1 | 12/2010 | Gerstenberger et al. | |

(Continued)

OTHER PUBLICATIONS

Wang, Hai • Xie, Su • Li, Ke • Ahmad, M. Omair, Sensors (Basel, Switzerland), Big Data-Driven Cellular Information Detection and Coverage Identification, Feb. 22, 2019 (Year: 2019).*

(Continued)

*Primary Examiner* — William D Cumming
(74) *Attorney, Agent, or Firm* — Guntin & Gust, PLC; Douglas Schnabel

(57) ABSTRACT

Locations and azimuths of cells of a communication network can be estimated, determined, and validated. Cell attribute management component (CAMC) can estimate, determine, and/or validate cell locations based on analysis of timing advance (TA) measurement data and/or location data associated with devices associated with base stations associated with cells. CAMC can estimate azimuth of a cell associated with a base station based on analysis of a validated cell location of the cell and location data associated with devices associated with the cell. CAMC can determine whether a recorded azimuth of the cell is validated based on analysis of the estimated azimuth of the cell and the recorded azimuth of the cell. CAMC can tag the recorded azimuth of the cell as validated if applicable azimuth accuracy criteria is met, inaccurate if applicable azimuth criteria is not met, or omni if the cell is an omni cell.

20 Claims, 26 Drawing Sheets

(56) References Cited

U.S. PATENT DOCUMENTS

| | | |
|---|---|---|
| 2010/0331013 A1 | 12/2010 | Zhang |
| 2014/0162682 A1* | 6/2014 | Tafreshi ................ H04W 24/02 |
| | | 455/422.1 |
| 2014/0243013 A1 | 8/2014 | Liu et al. |
| 2016/0170004 A1 | 6/2016 | Kim et al. |
| 2019/0250241 A1 | 8/2019 | Alawieh |
| 2020/0328812 A1* | 10/2020 | Rahman ............. H04L 41/5003 |
| 2020/0374712 A1* | 11/2020 | Rahman ............. H04L 41/0893 |
| 2021/0067985 A1* | 3/2021 | Rahman ............. H04L 41/0893 |
| 2021/0389625 A1* | 12/2021 | Sakurai ............ G02F 1/133512 |
| 2022/0369067 A1* | 11/2022 | Chen .................... H04W 4/023 |
| 2023/0054262 A1* | 2/2023 | Chen .................... H04B 17/345 |
| 2023/0292146 A1* | 9/2023 | James ................ H04W 64/003 |

OTHER PUBLICATIONS

Notice of Allowance received for U.S. Appl. No. 16/887,431 dated Nov. 26, 2021, 37 pages.

Non Final office action received for U.S. Appl. No. 16/887,431 dated Jun. 10, 2021, 33 pages.

\* cited by examiner

AUTOMATED CELL AZIMUTH ESTIMATION AND VALIDATION

TECHNICAL FIELD

This disclosure relates generally to electronic communications, e.g., to automated cell azimuth estimation and validation.

BACKGROUND

A node, such as a base station, of a communication network can be associated with one or more cells. For instance, a node can be associated with a single cell or multiple cells can be co-located with a same node at a given location. Base stations and cells associated with base stations can be added to communication networks, removed from communication networks, or moved to different locations within communication networks on a regular basis. It is expected that thousands of new cells will be added to the communication networks each year.

The above-described description is merely intended to provide a contextual overview regarding electronic communications, and is not intended to be exhaustive.

DETAILED DESCRIPTION

Figure 1:
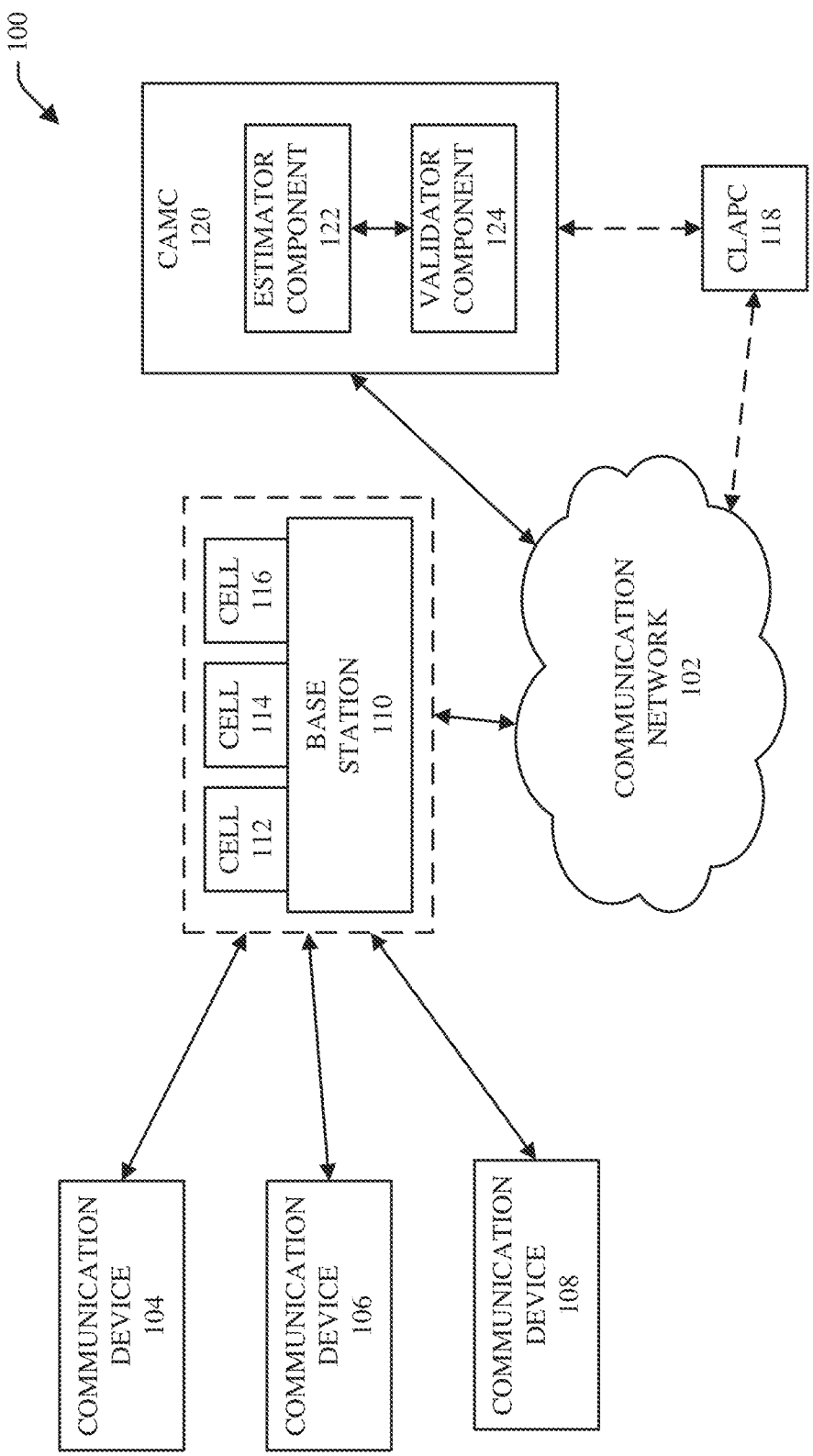
FIG. 1 illustrates a block diagram of an example system that can estimate a location of a node to facilitate estimating, determining, and/or validating a location and azimuth of a cell associated with the node, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to estimating azimuths of cells and validating cell azimuths (e.g., estimated cell azimuths and/or recorded cell azimuths from data sources) of cells of a communication network. The disclosed subject matter can enhance (e.g., improve or optimize) the accuracy of cell azimuth information for service providers, which can enhance design and efficiency of the communication network, enhance performance of the communication network, enhance the user experience with regard to communications via the communication network, reduced waste in capital investment (e.g., financial costs) and resource usage, enhance E911 operations (e.g., enhance the accuracy of determining locations of mobile communication devices in response to mobility E911 calls).

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can multiply with a factor of $N_t$ over single antenna systems in a rich scattering environment.

Nodes, such as base stations, can be associated with one or more cells that can be distributed at various locations in a communication network. A node can be associated with a single cell, or multiple cells can be co-located with a same node at a given location. Base stations and cells associated with base stations are added to or removed from communication networks, or are moved to different locations within communication networks, on a regular basis. It is expected that thousands of new cell sites will be added to the communication networks each year.

It can be desirable to know accurate locations and azimuths of cells for a variety of reasons. The locations and azimuths of cells can be used to facilitate determining locations of communication devices (e.g., cell or smart phones) associated with cells, for example, when it is desired to know the locations of such communication devices for emergency purposes, such as during E911 dispatch operations, or for other desired reasons. As another example, it can be desirable to accurately know locations and azimuths of cells for radio access network (RAN) planning, network optimization, and/or ongoing operations of communication networks.

However, cell location information and cell azimuth information often can be inaccurate due to erroneous information or incomplete information input to a cell location and azimuth database when people manually input information into the cell location and azimuth database, inaccurate or incomplete information received from certain cells that can self report their locations or azimuths, or other sources of error in cell locations and azimuths. Inaccurate cell locations and azimuths can result in undesirable problems with regard to, for example, E911 dispatch operations and RAN planning.

For instance, with regard to E911 calls, while mobile communication devices often can provide location information (e.g., GPS location information) regarding their locations, sometimes such location information of mobile communication devices may not be available. At least in such instances, the communication network, via the cells of the network, can be utilized to facilitate determining locations of mobile communication devices. During an E911 dispatch operation, a mobility E911 call from a mobile communication device can route to a serving public safety answering point (PSAP) based on the location and azimuth of the cell site that handles the E911 call. For example, for Phase 2 capable PSAPs, the evolved serving mobile location center (E-SMLC) can return a calculated location for the E911 caller. Inaccuracies in either the PSAP call routing (e.g., due to error or other inaccuracy in the location or azimuth of the cell that handles the E911 call) or reported caller location can cause an undesirable delay in providing desired emergency assistance from emergency assistance personnel (e.g., law enforcement, medical personnel (e.g., emergency medical services (EMS)), or other emergency personnel).

As another example, with regard to RAN planning, locations of existing cell sites, along with demand forecast and radio frequency (RF) propagation, can be key inputs for the RAN capacity planning process. Errors or other inaccuracies in cell site locations or azimuths can lead to erroneous and inefficient RAN planning and design of the communication network, which can result in wasted capital investment in the communication network and/or undesirable (e.g., inefficient, suboptimal, and/or poor) communication network performance.

As new communication network technology (e.g., 5G NR millimeter waves (5G NR mmWave) or other new communication network technology) is deployed in the communication network, thousands of new cells at new cell locations (e.g., cell sites) are expected to be added to the communication network each year, for the foreseeable future. The validation of the accuracy of locations and azimuths of cells can be a significant problem for which it can be desirable for a network operator or provider to address to facilitate improving E911 dispatch operations, RAN planning, and communication network performance.

Traditional techniques for determining and validating cell locations and azimuths can be undesirably inefficient, inaccurate or insufficiently accurate, or otherwise undesirable. For instance, manual investigation can be one traditional method to determine, correct errors in, or verify cell locations and azimuths. Manual investigation can involve dispatching a person (e.g., an engineer or technician) to visit a site of a cell to determine or verify the location and azimuth of the cell site. This can be inefficient and/or can lead to inaccuracies with regard to cell locations and azimuths because it can be undesirably labor intensive to have such person determine and verify the cell location and azimuth, since the person will have to take the time to travel to each of many cell locations to determine and verify the respective locations and azimuths of those cell locations, it can be undesirably inaccurate because such person can inadvertently input erroneous or incomplete information to the cell location and azimuth database, and/or it can be difficult to scale as there can be a very large number of cells that are to have their locations and azimuths determined and verified.

Another traditional technique for determining and validating cell locations or azimuths can be image-based validation. Image-based validation can involve attempting to check cell site locations or azimuths via satellite or street view images (e.g., geographical map images) of objects, such as base stations associated with cells. The image-based validation often can be conducted by humans, which can be undesirably labor intensive and/or can result in inaccurate results, or can utilize artificial intelligence (AI) based image recognition. Overall, the image-based validation method can be highly dependent on the image quality and reliability of the images used to determine and validate the locations or azimuths of the cells. For example, satellite or street view images usually may be refreshed once every several months or years. As a result, new cell sites added to the communication network in the meantime often may not be captured in the satellite or street view images. Further, the image-based validation method often can only provide insufficient or incomplete information regarding the cells. For instance, from a satellite or street view image, the image-based validation method typically only can tell if there is a cell at a location in the image, but cannot confirm other cell attributes, such as, for example, RF band and an equipment vendor, of the cell. Further, with regard to azimuth, it can be challenging to determine the exact azimuth of a specific cell since a single cell site often can contain multiple cells that can be facing in different directions, and it can be difficult to connect each image to a cell name in the database. In addition, AI-based image recognition can utilize a significant and undesirable amount of resources to procure the images and train or implement the AI image recognition models.

Still another traditional technique for determining and validating cell locations or azimuths can involve utilizing inference based on drive tests. There have been attempts to utilize drive test data to approximately estimate cell locations. However, given the undesirably limited measurement and relatively large time intervals (e.g., several months or quarters) between subsequent drive tests, this drive-test inference technique can be undesirable (e.g., inadequate, inefficient, or inaccurate), as this technique may not be able to capture, or at least adequately capture, deployed cell sites, including newly deployed cell sites. For example, the estimation errors for cell locations can be on the order of 300 meters, which can be undesirable (e.g., unsatisfactory or unsuitable) for the purpose of cell location accuracy and validation.

To that end, techniques for estimating, determining, and validating locations and azimuths of cells of a communication network are presented. A cell attribute management component (CAMC) can analyze timing advance (TA) measurement data and/or location data (e.g., global positioning system (GPS) location data, assisted or augmented GPS (AGPS) location data, and/or Internet of things (IoT) geolocation data) associated with communication devices that can be associated with a base station, which can comprise or be associated with one or more cells (e.g., respective communication devices can be associated with (e.g., served by, communicatively connected to, observed by, or otherwise associated with respective cells). The CAMC can include an estimator component that can estimate a location of the base station (e.g., a network node associated with the one or more cells), based at least in part on the respective TA measurement data and/or the respective location data associated with the respective communication devices, in accordance with defined cell attribute management criteria. In some embodiments, the estimator component can utilize machine learning (ML) techniques and algorithms to facilitate estimating the location of the base station.

In some embodiments, the estimator component can determine whether there is a sufficient number (e.g., a defined threshold number) of communications at or within a defined threshold distance of the base station, based at least in part on the respective TA measurement data associated with the respective communication devices. If the estimator component determines that there is a sufficient number of communications at or within the defined threshold distance of the base station, the estimator component can determine that a smallTA algorithm can be utilized to estimate the location of the base station, in accordance with the defined cell attribute management criteria. In such instance, employing the smallTA algorithm, the estimator component can estimate the location of the base station based at least in part on (e.g., as a function of) the location data (e.g., AGPS or GPS location data) of those communication devices that are determined to be at or within the defined threshold distance of the base station. For instance, the estimator component can estimate the location of the base station based at least in part on the median of the communication device locations as determined from the location data of those communication devices.

In certain embodiments, if, instead, the estimator component determines that there is not a sufficient number of communications at or within the defined threshold distance of the base station, the estimator component can determine that a linear regression algorithm can be utilized to estimate the location of the base station. The estimator component can apply the linear regression algorithm, with respect to respective pairs of locations of communication devices, and can estimate the location of the base station based at least in part on the respective TA measurement data and/or the respective location data associated with the respective communication devices, and the application of the linear regression algorithm, in accordance with the defined cell attribute management criteria. The CAMC can estimate the location of a cell associated with the base station based at least in part on the estimated location of the base station (e.g., as determined using the smallTA algorithm or the linear regression algorithm). For instance, the CAMC can estimate the location of the cell as being the estimated location of the associated base station.

The CAMC also can include a validator component that, for each cell, can validate a potential location of a cell (e.g., the estimated cell location, or a recorded cell location of the cell, as obtained from a data source and recorded in a cell location pool of a cell location and azimuth pool component (CLAPC)) based at least in part on an analysis of the estimated cell location, the recorded cell location, and/or the TA measurement data and/or location data associated with the communication devices (e.g., communication devices associated with the cell), in accordance with the defined cell attribute management criteria. In accordance with various embodiments, the validator component can utilize a validation algorithm (e.g., distance difference validation algorithm) and/or a set of validation rules to facilitate validating the potential cell location, including determining an accuracy level that can indicate how accurate the potential cell location is. Based at least in part on the results of the validation, the CAMC can tag the potential cell location as being accurate, acceptable, bad, or uncertain, for example.

If the CAMC determines that a potential cell location (e.g., estimated cell location, or recorded cell location) of a cell is accurate, the CAMC can lock the cell location with a "good" or "accurate" tag to facilitate preventing undesired (e.g., unwanted, inadvertent, or unexpected) changes to the cell location, and can store the cell location information for the cell (e.g., updated cell location information), including the lock and tag information, in the cell location pool of the CLAPC. If the CAMC determines that a potential cell location is bad (e.g., unacceptably inaccurate), the CAMC can tag the potential cell location as being bad, can store the cell location information for the cell (e.g., updated cell location information), including the bad tag, in the cell location pool of the CLAPC, and can initiate a cell location investigation to facilitate having a manual investigation (e.g., manual investigation on map, or a physical visit to the cell) performed to determine the cell location. If the CAMC determines that a potential cell location is uncertain, the CAMC can tag the potential cell location with an uncertain tag and can initiate a cell monitoring request to request that further data collection (e.g., TA measurement data, AGPS or GPS location data, or other data) be performed for a desired period of time (e.g., a longer period of time) for further evaluation by the CAMC to facilitate desirably (e.g., accurately) determining the location of the cell.

In some embodiments, with regard to validated cell locations associated with cells, the CAMC can utilize a validated cell location of a cell to facilitate determining whether an azimuth (e.g., a recorded azimuth) of the cell can be validated as accurate (e.g., sufficiently accurate). With regard to a cell and associated validated cell location, the CAMC can utilize the estimator component to estimate an azimuth of a cell associated with a base station based at least in part on an analysis of the validated cell location of the cell and location data associated with communication devices associated with the cell. In certain embodiments, to facilitate enhancing the accuracy of the estimation of the azimuth of the cell, the estimator component can filter the location data to remove outlier communication devices that are determined to be too close to or too far away from the cell based at least in part on respective defined threshold distance values in relation to the validated location of the cell, in accordance with the defined cell attribute management criteria. With regard to the remaining subgroup of communication devices associated with the cell after filtering to remove the outlier communication devices, the estimator component can determine (e.g., calculate) respective cell-to-device azimuths associated with the respective communication devices of the subgroup of communication devices based at least in part on the results of the analysis of the validated location data associated with the validated cell location of the cell and the respective location data associated with the respective locations of the respective communication devices of the subgroup of communication devices.

The estimator component can determine (e.g., calculate) a first percentile of the respective cell-to-device azimuths associated with the respective communication devices of the subgroup of devices and the second percentile (e.g., higher) of the respective cell-to-device azimuths associated with the respective communication devices of the subgroup of communication devices, in accordance with the defined cell attribute management criteria, which can indicate or specify the first percentile and the second percentile to be utilized in such determination. In accordance with various embodiments, the first percentile can be a lower percentile, such as a tenth percentile (e.g., p(10%)) or other desired relatively lower percentile, and the second percentile can be in a relatively higher percentile, such as a ninetieth percentile (e.g., p(90%)) or other desired relatively higher percentile.

To facilitate enhancing accuracy of the azimuth estimation for the cell, the estimator component can estimate the azimuth of the cell based at least in part on (e.g., as a function of) the first percentile of the respective cell-to-device azimuths and the second percentile of the respective cell-to-device azimuths associated with the respective communication devices of the subgroup of devices (e.g., can determine the estimated azimuth of the cell as being equal to the sum of (the first percentile of the respective cell-to-device azimuths plus the second percentile of the respective cell-to-device azimuths) divided by two).

The CAMC can receive recorded cell azimuth data of one or more recorded azimuths associated with the cell from one or more data sources (e.g., via one or more data source devices) that can store (e.g., record) and provide information regarding azimuths of cells and/or locations of cells. In some embodiments, the CAMC can retrieve the recorded cell azimuth data of the one or more recorded azimuths associated with the cell from the CLAPC, wherein such data was obtained from the one or more data sources.

With regard to each recorded azimuth (or each of one or more desired recorded azimuths) of the one or more recorded azimuths associated with the cell, the CAMC can employ the validator component to determine whether a recorded azimuth associated with the cell is validated based at least in part on the results of an analysis of the estimated azimuth of the cell and the recorded azimuth of the cell. For instance, with regard to each of the one or more desired recorded azimuths associated with the cell, the validator component can determine whether the azimuth difference between the estimated azimuth and the recorded azimuth associated with the cell is less than or equal to a defined threshold azimuth difference based at least in part on the results of the analysis of the estimation data and the recorded cell azimuth data. (A desired recorded azimuth can be, for example, a recorded azimuth that is still under evaluation. For instance, if a recorded azimuth already has been determined to be potentially validated as accurate (e.g., due to the azimuth difference satisfying the defined threshold azimuth difference), it is not necessary to evaluate such recorded azimuth by comparing such recorded azimuth to the azimuth interval, and evaluation of such recorded azimuth can be bypassed.)

With regard each recorded azimuth of the one or more desired recorded azimuths associated with the cell, if the validator component determines that the azimuth difference associated with the recorded azimuth and estimated azimuth does not satisfy (e.g., is not less than or equal to) the defined threshold azimuth difference, the validator component can determine whether the recorded azimuth associated with the cell is located between the first percentile of the respective cell-to-device azimuths and the second percentile of the respective cell-to-device azimuths associated with the respective communication devices of the subgroup of communication devices (e.g., is located with a desired azimuth interval) based at least in part on the results of a comparison of the recorded azimuth to the first percentile of the respective cell-to-device azimuths and the second percentile of the respective cell-to-device azimuths associated with the respective communication devices. It is to be appreciated and understood that, in other embodiments, the validator component can evaluate a recorded azimuth with regard to the desired azimuth interval prior to evaluating the recorded azimuth with regard to the defined threshold azimuth difference. In such other embodiments, if the recorded azimuth satisfies the desired azimuth interval, the validator component can determine that the recorded azimuth at least potentially can be validated as accurate, and can bypass the evaluation of the recorded azimuth with regard to the defined threshold azimuth difference, as more fully described herein.

With regard each recorded azimuth of the one or more desired recorded azimuths associated with the cell, if the validator component determines that the azimuth difference between the estimated azimuth and the recorded azimuth associated with the cell greater than the defined threshold azimuth difference, or if the validator component determines that the recorded azimuth is not located between the first percentile and the second percentile of the respective cell-to-device azimuths associated with the respective communication devices of the subgroup of communication devices, the validator component can determine that such recorded azimuth is invalid (e.g., invalid as being inaccurate). If, instead, the validator component determines that the azimuth difference between the estimated azimuth and the recorded azimuth associated with the cell is less than or equal to the defined threshold azimuth difference, or determines that the recorded azimuth is located between the first percentile and the second percentile of the respective cell-to-device azimuths associated with the respective communication devices of the subgroup of communication devices, the validator component can determine that such recorded azimuth potentially can be validated (e.g., validated as being accurate).

If the validator component determines that there is only one recorded azimuth associated with the cell that potentially can be validated, the validator component can determine that such recorded azimuth can be validated. If the validator component determines that there are two or more recorded azimuths associated with the cell that potentially can be validated, the validator component can determine which recorded azimuth of the two or more recorded azimuths associated with the cell, which potentially can be validated, is the most accurate recorded azimuth associated with the cell, based at least in part on the analysis (e.g., further analysis) of the two or more recorded azimuths, the estimated azimuth of the cell, and the first percentile and the second percentile of the respective cell-to-device azimuths associated with the respective devices of the subgroup of devices. The validator component can determine that the most accurate recorded azimuth of the two or more recorded azimuths associated with the cell is to be validated with regard to the cell.

With regard to a validated recorded cell azimuth associated with the cell, the CAMC can tag the validated recorded azimuth as validated, good, and/or accurate. With regard to a recorded cell azimuth associated with the cell that is determined to be invalid, the CAMC can tag such recorded azimuth as invalid, bad, and/or inaccurate. In some embodiments, if, based at least in part on the analysis, the CAMC determines that the cell is an omni cell, the CAMC can tag the cell as being an omni cell, wherein the azimuth of an omni cell is not particularly relevant, since the cell is omni-directional and the cell can communicate with communication devices in all or substantially all directions. The CAMC can store information relating to the cell, including cell location data, azimuth data (e.g., estimated azimuth data, recorded azimuth data), and/or tag data (e.g., validated, good, and/or accurate tag data; invalid, bad, and/or inaccurate tag data; or omni cell tag data) in the CLAPC.

These and other aspects and embodiments of the disclosed subject matter will now be described with respect to the drawings.

Referring now to the drawings, FIG. 1 illustrates a block diagram of an example system 100 that can estimate a location of a node (e.g., base station) to facilitate estimating, determining, and/or validating a location and azimuth of a cell associated with the node, in accordance with various aspects and embodiments of the disclosed subject matter. The system 100 can include a communication network 102 that can comprise a mobility core network (e.g., a wireless communication network) and/or a packet data network (e.g., an Internet Protocol (IP)-based network, such as the Internet and/or intranet) that can be associated with the mobility core network.

The mobility core network of the communication network 102 can operate to enable wireless communication between communication devices and/or between a communication device and the communication network 102. The communication network 102 can include various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other devices) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can include multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can include, or can be associated with (e.g., communicatively connected to) a network device of the communication network 102.

At given times, one or more communication devices, such as, for example, communication device 104, communication device 106, and communication device 108, can connect or attempt to connect to the communication network 102 to communicate with other communication devices associated with the communication network 102. A communication device (e.g., 104, 106, or 108) also can be referred to as, for example, a device, a mobile device, or a mobile communication device. The term communication device can be interchangeable with (or include) a UE or other terminology. A communication device (or UE or device) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, an oven, or other appliance, having wireless communication functionality), a set-top box, an IP television (IPTV), a device associated or integrated with a vehicle (e.g., automobile, airplane, bus, train, ship, or other vehicle), a virtual assistant (VA) device, a drone, a home or building automation device (e.g., security device, climate control device, lighting control device, or other home or building automation device), an industrial or manufacturing related device, a farming or livestock ranch related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can include various network components or devices, which can include one or more base stations, such as, for example, base station 110. For instance, the mobility core network can include one or more radio access networks (RANs) (not explicitly shown in FIG. 1), wherein each RAN can include one or more base stations (e.g., access points (APs)), such as, for example base station 110. Each base station (e.g., base station 110) can serve communication devices (e.g., communication devices 104, 106, and/or 108) located in respective coverage areas served by respective base stations in the mobility core network of the communication network 102. The respective base stations can be associated with one or more sectors (not shown), wherein respective sectors can comprise respective cells. For instance, the base station 110 can comprise or be associated with one or more cells, such as, for example, cell 112, cell 114, and/or cell 116. The cells can have respective coverage areas that can form the coverage area covered by the one or more sectors. The respective communication devices can be communicatively connected to the communication network 102 via respective wireless or wireline communication connections with one or more of the respective cells.

In some embodiments, a RAN can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN. In certain embodiments, the RAN can be a cloud-RAN (C-RAN) that can be located in or associated with a cloud computing environment, which can include various cloud network components of the communication network 102.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

As disclosed herein, it can be desirable to accurately know the locations and azimuths of cells (e.g., cell 112, cell 114, cell 116) associated with the communication network 102. There are various data sources that can contain and provide, with varying degrees of reliability, location information of the locations of cells at different levels of granularity, such as, for example, transmitter location, node location (e.g., eNodeB location), or universal site identifier (USID) location, and/or azimuth information of the azimuths of cells. The system 100 can include a cell location and azimuth pool component (CLAPC) 118 that can receive, obtain, or collect the location information regarding the locations of the cells from the various data sources, for example, in a centralized place form or place (e.g., a data store or database of the CLAPC 118). The CLAPC 118 can be associated with (e.g., communicatively connected to) the communication network 102 (as depicted) or part of the communication network 102.

The CLAPC 118 can share (e.g., provide or make available) the location information regarding the cell locations and/or azimuth information regarding cell azimuths with downstream applications for cell location validation, cell azimuth validation, or other desired uses. Different data sources typically can use different cell keys (e.g., cell tower ID (CellID), cell global identification (CGI), E-UTRAN CGI (ECGI), cell name (cellname), global cell identity (GCI), or other type of cell key). The CLAPC 118 can unify the cell key for a cell, which can be used (e.g., can relatively easily be used) to join with network measurement reported cell key.

In accordance with various embodiments, to facilitate improving the accuracy of cell locations and azimuths of cells, the system 100 can include a cell attribute management component (CAMC) 120 that can employ an estimator component 122 that can desirably estimate or determine respective locations of respective cells (e.g., cell 112, cell 114, cell 116) associated with respective base stations (e.g., base station 110) of the communication network 102, based at least in part on respective timing advance (TA) measurement data and/or respective location data (e.g., AGPS location data, GPS location data, and/or IoT geolocation data) associated with respective communication devices (e.g., communication devices 104, 106, and/or 108) associated with the respective base stations. In some embodiments, the estimator component 122 can employ machine learning techniques and algorithms to facilitate estimating or determining respective locations of respective nodes (e.g., base station 110) to facilitate estimating or determining respective locations of cells associated with the respective nodes, in accordance with defined cell location management criteria.

The CAMC 120 also can include a validator component 124 that can validate or verify the accuracy of cell locations. For instance, for each cell (e.g., cell 112, cell 114, and cell 116), the validator component 124 can validate or verify the accuracy of the estimated location of the cell or a recorded location of the cell, wherein the validator component 124 can obtain information relating to (e.g., indicating or identifying) the recorded location of the cell from the CLAPC 118. In some embodiments, for each cell (e.g., cell 112, cell 114, and cell 116), the validator component 124 can perform a cross validation of the estimated location of the cell and (e.g., vis-à-vis, or in relation to) one or more recorded locations of the cell obtained from one or more data sources (e.g., and stored in the CLAPC 118), as more fully described herein. The validator component 124 can employ validation techniques and algorithms, and/or can employ machine learning techniques and algorithms, to facilitate validating or verifying the accuracy of the estimated location of the cell or recorded location of the cell.

Based at least in part on the level of accuracy of the estimated location or recorded location of the cell (e.g., cell 112, cell 114, or cell 116), the validator component 124 can tag the estimated location or recorded location of the cell as being accurate, acceptable, bad (e.g., unacceptable), or uncertain, or with other desired accuracy level identifiers. The CAMC 120 can provide feedback information (e.g., validation results from the validator component 124) to the CLAPC 118, as or when desired (e.g., on a regular or periodic basis, dynamically, based on random cell location checks, or as otherwise desired), to facilitate updating the CLAPC 118 with improved (e.g., more accurate or corrected) cell location results and/or with the most reliable data source for respective cells (e.g., cell 112, cell 114, or cell 116). For instance, if the CAMC 120 determines improved (e.g., more accurate or corrected) cell location information for a cell (e.g., cell 112, cell 114, or cell 116), and/or determines a particular cell location associated with (e.g., provided by) a particular data source has a higher accuracy level than other cell location information associated with other data sources, the CAMC 120 can update the cell location information for the cell in the CLAPC 118 with the improved cell location results and/or with the most reliable data source. The CLAPC 118 can share the improved cell location information, obtained from the improved cell location results and/or with the most reliable data source, with other downstream applications.

In some embodiments, if the CAMC 120 determines that a potential cell location (e.g., estimated cell location, or recorded cell location) of a cell (e.g., cell 112, cell 114, or cell 116) is accurate, the CAMC 120 can lock the cell location with a "good" or "accurate" tag to facilitate preventing undesired (e.g., unwanted, inadvertent, or unexpected) changes to the cell location information of the cell that is stored in the cell location pool of the CLAPC 118, and can store the cell location information (e.g., updated cell location information) for the cell, including the lock and tag information, in the cell location pool of the CLAPC 118. If the CAMC 120 determines that a potential cell location is bad (e.g., unacceptably inaccurate), the CAMC 120 can tag the potential cell location as being bad, can store the cell location information (e.g., updated cell location information) for the cell, including the bad tag, in the cell location pool of the CLAPC 118, and can initiate a cell location investigation to facilitate having a manual investigation (e g, manual investigation on map, or a physical visit to the cell) performed to determine the cell location, as more fully described herein.

In certain embodiments, if the CAMC 120 determines that a potential cell location (e.g., estimated cell location, or recorded cell location) of a cell (e.g., cell 112, cell 114, or cell 116) is uncertain, the CAMC 120 can tag the potential cell location with an uncertain tag and can initiate a cell monitoring request to request that further data collection (e.g., TA measurement data, AGPS or GPS location data, IoT geolocation data, and/or other data) be performed for a desired period of time (e.g., a longer period of time). The CAMC 120 can evaluate the additional collected data with respect to the potential cell location, estimate the cell location based at least in part on the additional collected data, and perform cell validation on the estimated cell location and/or a recorded cell location(s) for the cell, to facilitate desirably (e.g., accurately) determining the location of the cell, in accordance with the defined cell attribute management criteria, as more fully described herein.

In accordance with various embodiments, with regard to cells for which cell locations have been validated, for each validated cell location, the CAMC 120 can evaluate validated cell location data associated with the validated cell location of the cell (e.g., cell 112, cell 114, or cell 116) and location data associated with locations of the communication devices (e.g., communication devices 104, 106, and/or 108) associated with the cell to estimate, determine, and/or validate the azimuth of the cell, in accordance with the defined cell attribute management criteria, as more fully described herein. For instance, with regard to a cell (e.g., cell 112, cell 114, or cell 116) and associated validated cell location of the cell, the CAMC 120, employing the estimator component 122, can estimate an azimuth of the cell based at least in part on the results of an analysis of the validated cell location data associated with the validated cell location of the cell and respective location data associated with respective locations of the respective communication devices (e.g., communication devices 104, 106, and/or 108) associated with the cell, in accordance with the defined cell attribute management criteria, as more fully described herein.

The CAMC 120 also can receive the recorded cell azimuth data regarding one or more recorded azimuths associated with the cell (e.g., cell 112, cell 114, or cell 116) from the CLAPC 118 or one or more data sources (e.g., one or more data source devices associated with the one or more data sources), wherein the CLAPC 118 can store such recorded cell azimuth data received from the one or more data sources. The CAMC 120, employing the validator component 124, can analyze the estimation data of the estimated azimuth of the cell (e.g., cell 112, cell 114, or cell 116) and the recorded cell azimuth data associated with (e.g., representative of) the one or more recorded azimuths of the cell, and can apply the defined cell attribute management criteria relating to accuracy and validation of azimuths of cells during the analysis of the estimation data and the recorded cell azimuth data, as more fully described herein. The validator component 124 can determine whether any of the one or more recorded azimuths of the cell can be validated based at least in part on the results of the analysis of the estimation data and the recorded cell azimuth data, and the application of the defined cell attribute management criteria during such analysis, as more fully described herein. If, based at least in part on the results of such analysis, the validator component 124 determines that only one recorded azimuth of the one or more recorded azimuths can be validated, the validator component 124 can select that recorded azimuth as the validated recorded azimuth. If, instead, the validator component 124 determines that more than one recorded azimuth of the cell (e.g., cell 112, cell 114, or cell 116) potentially can qualify as being a validated azimuth for the cell, the validator component 124 can determine the recorded azimuth of the one or more potentially qualifying recorded azimuths that is the most accurate recorded azimuth, and can select that recorded azimuth as the validated recorded azimuth based at least in part on the results of the analysis of the estimation data and the recorded cell azimuth data, and the application of the defined cell attribute management criteria during such analysis, as more fully described herein.

If the validator component 124 can validate a recorded azimuth associated with a cell (e.g., cell 112, cell 114, or cell 116), the CAMC 120 can tag such recorded azimuth as validated (e.g., validated or verified as accurate or good). If the validator component 124 determines that a recorded azimuth is invalid, bad, and/or inaccurate, the CAMC 120 can tag that recorded azimuth as invalid, bad, and/or inaccurate.

In some instances, a cell (e.g., cell 112, cell 114, or cell 116) can be an omni cell that can be omni-directional where the cell can communicate with communication devices (e.g., communication devices 104, 106, and/or 108) in all or substantially all directions in relation to the cell. In some embodiments, if, based at least in part on the analysis, the CAMC 120 determines that the cell (e.g., cell 112, cell 114, or cell 116) is an omni cell, the CAMC 120 can tag the cell as being an omni cell, wherein the azimuth of an omni cell can be deemed to be not particularly relevant, since the cell is omni-directional and the cell can communicate with communication devices in all or substantially all directions. If the CAMC 120 determines that a cell (e.g., cell 112, cell 114, or cell 116) is an omni cell, the CAMC 120 can tag the cell as an omni cell.

The CAMC 120 can store information relating to the cell under consideration (e.g., cell 112, cell 114, or cell 116), including cell location data, azimuth data (e.g., estimated azimuth data and/or recorded azimuth data), and/or tag data (e.g., validated, good, and/or accurate tag data; invalid, bad, and/or inaccurate tag data; or omni cell tag data) in the CLAPC 118.

Other aspects and embodiments of the disclosed subject matter will be described with regard to the other figures (and/or FIG. 1).

Figure 2:
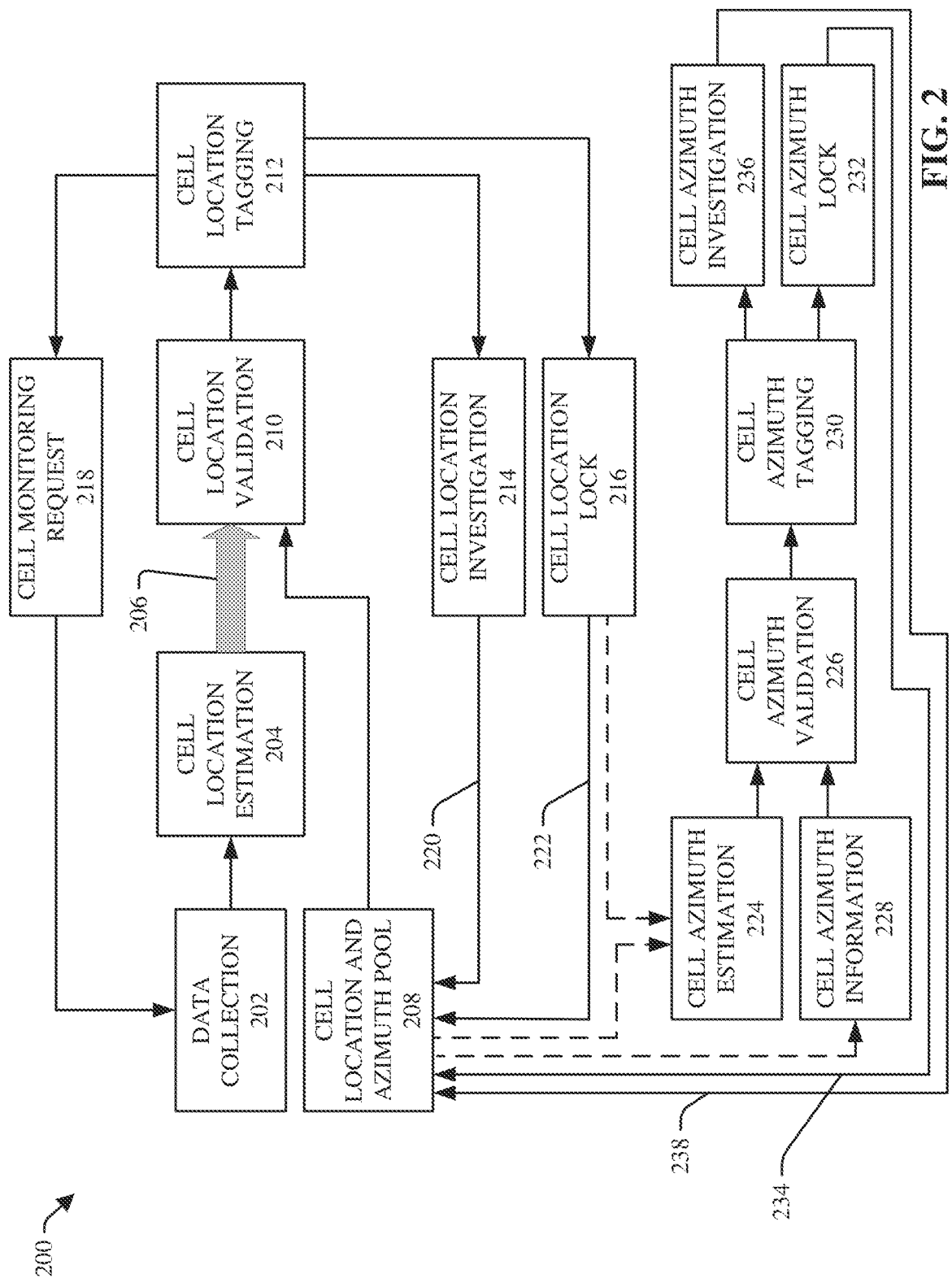
FIG. 2 depicts a block diagram of an example cell location and azimuth estimation and validation process, in accordance with various aspects and embodiments of the disclosed subject matter.

Referring to FIG. 2 (along with FIG. 1), FIG. 2 depicts a block diagram of an example cell location and azimuth estimation and validation process 200, in accordance with various aspects and embodiments of the disclosed subject matter. As indicated at reference numeral 202 of the cell location and azimuth estimation and validation process 200, the CAMC 120 can perform data collection to collect desired (e.g., relevant) data, including, for example, respective location data relating to respective communication devices (e.g., communication devices 104, 106, and/or 108) associated with respective base stations (e.g., base station 110) of the communication network 102, and respective call trace records associated with the respective communication devices. Location data associated with a communication device can include, for example, location data (e.g., AGPS or GPS location data, location data from drive tests, or other location data) reported actively by the communication device, or, for a stationary communication device (e.g., a fixed or stationary IoT device), location data (e.g., IoT geolocation data, AGPS or GPS location data, Wi-Fi location positioning data, long range wide area networks (LoRa WAN), or other location data). Call trace records can include trace measurement data or TA measurement data and/or round trip delay (RTD) data from which the distance between a communication device (e.g., communication device 104) and cell locations of cells (e.g., cell 112, cell 114, or cell 116) can be derived or determined. With some communication devices, there can be both location data and TA measurement data, whereas, with other communication devices there may be either location data or TA measurement data.

The CAMC 120 can combine or join the respective location data associated with respective communication devices with respective TA measurement data and/or RTD data based at least in part on respective device identifiers (e.g., UE IDs) of the respective communication devices and respective timestamps associated with the respective location data and/or respective TA measurement or RTD data. The CAMC 120 also can group the respective location data, respective TA measurement data, and/or respective RTD data associated with respective communication devices (e.g., communication devices 104, 106, and/or 108) by serving node (e.g., each base station, such as base station 110). As disclosed, each serving node (e.g., base station 110) can be associated with or can comprise a single cell (e.g., cell 112) or a cluster of cells (e.g., cell 112, cell 114, and/or cell 116) that can be on the same base station and can share the same location (e.g., cells of the cluster can be co-located).

In accordance with various embodiments, the estimator component 122 can employ a machine learning (ML) engine that can utilize an ML algorithm to estimate the respective locations of the respective cells (e.g., cell 112, cell 114, and/or cell 116, . . . ) of each node, based at least in part on the results of analyzing the respective location-related data (e.g., respective location data, respective TA measurement data, and/or respective RTD data) associated with the respective communication devices (e.g., communication devices 104, 106, and/or 108), as indicated at reference numeral 204 of the cell location and azimuth estimation and validation process 200. The ML engine can determine and generate (e.g., as an output) estimated locations of cells (e.g., cell 112, cell 114, and/or cell 116), as presented at reference numeral 206 of the cell location and azimuth estimation and validation process 200. The estimator component 122 can apply the ML algorithm to the respective location data, respective TA measurement data, and/or respective RTD data associated with the respective communication devices (e.g., communication devices 104, 106, and/or 108) served by or associated with the same node (e.g., served by or associated with the cluster of cells associated with the same node). The disclosed subject matter, by having the CAMC 120 (e.g., estimator component 122 of CAMC 120) aggregate such location-related data by node (e.g., base station 110), can enable the CAMC 120 to desirably (e.g., accurately, suitably, or optimally) estimate and validate the location(s) of a cell(s) (e.g., a cell(s) associated with the node) that may have relatively few observed communication devices connected to or associated with the cell(s) based at least in part on such cell(s) being co-located with another cell(s) associated with the same node.

As part of the ML engine flow employed by the estimator component 122, after grouping the data (e.g., respective location-related data) by serving node (e.g., base station 110), the estimator component 122, employing the ML engine, can determine whether there are a sufficient number (e.g., at least a defined threshold number) of communication devices (e.g., communication devices 104, 106, and/or 108) observed close to the node. If the estimator component 122 determines that there are a sufficient number of communication devices observed close to (e.g., within a defined distance of) the node, the estimator component 122 can determine that a smallTA algorithm can be utilized to estimate the location of the node. If the estimator component 122 determines that there is not a sufficient number of communication devices observed close to the node, the estimator component 122 can instead determine that a linear regression algorithm can be utilized to estimate the location of the node.

Figure 3:
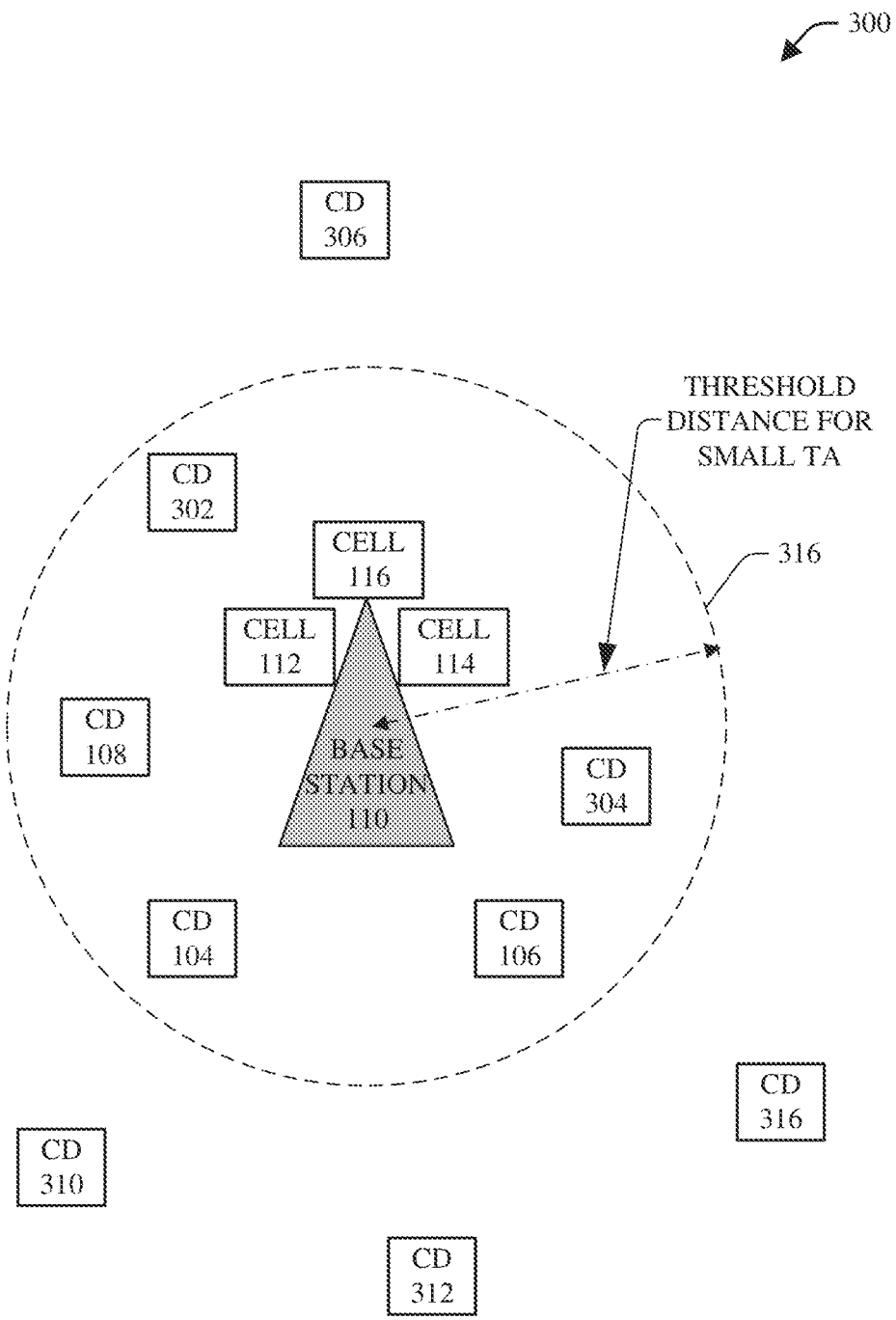
FIG. 3 depicts a diagram of an example communication device distribution in relation to a node associated with one or more cells, in accordance with various aspects and embodiments of the disclosed subject matter.

Referring to FIG. 3 (along with FIGS. 1 and 2), FIG. 3 depicts a diagram of an example communication device distribution 300 in relation to a node (e.g., base station) associated with one or more cells, in accordance with various aspects and embodiments of the disclosed subject matter. As presented in the communication device distribution 300, a plurality of communication devices (CDs), such as communication devices 104, 106, 108, 302, 304, 306, 308, 310, 312, and 314, can be associated with (e.g., served or observed by) a node (e.g., base station 110), wherein the respective communication devices can be distributed in various locations in relation to the node. The base station 110 can be associated with or comprise one or more cells, such as cells 112, 114, and/or 116, that can be associated with respective communication devices of the plurality of communication devices.

Some of the communication devices, such as communication devices 104, 106, 108, 302, and 304, can be located at or within a defined threshold distance (e.g., distance perimeter 316) of the base station 110, whereas other communication devices, such as communication devices 306, 308, 310, 312, and 314, can be located further away from the base station 110 outside of the defined threshold distance of the base station 110. The CAMC 120 can determine and/or set the defined threshold distance based at least in part on (e.g., in accordance with; as indicated or specified by) the defined cell attribute management criteria, wherein the defined threshold distance can relate to whether or not the smallTA algorithm is to be utilized by the estimator component 122 to estimate the location of the node (and associated cells). In some embodiments, the defined threshold distance can be 100 meters, and in other embodiments, the defined threshold distance can be less than or greater than 100 meters, depending on the applicable cell attribute management criteria.

The CAMC 120 can determine (e.g., calculate or derive) the respective locations of the respective communication devices (e.g., 104, 106, 108, 302, 304, 306, 308, 310, 312, and/or 314) in relation to the node (e.g., base station 110) based at least in part on the respective TA measurement data associated with the respective communication devices. The estimator component 122 can analyze the communication device distribution 300 to determine whether sufficient sample data points (e.g., communication device data points) exist with measured TAs indicating the associated communication devices are sufficiently close (e.g., at or within the defined threshold distance of) the location of the node. A smaller TA measurement can indicate that a communication device is relatively close to the node, whereas a larger TA measurement can indicate that a communication device is relatively farther away from the node. If the estimator component 122 determines that there is a sufficient number (e.g., at least a defined threshold number) of communication devices are at or within the defined threshold distance of the node (e.g., base station 110), the estimator component 122 can determine that the smallTA algorithm can be utilized to estimate the location of the node. The CAMC 120 can determine or set the defined threshold number based at least in part on (e.g., in accordance with; as indicated or specified by) the defined cell attribute management criteria.

As an example, if the defined threshold number is 5 (or less than 5) for using the smallTA algorithm, the estimator component 122 can determine that there are 5 communication devices (e.g., communication devices 104, 106, 108, 302, and 304) located at or within the defined threshold distance of the node and 5 other communication devices (e.g., 306, 308, 310, 312, and 314) located outside the defined threshold distance of the node (e.g., base station 110), and accordingly, can determine that the smallTA algorithm can be utilized to estimate the location of the node. If, instead the defined threshold number is 8 for using the smallTA algorithm, the estimator component 122 can determine that there are 5 communication devices (e.g., communication devices 104, 106, 108, 302, and 304) located at or within the defined threshold distance of the node, and accordingly, can determine that, since 5 is less than the defined threshold number of 8, the smallTA algorithm is not to be utilized to estimate the location of the node, but rather, the linear regression algorithm is to be utilized to estimate the location of the node.

It is to be appreciated and understood that, for reasons of brevity, clarity, and illustration, the example communication device distribution 300 depicts a total of 10 communication devices, and accordingly, for reasons of brevity, clarity, and illustration, relatively small defined threshold numbers are utilized with regard to this example for determining whether or not to utilize the smallTA algorithm to estimate the node location. In accordance with various embodiments, for determining whether or not to utilize the smallTA algorithm to estimate a node location, the defined threshold number of communication devices at or within the defined threshold distance of the node can be larger than 5 communication devices or 8 communication devices, as such defined threshold number is indicated or specified by the defined cell attribute management criteria. For example, the defined threshold number can be 10, 15, 20, 25, . . . , 50, . . . 100, or virtually any desired number less than or greater than 100.

If the estimator component 122 determines that there is a sufficient number (e.g., at least a defined threshold number of) communication devices located at or within the defined threshold distance of the node (e.g., base station 110), the estimator component 122 can determine that the smallTA algorithm can be utilized to estimate the location of the node. In some embodiments, the estimator component 122, employing the smallTA algorithm, can determine the respective locations of the subgroup of communication devices at or within the defined threshold distance, based at least in part on the respective location data (e.g., AGPS or GPS location data) of those respective communication devices, and can estimate the location of the node (e.g., base station 110) based at least in part on (e.g., as a function of) a median (e.g., median distance values) of the respective locations (e.g., respective AGPS or GPS locations) of those respective communication devices. It is to be appreciated and understood that, while, in some embodiments, the median distance can be utilized to estimate the location of the node, in other embodiments, the estimator component 122 can utilize the average or mean distance value, or another desired type of mathematically derived distance value, to estimate the location of the node based at least in part on the respective locations (e.g., respective AGPS or GPS locations) of those respective communication devices.

If the estimator component 122 determines that there is not a sufficient number (e.g., there is less than the defined threshold number of) communication devices located at or within the defined threshold distance of the node (e.g., base station 110), the estimator component 122 can determine that the smallTA algorithm is not to be utilized, and instead, the linear regression algorithm is to be utilized, to estimate the location of the node. Accordingly, the estimator component 122 can apply the linear regression algorithm to estimate the location of the node (e.g., base station 110) based at least in part on the respective TA measurement data and/or the respective location data (e.g., AGPS or GPS location data) associated with the respective communication devices and the linear regression algorithm. When the estimator component 122 (e.g., ML engine of the estimator component 122) is employing the linear regression algorithm, the node location ($S_x$, $S_y$) can be the coefficients of linear equations formed by pairs of communication device locations and their respective distances to the node. Since there often can exist many pairs of communication devices to be considered with respect to a node, the estimator component 122 can apply robust linear regression to remove outlier location-related data and mitigate (e.g., neutralize, reduce, or minimize) noise or errors that may exist in the TA measurement data and/or location data (e.g., AGPS or GPS location data).

Figure 4:
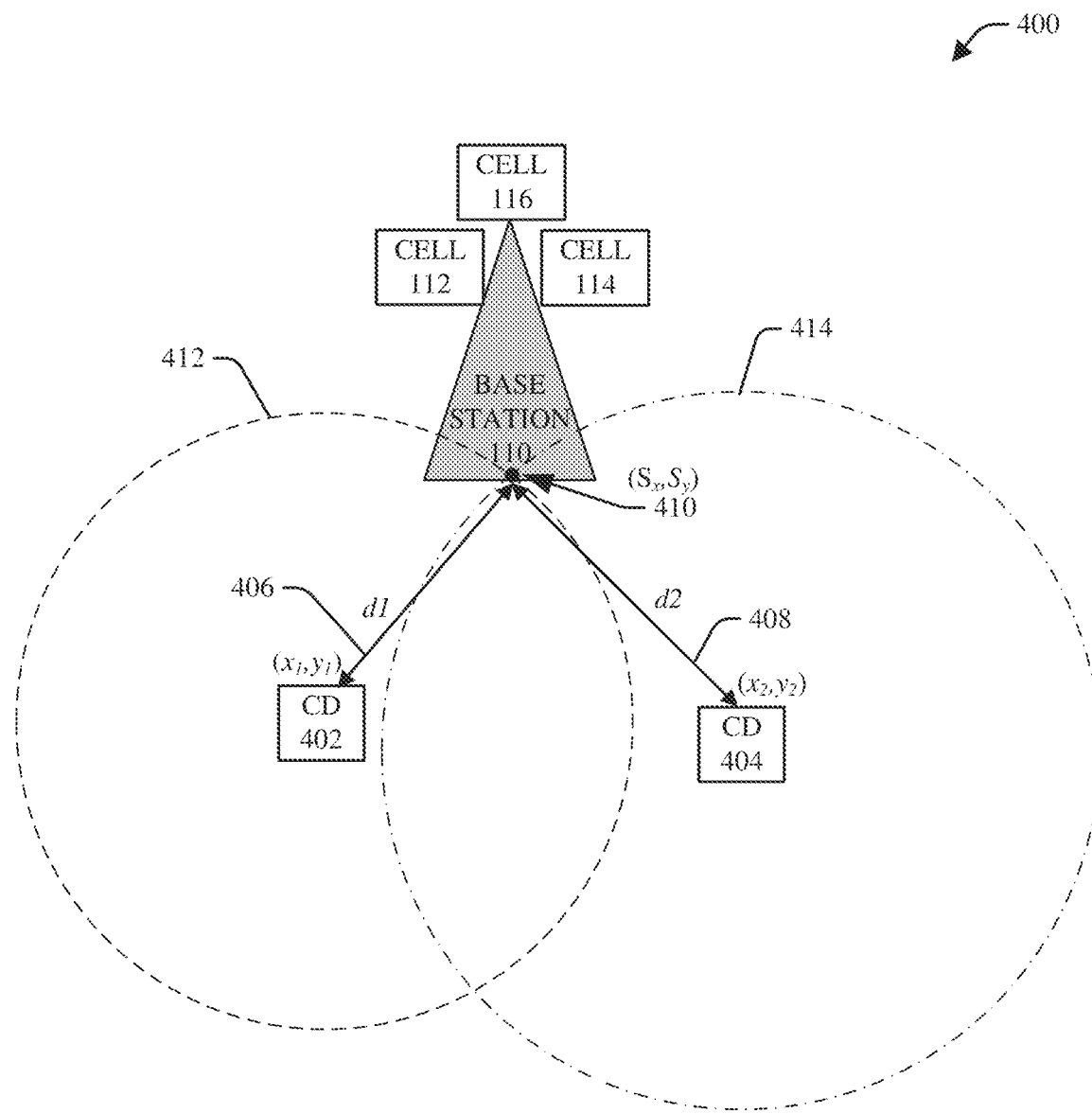
FIG. 4 illustrates a diagram of an example communication device pair distribution in relation to a node associated with one or more cells, in accordance with various aspects and embodiments of the disclosed subject matter.

Turning briefly to FIG. 4 (along with FIGS. 1, 2, and 3), FIG. 4 illustrates a diagram of an example communication device pair distribution 400 in relation to a node (e.g., base station) associated with one or more cells, in accordance with various aspects and embodiments of the disclosed subject matter. The example communication device pair distribution 400 depicts one pair of communication devices, communication devices 402 and 404, of a plurality of communication devices that can be associated with a node (e.g., base station 110) that can comprise or be associated with one or more cells (e.g., cells 112, 114, and/or 116).

For the pair of communication devices 402 and 404, the estimator component 122 can determine that communication device 402 is located at ($x_1$, $y_1$) based at least in part on the result of analyzing the location-related data (e.g., TA measurement data and/or AGPS or GPS data) associated with the communication device 402, and can determine that communication device 404 is located at ($x_2$, $y_2$) based at least in part on the result of analyzing the location-related data associated with the communication device 404. Each pair of communication devices (e.g., communication devices 402 and 404) can form a linear equation of the node location, wherein ($S_x$, $S_y$) can be the node location, ($x_i$, $y_i$), with i=1, 2, can be any pair of device locations of any pair of communication devices of the plurality of communication devices, and d1 (e.g., d1 406) and d2 (e.g., d2 408) can be the respective distances derived from the TA measurement data associated with the respective communication devices of the device pair to the node (e.g., serving node).

The estimator component 122 can perform similar linear regression analysis calculations for all or a desired portion of the various pairs of communication devices associated with the node (e.g., base station 110) to facilitate estimating the location of the node. The estimator component 122 can estimate the location of the node based at least in part on the respective locations of the respective intersection points (e.g., intersection point 410) of the respective pairs of communication devices associated with the node, in accordance with the linear regression algorithm. With respect to the pair of communication devices under consideration, the estimator component 122 can determine or estimate the location of the node (e.g., base station 110) to be at the intersection point 410 of two circles 412 and 414 that can be respectively centered at the respective locations of the communication devices 402 and 404 of the device pair, with respective radii that can be equal to the respective distances d1 406 and d2 408 of the respective communication devices 402 and 404 to the node. These parameters can satisfy the following example equations:

$$(x_1-s_x)^2+(y_1-s_y)^2=d_1^2; \quad \text{Eq. (1)}$$

$$(x_2-s_x)^2+(y_2-s_y)^2=d_2^2; \quad \text{Eq. (2)}$$

Eq.(1)-Eq.(2):

$$(x_2-x_1)s_x+(y_2-y_1)s_y=\tfrac{1}{2}[(d_2^2-d_1^2)+(x_2^2-x_1^2)+(y_2^2-y_1^2)], \quad \text{Eq. (3)}$$

and where $\beta_x s_x+\beta_y s_y=C$, Eq. (4) wherein there can be one sample of ($\beta_x$, $\beta_y$, C) for each pair of communication device locations (e.g., ($x_i$, $y_i$), with i=1, 2).

With further regard to FIGS. 1 and 2, the CAMC 120 can estimate the respective locations of the one or more cells (e.g., cell 112, cell 114, and/or cell 116, . . . ) of the node (e.g., base station 110) to be the estimated location of the node. For instance, the CAMC 120 can determine that the estimated location of each cell (e.g., cell 112, cell 114, cell 116) associated with a particular node (e.g., base station 110) can be the estimated location of the node (e.g., as determined by the smallTA algorithm or the linear regression algorithm).

For each cell (e.g., cell 112, cell 114, or cell 116, . . . ) of each node (e.g., base station 110), with the location of the node estimated by the estimator component 122 (e.g., employing the ML engine), the CAMC 120 can determine that the estimated location of the cell is the estimated location of the node. For each cell (e.g., cell 112, cell 114, or cell 116), the CAMC 120 can employ the validator component 124, which can receive the estimated location of the cell from the estimator component 122 (as indicated at reference numeral 206) and one or more recorded locations of the cell from the cell location and azimuth pool of the CLAPC 118 (as indicated by reference numeral 208), and the validator component 124 can validate or verify the estimated location of the cell and/or a recorded location(s) of the cell to facilitate determining whether the estimated node location and/or recorded node location(s) is accurate (e.g., sufficiently accurate) or not, or is uncertain, in accordance with the defined cell attribute management criteria, as indicated at reference numeral 210 (cell location validation) of the cell location and azimuth estimation and validation process 200. To perform the cell location validation 210, the validator component 124 can utilize one or more various types of measurements to validate (e.g., determine the accuracy of) a location of a cell. The validator component 124 can employ a set of rules (e.g., set of validation rules) to facilitate validating a location of a cell, wherein one or more rules of the set of rules can be applied to one or more measurement results to facilitate determining an accuracy level of a potential cell location (e.g., an estimated cell location, or a recorded cell location obtained from a data source as stored in the cell location and azimuth pool of the CLAPC 118), in accordance with the defined cell attribute management criteria.

In some embodiments, to facilitate validating the location of a cell (e.g., cell 112, cell 114, or cell 116), the validator component 124 can determine (e.g., calculate) a distance difference (DD) as a function of a first distance, D1, between a potential location (e.g., an estimated location, or a recorded location from a data source) of the cell and a location of a communication device (e.g., communication device 104, communication device 106, or communication device 108) and a second distance, D2, which can be a measurement distance (e.g., converted from TA measurement data) between a true location of the cell and the communication device, as more fully described herein. It is to be appreciated and understood that the first distance, D1, and the second distance, D2, utilized to determine a DD are different from the distances d1 and d2 (e.g., distances d1 406 and d2 408 of FIG. 4) utilized during the linear regression analysis. The validator component 124 can determine the DDs with regard to all or a desired portion of the communication devices associated with (e.g., served by, observed by, or otherwise associated with) the cell. If the cell location information (e.g., from a recorded cell location of a data source, or from an estimated cell location), is at the true cell location or is very close to the true cell location, the DD can be expected to be close to 0. Thus, if there are a lot of small DD values associated with a cell, this can be a good indicator that the cell location information (e.g., recorded cell location, or estimated cell location) is acceptably reliable (e.g., acceptably accurate).

Figure 5:
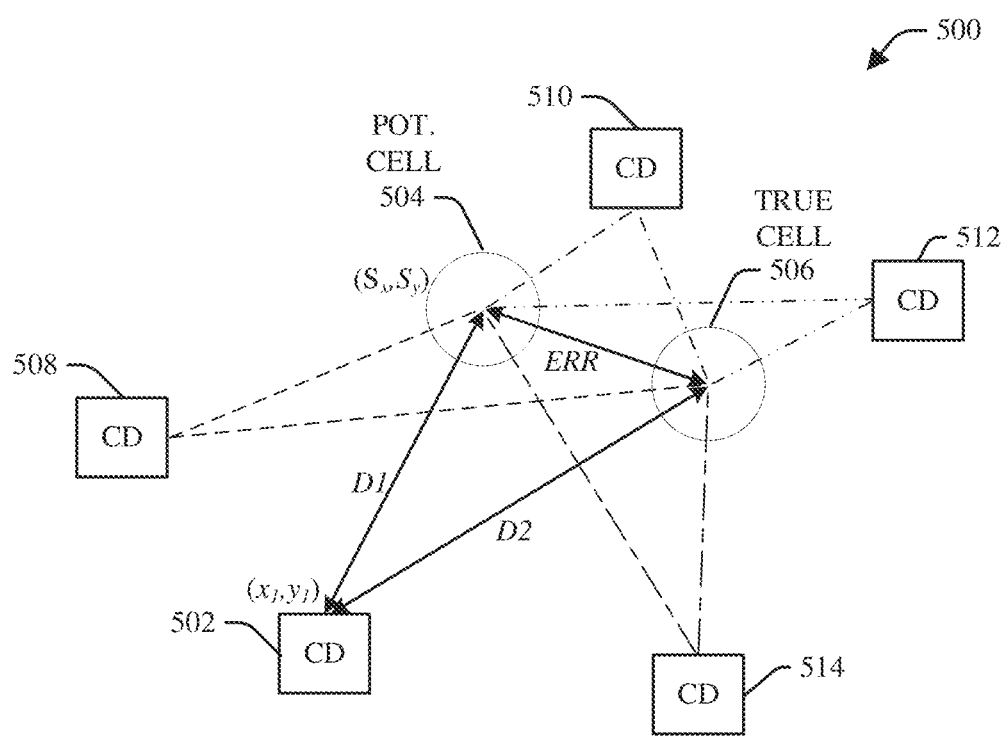
FIG. 5 depicts a diagram of an example distance difference (DD) of a first distance between a potential location (e.g., estimated location or recorded location) of a cell and a location of a communication device and a second distance that can be a measurement distance between a true location of the cell and the communication device, in accordance with various aspects and embodiments of the disclosed subject matter.

Referring briefly to FIG. 5 (along with FIGS. 1 and 2), FIG. 5 depicts a diagram of example distance differences (DDs) 500 of respective first distances between a potential location (e.g., estimated location or recorded location) of a cell and respective locations of communication devices and respective second distances that can be respective measurement distances (e.g., converted from TA measurement data) between a true location of the cell and the respective communication devices, in accordance with various aspects and embodiments of the disclosed subject matter. In some embodiments, to facilitate cell location validation 210 of a location of a cell (e.g., cell 112, cell 114, or cell 116 of FIG. 1), for each communication device (e.g., communication device 104, communication device 106, and/or communication device 108 of FIG. 1) associated with the cell, the validator component 124 can determine a DD between the reported distance from the communication device to the cell based on TA measurement data and the determined (e.g., calculated) distance from a location (x1, y1) of a communication device 502 derived from location data (e.g., AGPS or GPS) to the potential location 504 (Sx, Sy) of the cell (POT. CELL) in the record (e.g., a recorded cell location of a data source as stored in the cell location and azimuth pool of the CLAPC 118, or the estimated cell location determined by the estimator component 122).

If, for instance, all data sources for cell location (e.g., estimated cell location and a recorded cell location) of a cell are accurate, the reported distance from a communication device to the cell based on TA measurement data should match the determined (e.g., calculated) distance from a location (x1, y1) of the communication device 502 derived from location data (e.g., AGPS or GPS) to the potential location 504 (Sx, Sy) of the cell in the record (e.g., a recorded cell location of a data source, or the estimated cell location). The disclosed subject matter can define an error, ERR, as being the distance between a potential cell location 504 (Sx, Sy) (e.g., recorded cell location or estimated cell location) of a cell and the true location 506 (TRUE CELL) of the cell.

The validator component 124 can determine (e.g., calculate) a DD for each communication device record (e.g., TA measurement data) associated with each communication device (e.g., communication device 502, communication device 508, communication device 510, communication device 512, and/or communication device 514) that is associated with the cell 506 (e.g., cell at true location), for example, as follows. The validator component 124 can determine (e.g., calculate) a first distance, D1, between the communication device-reported location (x1, y1) (e.g., AGPS or GPS location) of the communication device 502 to a potential cell location 504 (Sx, Sy) (e.g., estimated cell location or a recorded cell location obtained from a data source of the cell location pool). In some embodiments, the validator component 124 can determine the first distance, D1, with regard to communication device 502 using Eq. (5) as follows:

$$D1=\sqrt{(x_1-s_x)^2+(y_1-s_y)^2}. \quad \text{Eq. (5)}$$

The validator component 124 also can determine respective first distances, D1s, for the other communication devices (e.g., 508, 510, 512, and/or 514), as a function of the respective communication device-reported locations of the other communication devices and the potential cell location 504, in a manner similar to that described herein with regard to communication device 502.

The validator component 124 also can determine (e.g., calculate) a second distance, D2, with regard to the communication device 502 as a function of the TA measurement data associated with the communication device and the cell (at the true cell location) and the multipath effect (e.g., D2=TA−multipath effect). In some embodiments, the validator component 124 can determine the second distance, D2, with regard to communication device 502 using Eq. (6) as follows:

$$D2=TA*78m-\text{multipath effect}, \quad \text{Eq. (6)}$$

wherein TA can be the TA measurement data as converted to the unit of meters, and 78 m can be a function value, wherein the multipath effect can relate to signals (e.g., radio signals) communicated between a communication device and a cell being propagated in different ways and across different distances due in part to the scattering and reflecting of signals, and wherein it can be desirable to take the multipath effect into account when determining the second distance, D2, because the multipath effect can affect or impact the determination of the second distance, D2, using the TA measurement data. The validator component 124 also can determine respective second distances, D2s, for the other communication devices (e.g., 508, 510, 512, and/or 514), as a function of the respective TA measurement data associated with the respective other communication devices and the cell 506 at the true cell location, the respective multipath effects associated with the respective other communication devices, and the function value, in a manner similar to that described herein with regard to communication device 502.

The validator component 124 can determine the DDs associated with each potential cell location 504 (Sx, Sy) (e.g., estimated cell location or a recorded cell location) of the cell as a function of the first distance, D1, and the second distance, D2, with respect to each communication device (e.g., 502, 508, 510, 512, and/or 514). In some embodiments, the validator component 124 can determine the DD for each potential cell location 504 (Sx, Sy) with respect to each communication device using Eq. (7):

$$DD=\text{abs}(D1-D2) \le ERR, \quad \text{Eq. (7)}$$

wherein abs can be an absolute value function that can take the absolute value of D1−D2, and wherein abs(D1−D2) can be less than or equal to ERR. If the potential cell location (e.g., position) 504 (Sx, Sy) is accurate, ERR=0, and accordingly, D1=D2=TA−multipath effect.

The validator component 124 can determine the DD for each communication device record (e.g., each record from each data source in the cell location and azimuth pool, and the record for the estimated cell location) associated with each communication device (e.g., 502, 508, 510, 512, and/or 514) under consideration.

In certain embodiments, to facilitate validating the location (e.g., potential location) of a cell (e.g., cell 506), the validator component 124 can utilize DD values associated with the communication devices (e.g., 502, 508, 510, 512, and/or 514) and the cell to determine respective upper bound values (UB) of ERR of communication devices (e.g., 502, 508, 510, 512, and/or 514) associated with (e.g., served by, observed by, or otherwise associated with) the cell, wherein the ERR can be the distance between a potential cell location 504 (Sx, Sy) (e.g., recorded cell location or estimated cell location) of a cell and the true location 506 of the cell. For each communication device (e.g., 502, 508, 510, 512, and/or 514) associated with a cell, a UB of ERR, with respect to a communication device and the cell, can be determined as a function of the first distance, D1, TA measurement data (as converted to meters), and a defined factor (e.g., the function value). For example, a UB of ERR, with respect to a communication device and the cell, can be determined (e.g., calculated) using the following Eq. (8):

$$UB = \min(D1 + TA*78m) \qquad \text{Eq. (8)}$$

of communication devices associated with (e.g., served by) the cell, wherein min can be the minimum function. From triangle inequality, it can be observed that ERR≤D1+D2≤D1+TA*78 m for any communication device associated with (e.g., served by) the cell, and ERR≤min(D1+TA*78 m). Also, D1+D1≥ERR for each communication device record observed.

With further regard to FIGS. 1 and 2, and with further regard to performing cell location validation 210, the validator component 124 can determine (e.g., calculate) the respective UBs of ERR associated with the respective communication devices (e.g., communication device 104, communication device 106, communication device 108, and/or another communication device) associated with the cell (e.g., cell 112, cell 114, or cell 116) based at least in part on (e.g., as a function of) respective first distances, respective D1s, and respective TA measurement data (and a defined distance factor) associated with the respective communication devices, as more fully described herein. The validator component 124 also can determine whether the respective UBs of ERR associated with a first portion of the respective communication devices in a first defined percentile (e.g., a bottom or lower end percentile, such as 1 percentile, or another desired percentile value) satisfy the first defined threshold distance associated with the first rule, in accordance with the defined cell attribute management criteria.

If the validator component 124 determines that the respective UBs of ERR associated with the first portion of the respective communication devices (e.g., communication device 104, communication device 106, and/or communication device 108, . . . , if in the first portion) in the first defined percentile satisfy the first defined threshold distance (e.g., 150 meters, or other desired distance greater than or less than 150 meters) associated with a first rule of the set of rules, in accordance with the defined cell attribute management criteria, the validator component 124 can determine that the potential (e.g., recorded or estimated) location of the cell is good and can flag the potential location of the cell as being good (or with a similar flag, such as an accurate flag).

If, instead, the validator component 124 determines that one or more of the respective UBs of ERR associated with the first portion of the respective communication devices (e.g., communication device 104, communication device 106, and/or communication device 108, . . . , if in the first portion) in the first defined percentile do not satisfy the first defined threshold distance associated with the first rule, the validator component 124 can determine that the potential location of the cell (e.g., cell 112, cell 114, or cell 116) is not to be labeled or flagged as good and is not to be tagged as accurate. The validator component 124 also can determine that further analysis is to be performed to facilitate determining whether the potential cell location is to be flagged as fine, is to be flagged as bad, or is to be flagged as uncertain, based at least in part on one or more of the rules (e.g., first rule, second rule, and/or third rule) of the set of rules.

If the validator component 124 determines that the first rule is not satisfied with regard to the UB of ERR, the validator component 124 can analyze (e.g., compare) the respective DDs associated with a second portion of the respective communication devices (e.g., communication device 104, communication device 106, and/or communication device 108, . . . , if in the second portion) in a second defined percentile (e.g., another lower end percentile, such as the $25^{th}$ percentile, which can be the bottom 25% of the respective DDs associated with the respective communication devices, or another desired lower end percentile value) satisfy the second defined threshold distance associated with the second rule. Based at least in part on the analysis results, the validator component 124 can determine whether the respective DDs associated with the second portion of the respective communication devices in the second defined percentile satisfy (e.g., are less than or equal to) the second defined threshold distance associated with the second rule. In accordance with various embodiments, the second defined threshold distance can be the same as the first defined threshold distance (e.g., 150 meters (or other desired distance)) or can be different from the first defined threshold distance, as indicated or specified by the defined cell attribute management criteria.

In some embodiments, if the validator component 124 determines that the respective DDs associated with the second portion of the respective communication devices in the second defined percentile satisfy the second defined threshold distance associated with the second rule, the validator component 124 can perform further analysis to facilitate validating the location of the cell (e.g., cell 112, cell 114, or cell 116). For instance, the validator component 124 can perform a cross validation of the estimated location of the cell and (e.g., vis-à-vis, or in relation to) one or more recorded locations of the cell obtained from one or more data sources (e.g., and stored in the CLAPC 118). Whether the validator component 124 flags a potential (e.g., estimated or recorded) cell location of the cell as good or fine can be determined based at least in part on such cross validation.

For example, for the cell (e.g., cell 112, cell 114, or cell 116), the validator component 124 can determine a difference between a recorded cell location (R) obtained from a data source (e.g., for each recorded cell location for each data source) and the estimated cell location (E) of the cell (wherein such difference also can be referred to as D_RE). Since the estimator component 122 (e.g., employing the ML engine) can estimate the cell location based on network measurements (e.g., TA measurement data, AGPS or GPS data), the estimated cell location can be independent of the cell location(s) recorded in another data source(s) (e.g., as stored in the cell location and azimuth pool in the CLAPC 118). If D_RE is sufficiently small (e.g., less than a defined threshold distance), it can be relatively good evidence that both the estimated location of the cell and the recorded location of the cell from the data source are both reliable (e.g., sufficiently accurate in establishing the location of the cell).

The validator component 124 can determine the distance between a recorded location of the cell (e.g., cell 112, cell 114, or cell 116) and the estimated location of the cell, wherein the recorded location can be obtained, for example, from the CLAPC 118, and wherein can perform such a D_RE determination with regard to one or more recorded locations (e.g., recorded locations that can be obtained from one or more data sources), as stored in the CLAPC 118. With regard to each of the one or more D_REs and the associated one or more recorded locations, the validator component 124 can compare the distance between the recorded location and the estimated location of the cell to the first defined threshold distance (e.g., 150 meters, or other desired distance greater than or less than 150 meters), which can be indicated or specified by the first rule of the set of rules, in accordance with the defined cell attribute management criteria. Based at least in part on the results of the comparison, the validator component 124 can determine whether the distance between the recorded location and the estimated location of the cell (the D_RE) satisfies the first defined threshold distance associated with the first rule.

If the validator component 124 determines that the distance between the recorded location and the estimated location of the cell (the D_RE) satisfies the first defined threshold distance, based on such determination and the determination that the first rule is satisfied with regard to the UB of ERR, the validator component 124 can determine that the recorded location and the estimated location are good and can flag the recorded location and the estimated location as good. If the recorded location and the estimated location of the cell are determined to be good and flagged as good, the cell location validation 210 can be complete with regard to that particular cell.

If the validator component 124 determines that the distance between the recorded location and the estimated location of the cell (the D_RE) does not satisfy (e.g., is not less than or equal to) the first defined threshold distance, in accordance with the first rule, the validator component 124 can determine that the potential (e.g., recorded or estimated) location of the cell (e.g., cell 112, cell 114, or cell 116) is fine (e.g., not sufficiently accurate, but not bad or uncertain either) and can flag that particular cell location as fine (or acceptable, or with another descriptive term that can indicate fine or acceptable).

With further regard to the DDs, if, instead, the validator component 124 determines that one or more of the respective DDs associated with the second portion of the respective communication devices (e.g., communication device 104, communication device 106, and/or communication device 108, . . . , if in the second portion) in the second defined percentile do not satisfy the second defined threshold distance associated with the second rule, the validator component 124 can determine that the potential location of the cell is not to be labeled or flagged as fine. The validator component 124 also can determine that further analysis is to be performed to facilitate determining whether the potential cell location is to be flagged as bad (or with another similar term that can indicate bad or unacceptable) or is to be flagged as uncertain, based at least in part on another rule (e.g., third rule) of the set of rules.

In response to determining that the potential location (e.g., recorded location, or estimated location) of the cell (e.g., cell 112, cell 114, or cell 116) is not to be labeled or flagged as fine (or good), the validator component 124 can determine the number of communication devices in the second portion of communication devices in the second defined percentile, based at least in part on the analysis results. Further, based at least in part on the analysis results, the validator component 124 can determine whether the number of communication devices in the second portion of communication devices in the second defined percentile satisfies (e.g., meets or exceeds) the defined threshold number (e.g., 30 or other desired number less than or greater than 30) of communication devices associated with the third rule. The defined threshold number can be indicated or specified by the defined cell attribute management criteria.

If the validator component 124 determines that the respective DDs associated with the second portion of the respective communication devices in the second defined percentile satisfy the second defined threshold distance associated with the second rule, the validator component 124 can determine that the potential (e.g., recorded or estimated) location of the cell (e.g., cell 112, cell 114, or cell 116) is bad or unacceptable, and can flag the potential location of the cell as being bad or unacceptable. If, instead, the validator component 124 determines that the number of communication devices in the second portion of communication devices in the second defined percentile does not satisfy (e.g., is not greater than or equal to) the defined threshold number associated with the third rule, the validator component 124 can determine that the potential location of the cell is to be flagged as uncertain.

The validator component 124, by determining the UBs of ERR and the DDs at cell level, as opposed to node level, can identify instances where a cell, while associated with a node, is not necessarily located at the node or co-located with other cells associated with (e.g., co-located at) the node. Thus, even though the CAMC 120 estimates the location of the node and, accordingly, estimates the locations of the cells associated with the node (e.g., at node level), the validator component 124 can determine whether one or more of the cells are not actually co-located with the node and other cells, to facilitate desirably (e.g., accurately, or at least more accurately) determine the respective locations of respective cells associated with the node, and desirably (e.g., accurately) determine the validation status(es) of one or more potential (e.g., estimated or recorded) locations of each cell.

With the cell location validation 210 performed, with regard to each cell (e.g., cell 112, cell 114, or cell 116) of each node, based at least in part on the results of the cell location validation 210, the validator component 124 can perform cell location tagging 212 to tag the one or more locations (e.g., estimated cell location, and/or one or more recorded cell locations) of the cell with an appropriate tag (e.g., tag that can correspond to the cell location validation result and associated flag), in accordance with the cell attribute management criteria. For instance, if the validator component 124 determines that a particular cell location (e.g., an estimated cell location, or a recorded cell location from a particular data source) is sufficiently accurate and flags that particular cell location as good (or accurate, or with another descriptive term that indicates good or accurate), the validator component 124 can tag that particular cell location as accurate (or with another suitably equivalent term), wherein, for example, the validator component 124 can assign or associate (e.g., link) a tag of accurate (or another suitably equivalent term) to or with the particular cell location. If the validator component 124 determines that a particular cell location is fine (e.g., not sufficiently accurate, but not bad or uncertain either) and flags that particular cell location as acceptable (or fine, or with another descriptive term that indicates fine or acceptable), the validator component 124 can tag that particular cell location as acceptable (or with another suitably equivalent term), wherein, for example, the validator component 124 can assign or associate (e.g., link) a tag of acceptable (or another suitably equivalent term) to or with that particular cell location. In some embodiments, with regard to a particular cell (e.g., cell 112), the validator component 124 can determine and select the best (e.g., most accurate) cell location and associated best data source of all of the cell locations and associated data sources (e.g., estimated cell location from the estimator component 122, and all of the one or more recorded cell locations from one or more data sources) for the particular cell, and can flag that best cell location and associated best data source as fine and tag them as acceptable (or with another descriptive term that indicates fine or acceptable).

If the validator component 124 determines that a particular cell location is bad (e.g., not sufficiently accurate or acceptable, and not uncertain) and flags that particular cell location as bad (or inaccurate, or with another descriptive term that indicates bad), the validator component 124 can tag that particular cell location as inaccurate (or with another suitably equivalent term), wherein, for example, the validator component 124 can assign or associate (e.g., link) a tag of inaccurate (or another suitably equivalent term) to or with that particular cell location. In some embodiments, if with regard to a particular cell (e.g., cell 112), the validator component 124 determines that all of the data sources (e.g., estimated cell location from the estimator component 122, and all of the one or more recorded cell locations from one or more data sources) are bad, the validator component 124 can tag all of those cell locations and associated data sources as being inaccurate (or with another suitably equivalent term). If the validator component 124 determines that a particular cell location is uncertain (e.g., there is not enough certainty to indicate whether the cell location is accurate, acceptable, or bad) and flags that particular cell location as uncertain (or with another descriptive term that indicates uncertain), the validator component 124 can tag that particular cell location as uncertain (or with another suitably equivalent term), wherein, for example, the validator component 124 can assign or associate (e.g., link) a tag of uncertain (or another suitably equivalent term) to or with that particular cell location.

Based at least in part on the tag assigned to or associated with a particular cell location of a particular cell (e.g., cell 112, cell 114, or cell 116), the CAMC 120 (e.g., the validator component 124 or another component of the CAMC 120) can initiate a cell location investigation 214, a cell location lock 216, or a cell monitoring request 218, with respect to the particular cell location of the particular cell. For instance, for a particular cell location (e.g., cell 112), if the validator component 124 associates a tag of inaccurate with the particular cell location, the CAMC 120 can initiate a cell location investigation to have an investigation (e.g., a manual investigation on map, or a physical visit to the particular cell) performed to try to determine the true location of the cell, as indicated by cell location investigation 214 of the cell location and azimuth estimation and validation process 200. For example, as part of a cell location investigation to investigate a location of a particular cell, a manual or an automated investigation on map can be performed (e.g., manually or by the CAMC 120) by plotting a UE traffic heatmap on a map and plotting the estimated location (e.g., ML estimated location) and recorded cell location(s) of a data source(s) on the map, with respect to the particular cell. If the estimated location is determined to be significantly closer to the UE population (e.g., from the UE traffic heatmap) than the recorded location(s) of the data source(s), it can indicate or suggest that the data source(s) is an issue (e.g., indicate that the data source(s) is in error).

Figure 6:
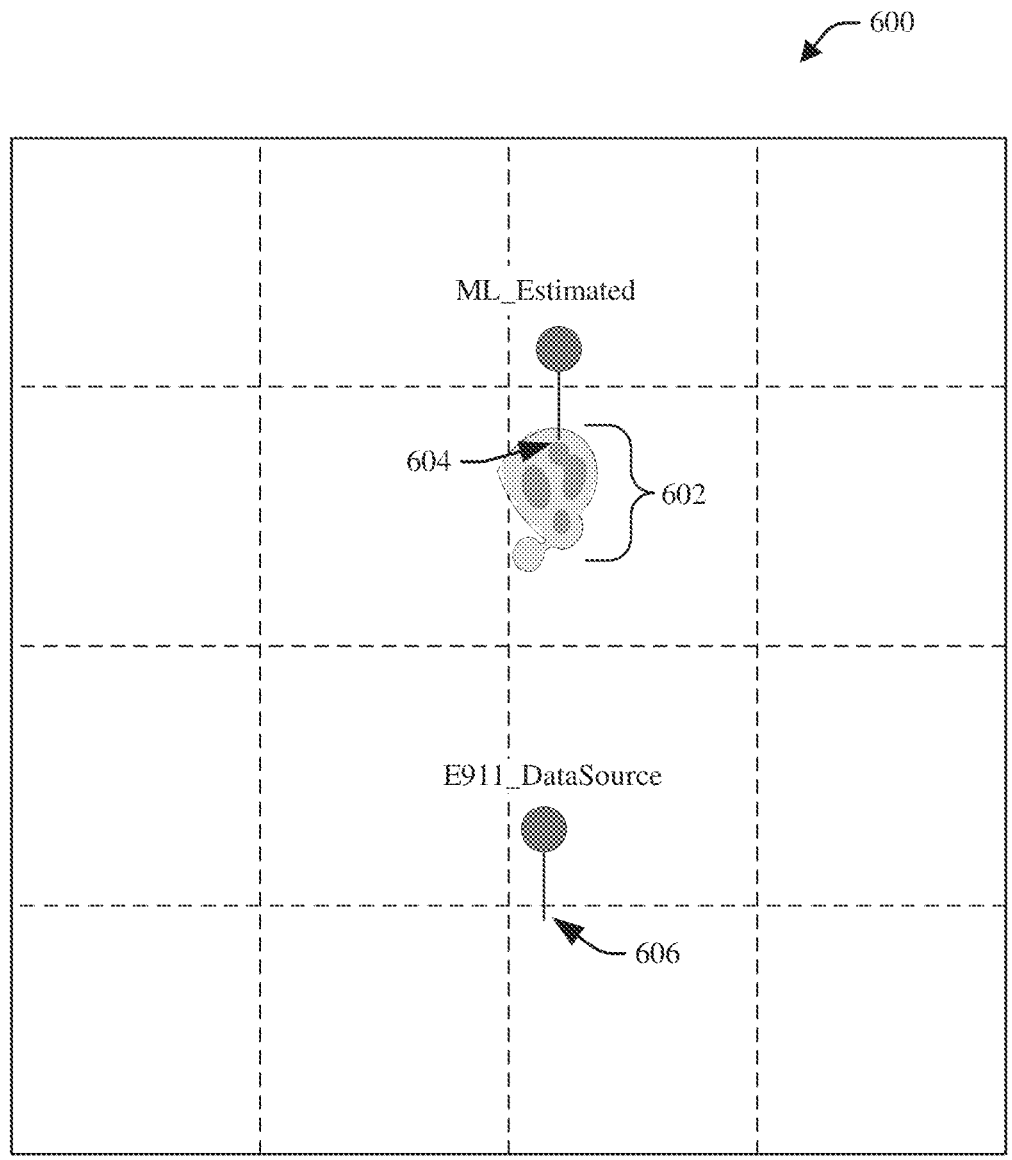
FIG. 6 presents a diagram of an example map plot that can include a UE traffic heatmap, an estimated location of a cell, and a recorded location of the cell that are plotted on the map, in accordance with various aspects and embodiments of the disclosed subject matter.

Referring briefly to FIG. 6 (along with FIGS. 1 and 2), FIG. 6 presents a diagram of an example map plot 600 that can include a UE traffic heatmap, an estimated location of a cell, and a recorded location of the cell that are plotted on the map, in accordance with various aspects and embodiments of the disclosed subject matter. The map plot 600 can be of an example geographical area (e.g., geographical area near a city). The CAMC 120 (or another component of or associated the system 100) can plot a UE traffic heatmap on the map plot 600, wherein the UE traffic heatmap can present the population or distribution of UEs 602 (e.g., communication devices) that are determined to have been associated with the cell. The CAMC 120 (or another component of or associated the system 100) also can plot the estimated cell location 604 of the cell on the map plot 600. Further, the CAMC 120 (or another component of or associated the system 100) can plot a recorded cell location 606 (e.g., E911_DataSource) of the cell on the map plot 600, wherein the recorded cell location 606 can be a cell location that has been obtained from a data source and has been recorded in (e.g., stored in) the cell location and azimuth pool of the CLAPC 118. The CAMC 120 (or another component of or associated the system 100) or a person can analyze the map plot 600 with the various plots (e.g., 602, 604, 606) thereon. If the CAMC 120 (or another component of or associated the system 100) or a person determines that the estimated cell location 604 is significantly closer to the population or distribution of UEs 602 than the recorded cell location 606 on the map plot 600 (as depicted in the map plot 600), the CAMC 120 (or another component of or associated the system 100) or the person can determine that the plots (e.g., 602, 604, 606) on the map plot 600 indicate that there may be an issue with the recorded cell location 606 of the data source. Alternatively, if the CAMC 120 (or another component of or associated the system 100) or a person determines that the estimated cell location 604 is significantly further away from the population or distribution of UEs 602 than the recorded cell location 606 on the map plot 600, the CAMC 120 (or another component of or associated the system 100) or the person can determine that the plots (e.g., 602, 604, 606) on the map plot 600 indicate that there may be an issue with the estimated cell location 604. In this alternative instance, the estimated cell location 604 being located significantly further away from the population or distribution of UEs 602 than the recorded cell location 606 can indicate, for example, that the antenna associated with the cell or node may be located at a different location than the base station tower associated with the cell or node.

An additional or an alternative approach to the manual investigation on map can be to perform a physical visit (e.g., by a person or a device, such as a drone device) to the estimated cell location (e.g., estimated ML location) and the recorded cell location(s) of the data source(s) obtained from the CLAPC 118 to determine which, if any, of the estimated cell location or the recorded cell location(s) is the accurate (e.g., true) location of the cell. A physical visit to the estimated cell location and recorded cell location(s) of a cell can be more expensive (e.g., more expensive financially, more time consuming, more resource intensive, and/or otherwise more expensive) than performing a manual investigation on map with regard to the cell. However, it may be desirable to perform such physical visits with regard to some cells (e.g., a relatively small amount of cells). Major cells typically can be validated with the assistance of the map and UE traffic distribution.

For a particular cell, based at least in part on the results of the manual investigation on map or the physical visit, the CAMC 120 (or another component of or associated the system 100) or the person can update the cell location pool of the CLAPC 118 to store the cell location of the cell as determined from the results of the manual investigation on map or the physical visit, as indicated at reference numeral 220 of the cell location and azimuth estimation and validation process 200.

With further regard to FIGS. 1 and 2, in response to determining that a particular location (e.g., estimated cell location or a particular recorded cell location of a particular data source) of a cell is accurate (e.g., sufficiently accurate) and is tagged as accurate, the CAMC 120 can initiate a cell location lock 216 and can lock or facilitate locking the particular cell location and particular cell with an accurate tag (e.g., or tag them with an equivalent term, such as good) to prevent the particular cell location from being undesirably (e.g., inadvertently or incorrectly, or unexpectedly) changed in the cell location and azimuth pool (e.g., 208) of the CLAPC 118. The CAMC 120 can update the cell location and azimuth pool (e.g., 208) of the CLAPC 118 to include the particular location of the cell (e.g., validated location data associated with the validated location of the cell), which was determined to be accurate, the cell identifier that can identify the particular cell, the lock tag, and/or other desired information regarding the cell in the cell location and azimuth pool (e.g., 208) of the CLAPC 118, as indicated at reference numeral 222 of the cell location and azimuth estimation and validation process 200.

In some embodiments, in response to determining that a certain location (e.g., estimated cell location or a certain recorded cell location of a certain data source) of a certain cell is uncertain and is tagged as uncertain, the CAMC 120 can initiate the cell monitoring request 218 to have the certain cell monitored for a desired (e.g., longer) period of time to collect data (e.g., location-related data) relating to the certain cell (e.g., as indicated at reference numeral 202) and have further analysis performed on such data (e.g., by the CAMC 120). For example, based at least in part on the cell monitoring request 218, instead of collecting data for a relatively short time period (e.g., one day), as indicated at reference numeral 202, the CAMC 120 can collect data (e.g., location-related data) associated with the certain cell for a relatively longer time period (e.g., one week, one month, or other desired period of time that is longer than the short time period) to facilitate obtaining a desired amount of sample data points (e.g., data points of location-related data) for the certain cell. Collecting such data for a relatively longer period of time can be useful, for example, with regard to cells (e.g., cells in a rural area) that may be associated with a sparse number of communication devices or sparse use by communication devices.

With regard to any cell for which the location of the cell has been validated (e.g., validated as accurate or good), the CAMC 120, employing the estimator component 122, can perform cell azimuth estimation to estimate an azimuth of the cell (e.g., cell 112, cell 114, or cell 116) based at least in part on an analysis of validated location data associated with the validated location of the cell and respective location data associated with respective communication devices (e.g., communication device 104, communication device 106, communication device 108, and/or other communication device) associated with the cell, as indicated at reference numeral 224 of the cell location and azimuth estimation and validation process 200. The estimator component 122 can receive the validated location data associated with the cell (e.g., cell 112, cell 114, or cell 116) from the validator component 124 (e.g., after or in connection with performance of the cell location lock 216), or from the cell location and azimuth pool (e.g., 208) of the CLAPC 118 (e.g., after the validator component 124 stores the validated location data of the cell in the cell location and azimuth pool (e.g., 208) of the CLAPC 118.

In some embodiments, to facilitate enhancing the accuracy of the estimation of the azimuth of the validated cell (e.g., cell 112), the estimator component 122 can filter the respective location data associated with the respective communication devices (e.g., communication device 104, communication device 106, communication device 108, and/or other communication device) associated with the cell to remove outlier location data associated with outlier communication devices that are determined to be too close to or too far away from the cell based at least in part on respective defined threshold distance values in relation to the validated location of the cell, in accordance with the defined cell attribute management criteria. In certain embodiments, the estimator component 122 can determine or set the respective defined threshold distances (e.g., first threshold distance and second threshold distance) based at least in part on the number of communication devices associated with the cell to facilitate removing a desired number or percentage (e.g., 10% or other desired percentage greater or less than 10%) of communication devices that are determined to be located closest in distance to the cell relative to the other communication devices and removing a desired number or percentage (e.g., 10% or other desired percentage greater or less than 10%) of communication devices that are determined to be located furthest away in distance from the cell relative to the other communication devices, in accordance with the defined cell attribute management criteria.

For instance, the estimator component 122 can determine the respective locations of the respective communication devices associated with the validated cell (e.g., cell 112) based at least in part on the results of analyzing the validated location data associated with the cell and the respective location data associated with the respective communication devices (e.g., communication device 104, communication device 106, communication device 108, and/or other communication device). The estimator component 122 can remove first location data associated with a first subgroup of communication devices determined to be located within the first threshold distance of the validated cell location of the validated cell (e.g., cell 112). The estimator component 122 also can remove second location data associated with a second subgroup of communication devices determined to be located more than the second threshold distance away from the validated cell location of the validated cell (e.g., cell 112). Accordingly, the estimator component 122 can remove the first and second subgroups of communication devices from further consideration in estimating the azimuth of the validated cell (e.g., cell 112).

It is to be appreciated and understood that, in other embodiments, the estimator component 122 can determine the first and second threshold distances without considering the number or percentage of communication devices associated with the cell and/or can determine which communication devices are to be considered outlier communication devices that are too close or too far away from the cell, as otherwise provided for by the defined cell attribute management criteria.

With regard to the remaining (e.g., third) subgroup of communication devices associated with the cell (e.g., cell 112) after filtering to remove the outlier communication devices, the estimator component 122 can determine (e.g., calculate) respective cell-to-device azimuths associated with the respective communication devices of the remaining subgroup of communication devices based at least in part on the results of the analysis of the validated location data associated with the validated cell location of the cell (e.g., cell 112) and the respective location data associated with the respective locations of the respective communication devices of the remaining subgroup of communication devices. For instance, as part of the analysis of the validated location data and respective location data, for each communication device in the remaining subgroup, the estimator component 122 can determine a cell-to-device azimuth associated with a communication device (e.g., communication device 104) by determining the location of the communication device in relation to the validated location of the cell (e.g., cell 112) and an angular distance between a reference direction (e.g., north, which can be considered 0 degrees) extending from the validated cell location and the angle of the direction where the communication device is located in relation to the reference direction and the cell location.

It is noted that the azimuth of 0 degrees also can be equal to 360 degrees, and, in some instances, there can be communication devices located to the left of the reference direction (e.g., to the left of 0 degrees, such as being located between 270 degrees and 360 degrees (or 0 degrees)) and to the right of the reference direction (e.g., to the right of 0 degrees, such as being located between 0 degrees and 90 degrees). To account for this, in some embodiments, the estimator component 122 can adjust the cell-to-device azimuth to determine (e.g., calculate) an adjusted cell-to-device azimuth for communication devices to account for 0 degrees also being equal to 360 degrees such that the respective cell-to-device azimuths of the respective communication devices of the remaining subgroup can form a continuous range of cell-to-device azimuths. For example, if a first communication device (e.g., 104) is located at 345 degrees in relation to the validated cell (e.g., cell 112) and the reference direction (e.g., 0 degrees=360 degrees), a second communication device (e.g., 106) is located at 355 degrees in relation to the validated cell and the reference direction, and a third communication device (e.g., 108) is located at 20 degrees in relation to the validated cell and the reference direction, the estimator component 122 can adjust the cell-to-device azimuth of the third communication device to be 360 degrees+20 degrees=380 degrees to form a continuous range of cell-to-device azimuths that can span from 345 degrees to 380 degrees with regard to those three communication devices. If the locations of the communication devices are such that the communication devices are all located at points (e.g., 10 degrees, 20 degrees, and 25 degrees) to the right of the reference direction (e.g., to the right of 0 degrees), the estimator component 122 can determine that the cell-to-device azimuths associated with such communication devices do not have to be adjusted. It can be desirable to utilize a continuous range of cell-to-device azimuths to facilitate estimating the azimuth of a cell and/or validating the azimuth of a cell, as more fully described herein.

In certain embodiments, to facilitate desirably (e.g., efficiently, suitably, or optimally) adjusting cell-to-device azimuths associated with communication devices, the estimator component 122 can determine and select a desired (e.g., suitable or optimal) cell-to-device azimuth of the cell-to-device azimuths associated with a cell (e.g., cell 112) to be a reference azimuth, and one or more of the other cell-to-device azimuths can be adjusted (if any adjustment is to be made) in relation to the reference azimuth. For instance, with regard to a group of cell-to-device azimuths associated with a cell (e.g., cell 112), the estimator component 122 can determine or identify a cell-to-device azimuth of the group of cell-to-device azimuths that is located in an area where a highest concentration of cell-to-device azimuths are located, and can select that cell-to-device azimuth to be the reference azimuth with respect to the group of cell-to-device azimuths for purposes of adjusting cell-to-device azimuths.

In some embodiments, with regard to the group of cell-to-device azimuths associated with a cell (e.g., cell 112), the estimator component 122 can determine a reference azimuth for the group of cell-to-device azimuths as, or based at least in part on (e.g., as a function of), the mode of floor(cell-to-device azimuth/10)*10. For example, if a first communication device has a cell-to-device azimuth at 10 degrees, a second communication device has a cell-to-device azimuth at 12 degrees, a third communication device has a cell-to-device azimuth at 13 degrees, a fourth communication device has a cell-to-device azimuth at 21 degrees, a fifth communication device has a cell-to-device azimuth at 22 degrees, a sixth communication device has a cell-to-device azimuth at 341 degrees, a seventh communication device has a cell-to-device azimuth at 352 degrees, and an eighth communication device has a cell-to-device azimuth at 358 degrees, the estimator component 122 can divide the respective cell-to-device azimuths by 10 and round to the nearest value, and can determine respective subgroupings of cell-to-device azimuths associated with the respective values. In this example, after calculating and rounding, the first, second, and third cell-to-device azimuths can be grouped in a first subgroup (e.g., since they all have a rounded value of 1.0, which can represent 10 degrees), the fourth and fifth cell-to-device azimuths can be grouped in a second subgroup (e.g., since they have a rounded value of 2.0, which can represent 20 degrees), the sixth cell-to-device azimuth can be in its own subgroup (e.g., third subgroup, which can be associated with 340 degrees), the seventh cell-to-device azimuth can be in its own subgroup (e.g., fourth subgroup, which can be associated with 350 degrees), and the eighth cell-to-device azimuth can be in its own subgroup (e.g., fifth subgroup, which can be associated with 0 or 360 degrees). Since the first subgroup has the most members (e.g., most cell-to-device azimuths) relative to the other subgroups, the estimator component 122 can determine that the reference azimuth is to be selected from the first subgroup, and can select the cell-to-device azimuth at 10 degrees associated with the first communication device as the reference azimuth. The estimator component 122 can adjust cell-to-device azimuths associated with the other communication devices, as appropriate, in relation to the reference azimuth at 10 degrees. For instance, since the reference azimuth is 10 degrees, the estimator component 122 can determine that the cell-to-device azimuths (e.g., 12, 13, 21, and 22 degrees, respectively) associated with the second, third, fourth, and fifth communication devices do not have to be adjusted in relation to the reference azimuth of 10 degrees. The estimator component 122 can determine that the cell-to-device azimuths (e.g., 341, 352, and 358 degrees, respectively) associated with the sixth, seventh, and eighth communication devices are to be adjusted in relation to the reference azimuth of 10 degrees, wherein the estimator component can adjust 341 degrees associated with the sixth communication device to be −19 degrees (or a difference of 29 degrees (e.g., 10 degrees+abs(−19 degrees) between the cell-to-device azimuth associated with the first communication device and the cell-to-device azimuth associated with the sixth communication device), adjust 352 degrees associated with the seventh communication device to be −8 degrees (or a difference of 18 degrees (e.g., 10 degrees+abs(−8 degrees)) between the cell-to-device azimuth associated with the first communication device and the cell-to-device azimuth associated with the seventh communication device), and adjust 358 degrees associated with the eighth communication device to be −2 degrees (or a difference of 12 degrees (e.g., 10 degrees+abs(−2 degrees)) between the cell-to-device azimuth associated with the first communication device and the cell-to-device azimuth associated with the eighth communication device).

Figure 7:
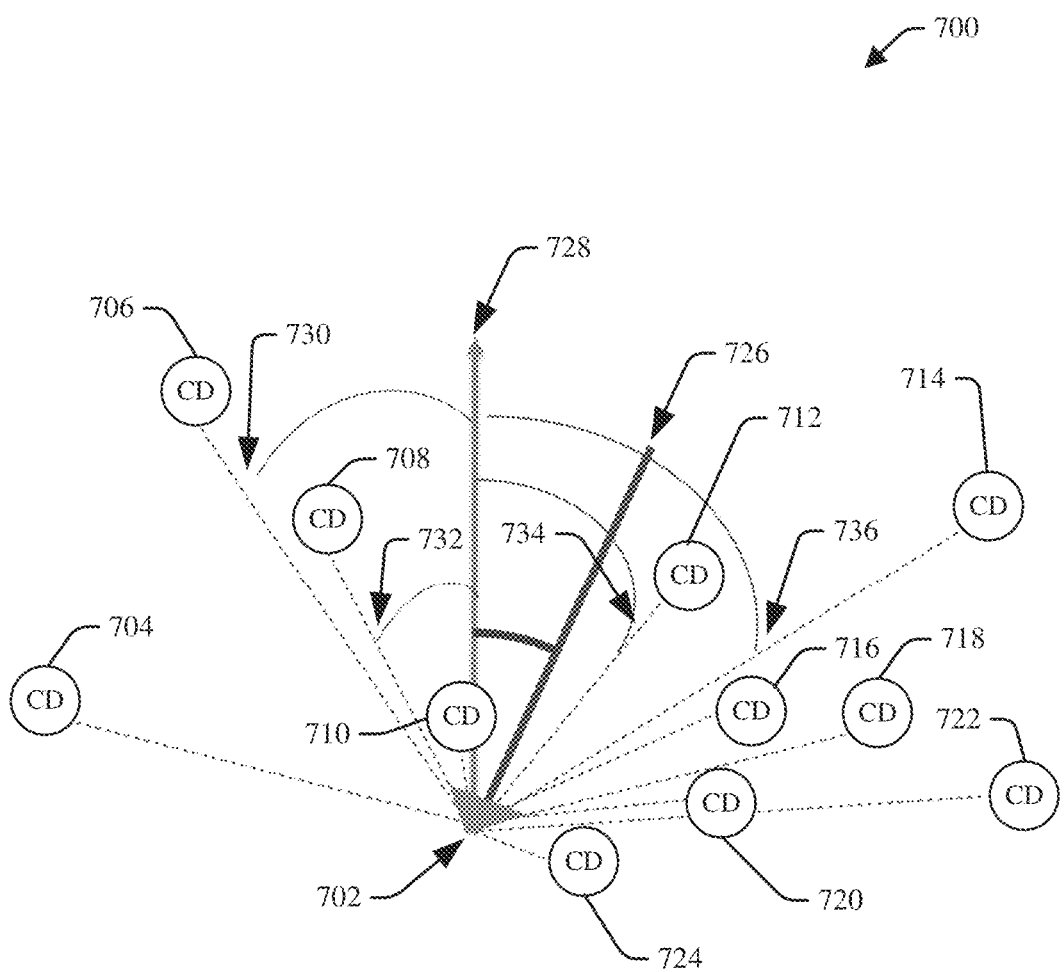
FIG. 7 depicts a diagram of an example map plot of locations of communication devices in relation to a validated cell location of a cell to facilitate illustrating determination and/or adjustment of cell-to-device azimuths of the communication devices, in accordance with various aspects and embodiments of the disclosed subject matter.

Referring to FIG. 7 (along with FIGS. 1 and 2), FIG. 7 depicts a diagram of an example map plot 700 of locations of communication devices in relation to a validated cell location of a cell to facilitate illustrating determination and/or adjustment of cell-to-device azimuths of the communication devices, in accordance with various aspects and embodiments of the disclosed subject matter. The example map plot 700 can comprise, for example, a cell 702 at a validated cell location, and various communication devices, such as communication devices 704, 706, 708, 710, 712, 714, 716, 718, 720, 722, and 724, associated with the cell 702 and located in respective locations in relation to the cell 702, as depicted on the example map plot 700. Any outlier communication devices already have been removed from consideration and are not included in the map plot 700. The cell 702 can have a true (e.g., actual) azimuth 726 in relation to a reference direction 728 (e.g., north, which can be at 0 degrees=360 degrees), as depicted in the example map plot 700.

The estimator component 122 can analyze the validated location data of the cell 702, the respective location data of the respective communication devices 704, 706, 708, 710, 712, 714, 716, 718, 720, 722, and 724, and the reference direction 728. Based at least in part on the results of such analysis, the estimator component 122 can determine (e.g., calculate) respective cell-to-device azimuths or adjusted cell-to-device azimuths of the respective communication devices 704, 706, 708, 710, 712, 714, 716, 718, 720, 722, and 724 in relation to the reference direction 728, wherein the respective cell-to-device azimuths or adjusted cell-to-device azimuths can comprise, for example, cell-to-device azimuths 730, 732, 734, and 736. Since, for example, the cell-to-device azimuth 730 associated with communication device 706 and the cell-to-device azimuth 732 associated with communication device 708 are located to the left of the reference direction 728, and the cell-to-device azimuth 734 associated with communication device 712 and the cell-to-device azimuth 736 associated with communication device 714 (and the cell-to-device azimuths of communication devices 716, 718, 720, 722, and 724) are located to the right of the reference direction 728, the estimator component 122 can adjust the cell-to-device azimuths 734 and 736 (as well as the cell-to-device azimuths associated with communication devices 716, 718, 720, 722, and 724) to form a continuous range of cell-to-device azimuths with regard to the communication devices 704, 706, 708, 710, 712, 714, 716, 718, 720, 722, and 724. For example, if the cell-to-device azimuth 734 associated with communication device 712 is 40 degrees, and if the cell-to-device azimuth 736 associated with communication device 716 is 50 degrees, the estimator component 122 can adjust the cell-to-device azimuth 734 to be 400 degrees (e.g., 360 degrees+40 degrees=400 degrees), and adjust the cell-to-device azimuth 736 to be 410 degrees (e.g., 360 degrees+50 degrees=410 degrees). Also, if the cell-to-device azimuth 730 associated with communication device 706 is −30 degrees, and if the cell-to-device azimuth 732 associated with communication device 708 is −25 degrees, the estimator component 122 can adjust the cell-to-device azimuth 730 to be 330 degrees (e.g., 360 degrees−30 degrees=330 degrees), and adjust the cell-to-device azimuth 732 to be 335 degrees (e.g., 360 degrees−25 degrees=335 degrees).

Figure 8:
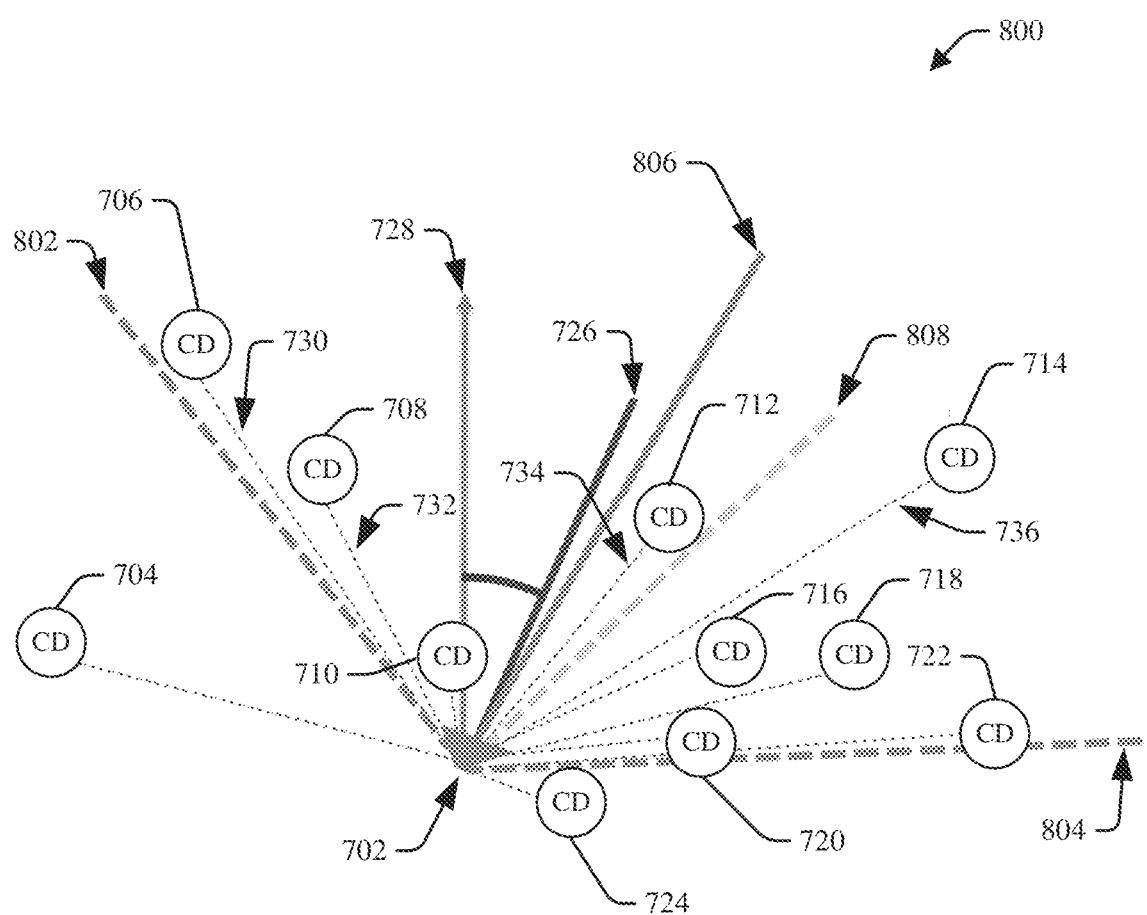
FIG. 8 depicts a diagram of another example map plot of locations of communication devices in relation to a validated cell location of a cell to facilitate illustrating estimation of an azimuth of the cell based at least in part on the cell-to-device azimuths of the communication devices associated with the cell, in accordance with various aspects and embodiments of the disclosed subject matter.

Turning to FIG. 8 (along with FIGS. 1, 2, and 7), FIG. 8 depicts a diagram of another example map plot 800 of locations of communication devices in relation to a validated cell location of a cell to facilitate illustrating estimation of an azimuth of the cell based at least in part on the cell-to-device azimuths of the communication devices associated with the cell, in accordance with various aspects and embodiments of the disclosed subject matter. The example map plot 800 can comprise, for example, the cell 702 at a validated cell location, and the various communication devices, such as communication devices 704, 706, 708, 710, 712, 714, 716, 718, 720, 722, and 724, associated with the cell 702 and located in respective locations in relation to the cell 702, as depicted on the example map plot 800, and as similarly depicted in the example map plot 700 of FIG. 7. Any outlier communication devices (e.g., communication devices that were too close to or too far away from the cell 702) already have been removed (e.g., filtered out) from consideration and are not included in the map plot 800. As described herein, the cell 702 can have a true (e.g., actual) azimuth 726 in relation to the reference direction 728, as depicted in the example map plot 800 (as well as in the example map plot 700).

The estimator component 122 can analyze the respective cell-to-device azimuths (e.g., including cell-to-device azimuths 730, 732, 734, and 736) of the respective communication devices 704, 706, 708, 710, 712, 714, 716, 718, 720, 722, and 724 (e.g., of the remaining subgroup of communication devices after filtering) associated with the cell 702, wherein certain cell-to-device azimuths (e.g., including cell-to-device azimuths 730, 732, 734, and/or 736) can be adjusted, such as described herein. Based at least in part on the results of such analysis, the estimator component 122 can determine (e.g., calculate or compute) a first (e.g., a lower) percentile of the respective cell-to-device azimuths of the respective communication devices 704, 706, 708, 710, 712, 714, 716, 718, 720, 722, and 724, and a second (e.g., a higher) percentile of the respective cell-to-device azimuths of the respective communication devices, in accordance with the defined cell attribute management criteria. The first percentile of the respective cell-to-device azimuths of the respective communication devices and the second percentile of the respective cell-to-device azimuths of the respective communication devices can be a desired (e.g., reasonable, suitable, enhanced, or optimal) azimuth interval (e.g., [p(10%), p(90%)]) determined or selected (e.g., by the estimator component 122) in accordance with the defined cell attribute management criteria. In some embodiments, the first percentile 802 can be a tenth percentile (e.g., p(10%)), and the second percentile 804 can be a ninetieth percentile (e.g., p(90%)), as depicted in the example map plot 800. In accordance with various embodiments, the first percentile can be in a first range that can extend from a fifth percentile (e.g., p(5%)) to a twentieth percentile (e.g., p(20%)), and the second percentile can be in a second range that can extend from an eightieth percentile (e.g., p(80%)) to a ninety-fifth percentile (e.g., p(95%)). In still other embodiments, the first percentile can be in a desirably lower value that can be lower than the fifth percentile (e.g., p(5%)) or higher than the twentieth percentile (e.g., p(20%)), and the second percentile can be in a desirably higher value that can be lower than the eightieth percentile (e.g., p(80%)) or higher than the ninety-fifth percentile (e.g., p(95%)). The estimator component 122 can determine or set the first percentile (e.g., 802) and the second percentile (e.g., 804) in accordance with (e.g., as indicated or specified by) the defined cell attribute management criteria. As can be observed in the example map plot 800, the cell-to-device azimuth of the communication device 704 can be located below the first percentile (e.g., p(10%)) and the cell-to-device azimuth of the communication device 724 can be located above the second percentile (e.g., p(90%)), with the other cell-to-device azimuths of the other communication devices 706, 708, 710, 712, 714, 716, 718, 720, and 722 being located between the first percentile and the second percentile.

In some embodiments, the estimator component 122 can estimate the azimuth of the cell 702 (e.g., can determine or calculate the estimated azimuth of the cell 702) based at least in part on (e.g., as a function of) the first percentile of the respective cell-to-device azimuths of the respective communication devices of the remaining subgroup of communication devices and the second percentile of the respective cell-to-device azimuths of the respective communication devices of the remaining subgroup of communication devices (e.g., the communication devices that can remain after filtering out the outliers, such as described herein). In certain embodiments, with regard to the remaining subgroup of communication devices 704, 706, 708, 710, 712, 714, 716, 718, 720, 722 and 724, the estimator component 122 can determine the estimated azimuth 806 of the cell 702 as being equal to a combination (e.g., the sum) of (first percentile (e.g., tenth percentile (p(10%)) or other lower percentile) of the respective cell-to-device azimuths of the respective communication devices plus the second percentile (e.g., ninetieth percentile (p(90%)) or other higher percentile) of the respective cell-to-device azimuths of the respective communication devices) divided by two (e.g., estimated azimuth of the cell equal to half of a combination (e.g., the sum) of (the first percentile plus the second percentile); or, with particular regard to the example map plot 800, the estimated azimuth (Est_azimuth) of the cell= ([p(10%)+p(90%)]/2)). The estimated azimuth 806 of the cell 702 thereby can be located halfway between the first percentile and the second percentile of the respective cell-to-device azimuths of the communication devices 704, 706, 708, 710, 712, 714, 716, 718, 720, 722 and 724. As can be observed from the example map plot 800, the estimated azimuth 806 of the cell 702 can be desirably accurate, as the estimated azimuth 806 is substantially close to the true azimuth 726 of the cell 702, and the estimated azimuth 806 can be more accurate than the median (e.g., fiftieth percentile (p(50%)) azimuth 808 determined (e.g., calculated) from the cell-to-device azimuths of the communication devices 704, 706, 708, 710, 712, 714, 716, 718, 720, 722, and 724 since those cell-to-device azimuths are not evenly distributed around cell azimuth 726, which can lead to the median azimuth 808 being skewed or tilted further to the right, and further away from, the true azimuth 726 associated with the cell 702 than the estimated azimuth 806 associated with the cell 702, in this particular example case presented in the example map plot 800.

With further regard to FIGS. 1 and 2, with regard to each cell (e.g., cell 112, cell 114, cell 116, and/or another cell), the CAMC 120, employing the validator component 124, can perform cell azimuth validation 226 to determine whether a recorded azimuth associated with a cell can be validated (e.g., validated or verified as accurate or good). With regard to each cell (e.g., cell 112, cell 114, cell 116, and/or another cell), the validator component 124 can receive estimated azimuth data associated with (e.g., representative of) the estimated azimuth associated with the cell, as determined through the cell azimuth estimation 224, from the estimator component 122 and cell azimuth information 228 (e.g., recorded cell azimuth data) relating to one or more recorded azimuths associated with the cell. The cell azimuth information 228 can be received from one or more data sources, such as described herein, or from the cell location and azimuth pool (e.g., 208) of the CLAPC 118, wherein the CAMC 120 can receive the cell azimuth information 228 from the one or more data sources and store the cell azimuth information 228 in the cell location and azimuth pool (e.g., 208) of the CLAPC 118.

As part of the cell azimuth validation 226, with regard to each recorded azimuth of the one or more recorded azimuths associated with the cell (e.g., cell 112, cell 114, cell 116, and/or another cell), the validator component 124 can determine (e.g., calculate) an azimuth difference between the estimated azimuth and the recorded azimuth associated with the cell based at least in part on the results of an analysis of the estimation azimuth data associated with (e.g., representative of) the estimated azimuth and the recorded cell azimuth data associated with the recorded azimuth.

With regard to each recorded azimuth of the one or more recorded azimuths associated with the cell (e.g., cell 112, cell 114, cell 116, and/or another cell), the validator component 124 can determine whether the azimuth difference between the estimated azimuth and the recorded azimuth associated with the cell is less than or equal to a defined threshold azimuth difference based at least in part on the results of comparing the azimuth difference to the defined threshold azimuth difference. The CAMC 120 can determine or select the defined threshold azimuth difference to apply, in accordance with the defined cell attribute management criteria.

With regard to each recorded azimuth of the one or more recorded azimuths associated with the cell (e.g., cell 112, cell 114, cell 116, and/or another cell), the validator component 124 can compare the recorded azimuth associated with the cell to the first percentile of the respective cell-to-device azimuths and the second percentile of the respective cell-to-device azimuths associated with the respective communication devices of the remaining subgroup of communication devices (e.g., communication device 104, communication device 106, communication device 108, and/or another communication device). For instance, the validator component 124 can compare the recorded azimuth (e.g., recorded cell azimuth data associated with the recorded azimuth) with the desired (e.g., reasonable, suitable, enhanced, or optimal) azimuth interval (e.g., [p(10%), p(90%)]), which can span from the first percentile to the second percentile. With regard to each recorded azimuth of the one or more recorded azimuths associated with the cell (e.g., cell 112, cell 114, cell 116, and/or another cell), based at least in part on the results of such comparison, the validator component 124 can determine whether the recorded azimuth associated with the cell is located within the desired azimuth interval (e.g., located between the first percentile of the respective cell-to-device azimuths and the second percentile of the respective cell-to-device azimuths associated with the respective devices of the remaining subgroup of devices).

With regard to each recorded azimuth of the one or more recorded azimuths associated with the cell (e.g., cell 112, cell 114, cell 116, and/or another cell), if the validator component 124 can determines that the azimuth difference is greater than (e.g., does not satisfy) the defined threshold azimuth difference and determines that the recorded azimuth associated with the cell is not located within the desired azimuth interval, the validator component 124 can determine that the recorded azimuth associated with the cell is invalid as being inaccurate. If, instead, the validator component 124 determines that the azimuth difference is less than or equal to (e.g., satisfies) the defined threshold azimuth difference or determines that the recorded azimuth associated with the cell is located within the desired azimuth interval, the validator component 124 can determine that the recorded azimuth associated with the cell at least potentially can be validated as accurate.

With regard to each recorded azimuth of the one or more recorded azimuths associated with the cell (e.g., cell 112, cell 114, cell 116, and/or another cell), the validator component 124 can analyze the validation-related results associated with the one or more recorded azimuths associated with the cell that potentially can be validated. If the validator component 124 determines that there is only one recorded azimuth associated with the cell and that recorded azimuth is determined to satisfy the defined threshold azimuth difference or be located within the desired azimuth interval, or determines that only one recorded azimuth of two or more recorded azimuths associated with the cell potentially can be validated, the validator component 124 can determine that the one recorded azimuth associated with the cell can be validated as accurate.

If, instead, from the analysis of the validation-related results, the validator component 124 determines that there are two or more recorded azimuths associated with the cell (e.g., cell 112, cell 114, cell 116, and/or another cell) that potentially can be validated, the validator component 124 can determine which recorded azimuth of the two or more recorded azimuths associated with the cell, and which potentially can be validated, is the most accurate recorded azimuth associated with the cell, based at least in part on the results of an analysis of the recorded cell azimuth data associated with the two or more recorded azimuths associated with the cell, the estimated azimuth data associated with the estimated azimuth of the cell, and/or the first percentile and the second percentile of the respective cell-to-device azimuths associated with the respective communication devices of the remaining subgroup of communication devices, in accordance with the defined cell attribute management criteria. For example, the validator component 124 can determine that the recorded azimuth of the two or more recorded azimuths associated with the cell (e.g., cell 112, cell 114, cell 116, and/or another cell) that has the smallest azimuth difference in relation to the estimated azimuth associated with the cell, as compared to the other recorded azimuth(s) of the two or more recorded azimuths, is the most accurate recorded azimuth associated with the cell. The validator component 124 can determine that the most accurate recorded azimuth is to be selected as the validated recorded azimuth associated with the cell.

With regard to each recorded azimuth of the one or more recorded azimuths associated with the cell (e.g., cell 112, cell 114, cell 116, and/or another cell), after the cell azimuth validation 226 has been performed, cell azimuth tagging 230 can be performed, wherein the validator component 124 can tag each of the one or more recorded azimuths as valid (e.g., valid, verified, accurate, or good), invalid (e.g., invalid, inaccurate, or bad), or as omni if the CAMC 120 determines that a cell is an omni cell, as determined to be appropriate from the results of the cell azimuth validation 226 or other analysis associated with the cell. For instance, with regard to each recorded azimuth associated with the cell that is determined to be invalid (if any), the validator component 124 can associate (e.g., apply, assign, or otherwise associate) an invalid tag (e.g., invalid, inaccurate, and/or bad tag) with the recorded azimuth. With regard to a recorded azimuth associated with the cell that is determined to be valid (if any), the validator component 124 can associate (e.g., apply, assign, or otherwise associate) a valid tag (e.g., valid, verified, accurate, and/or good tag) with the recorded azimuth. With regard to each recorded azimuth (if any) associated with the cell that is determined to be potentially valid, but not the most accurate recorded azimuth, in some embodiments, the validator component 124 can associate an invalid tag with the recorded azimuth, or in other embodiments, the validator component 124 can associate a "not validated" tag, "potentially valid," or other similar tag that can indicate that the recorded azimuth was accurate enough to at least be potentially valid, although not accurate enough to be validated.

With regard to each cell (e.g., cell 112, cell 114, cell 116, and/or another cell), if the validator component 124 determines that a particular recorded azimuth associated with the cell is validated (e.g., validated as accurate or good) and is tagged as validated, the CAMC 120 can initiate a cell azimuth lock 232 and can lock or facilitate locking the particular recorded azimuth and cell with a validated tag (e.g., a validated azimuth tag or other similar tag) to prevent the particular recorded azimuth from being undesirably (e.g., inadvertently or incorrectly, or unexpectedly) changed in the cell location and azimuth pool (e.g., 208) of the CLAPC 118. The CAMC 120 can update the cell location and azimuth pool (e.g., 208) of the CLAPC 118 to include azimuth information relating to the particular recorded azimuth associated with the cell (e.g., validated cell azimuth data representative of the validated recorded azimuth associated with the cell), which was determined to be validated, the cell identifier that can identify the particular cell, the validated tag (e.g., validated azimuth tag), the lock tag, and/or other desired information regarding the cell in the cell location and azimuth pool (e.g., 208) of the CLAPC 118, as indicated at reference numeral 234 of the cell location and azimuth estimation and validation process 200.

With regard to each cell (e.g., cell 112, cell 114, cell 116, and/or another cell), if the validator component 124 determines that no recorded azimuth associated with the cell can be validated (e.g., validated as accurate or good), the CAMC 120 can initiate a cell azimuth investigation 236 to have an investigation (e.g., a manual or automated investigation on map, or a physical visit to the particular cell) performed to try to determine the true azimuth of the cell, as indicated by the cell azimuth investigation 236 of the cell location and azimuth estimation and validation process 200. For example, as part of a cell azimuth investigation 236, a manual or an automated investigation on map can be performed (e g, manually or by the CAMC 120) to attempt to determine a validated cell azimuth associated with the cell. An additional or an alternative approach to the manual or automated investigation on map can be to perform a physical visit (e.g., by a person or a device, such as a drone device) to the validated cell location associated with the cell to determine which, if any, of the recorded cell azimuth or estimated cell azimuth is the accurate (e.g., true) azimuth of the cell or otherwise determine the accurate azimuth of the cell. A physical visit to the validated cell location of a cell to determine the accurate cell azimuth can be more expensive (e.g., more expensive financially, more time consuming, more resource intensive, and/or otherwise more expensive) than performing a manual or automated investigation on map with regard to the cell. However, it may be desirable to perform such physical visits with regard to some cells (e.g., a relatively small amount of cells). The CAMC 120 can store the results (e.g., information relating to validated cell azimuth) of the manual or automated investigation and/or physical visit to the validated cell location associated with the cell in the cell location and azimuth pool (e.g., 208) of the CLAPC 118, as indicated at reference numeral 238 of the cell location and azimuth estimation and validation process 200.

As described herein, there can be some cells (e.g., cell 112, cell 114, cell 116, and/or another cell) that are omni cells that can be omni-directional where the cell can communicate with communication devices in all or substantially all directions, as opposed to being uni-directional and only being able to communicate with communication devices located in a certain directional field with respect to the uni-directional cell based at least in part on the azimuth of the uni-directional cell. The CAMC 120 can determine whether a cell (e.g., cell 112, cell 114, cell 116, and/or another cell) is an omni cell or not based at least in part on the results of analyzing the respective location data of the respective communication devices (e.g., communication device 104, communication device 106, communication device 108, or other communication device) associated with the cell. If based at least in part on the results of such analysis, the CAMC 120 determines that the respective locations of the respective communication devices associated with the cell are more directional and do not at least substantially surround the cell, the CAMC 120 can determine that the cell is not an omni cell, and the CAMC 120 can proceed to attempt to validate a recorded azimuth associated with the cell. If, instead, based at least in part on the results of such analysis, the CAMC 120 determines that the respective locations of the respective communication devices associated with the cell surround or substantially surround the cell, the CAMC 120 can determine that the cell is an omni cell (e.g., omni-directional cell). If the CAMC 120 determines that a cell (e.g., cell 112, cell 114, cell 116, and/or another cell) is an omni cell, the CAMC 120 can determine that it may not be necessary or particularly relevant to determine or validate the azimuth (e.g., recorded azimuth(s)) of the cell, since the cell is omni-directional and can serve communication devices in any or virtually any direction in relation to the cell. Accordingly, with regard to an omni cell, the CAMC 120 can tag the recorded azimuth(s) (e.g., one or more recorded azimuths) associated with the cell and/or the cell as being omni (e.g., an omni tag), as indicated at the cell azimuth tagging 230, can lock the cell azimuth associated with the cell to indicate the cell is an omni cell, as indicated at the cell azimuth lock 232, and can update the cell location and azimuth pool (e.g., 208) of the CLAPC 118 to include azimuth or cell information relating to the cell (e.g., cell data and/or cell azimuth data), the cell identifier that can identify the particular cell, the omni tag, the lock tag, and/or other desired information regarding the cell in the cell location and azimuth pool (e.g., 208) of the CLAPC 118, as indicated at reference numeral 234.

Figure 9:
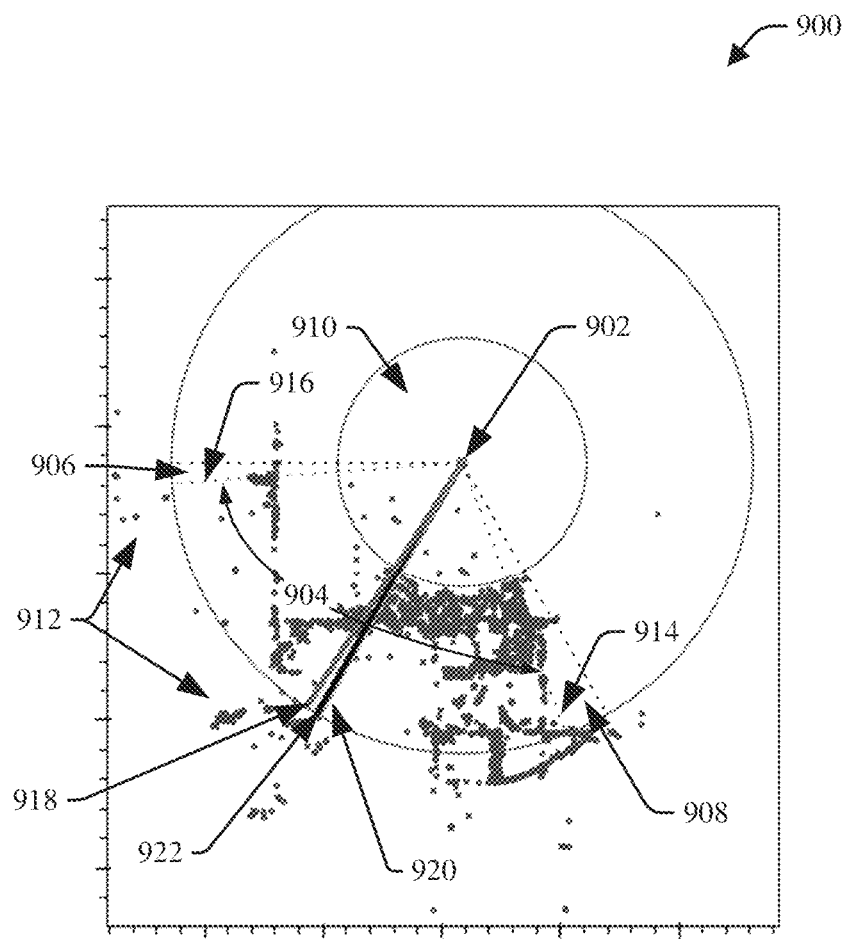
FIG. 9 illustrates a diagram of an example map plot that can indicate a recorded azimuth associated with a cell that can be determined to be validated, in accordance with various aspects and embodiments of the disclosed subject matter.
Figure 10:
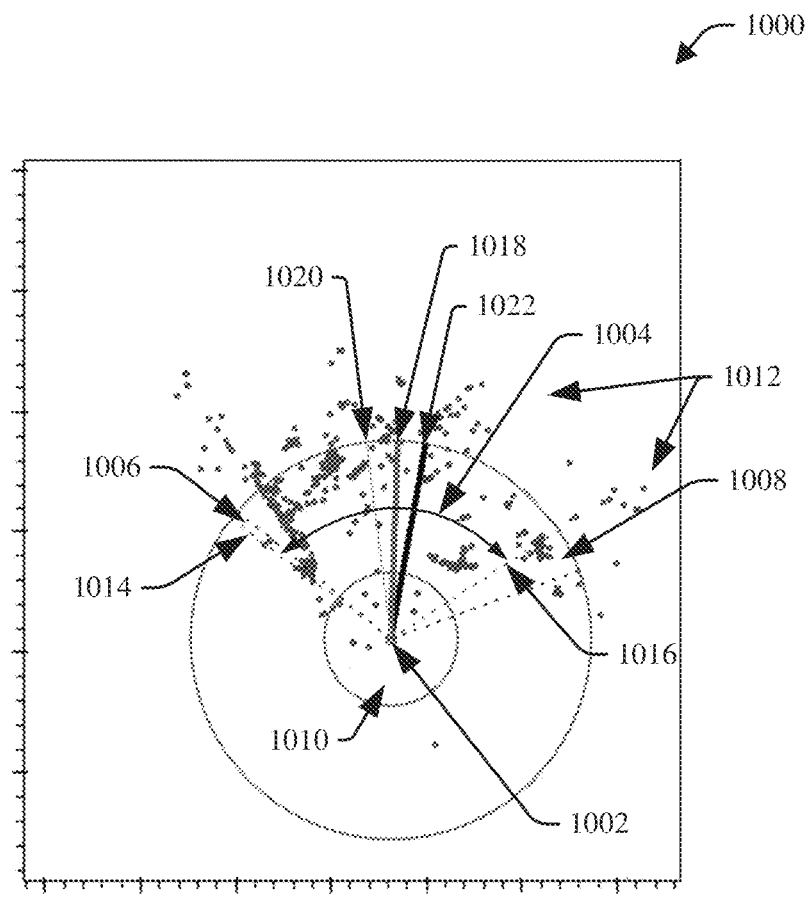
FIG. 10 depicts a diagram of another example map plot that can indicate a recorded azimuth associated with a cell that can be determined to be validated, in accordance with various aspects and embodiments of the disclosed subject matter.
Figure 11:
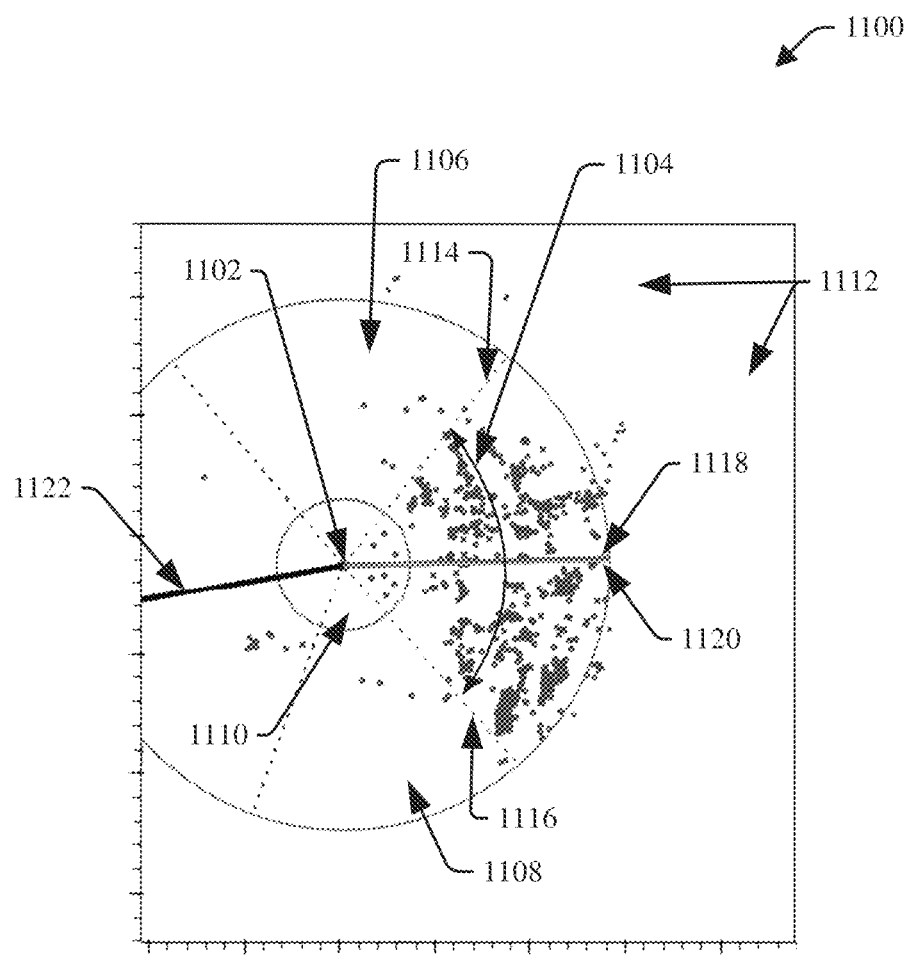
FIG. 11 presents a diagram of an example map plot that can indicate a recorded azimuth associated with a cell that can be determined to be invalid, in accordance with various aspects and embodiments of the disclosed subject matter.
Figure 12:
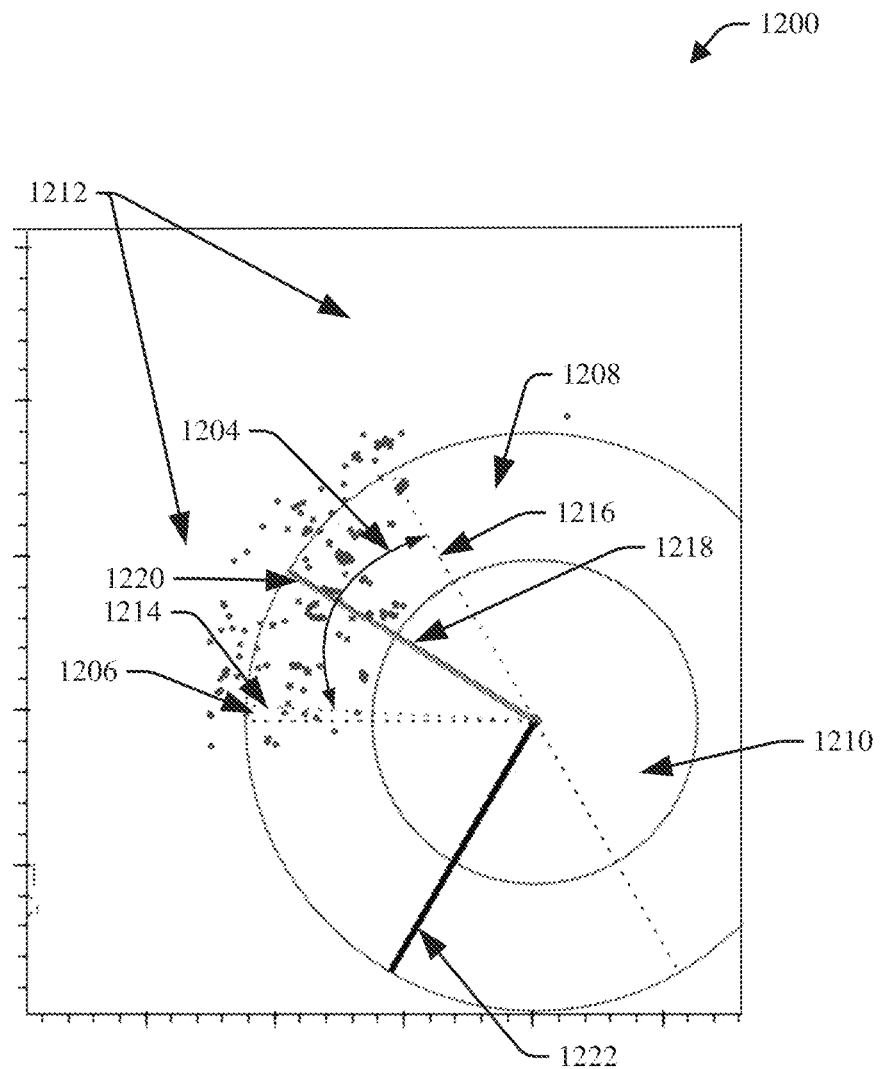
FIG. 12 illustrates a diagram of another example map plot that can indicate a recorded azimuth associated with a cell that can be determined to be invalid, in accordance with various aspects and embodiments of the disclosed subject matter.
Figure 13:
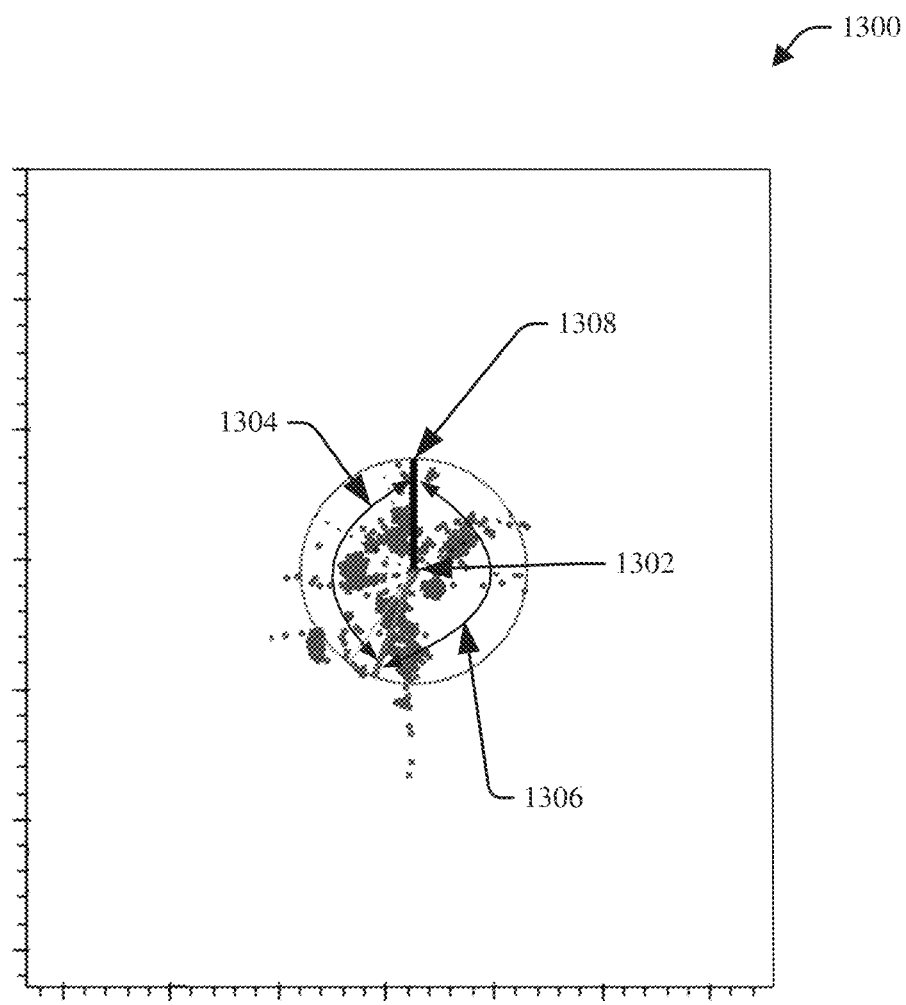
FIG. 13 depicts a diagram of an example map plot that can indicate a cell that can be determined to be an omni cell, in accordance with various aspects and embodiments of the disclosed subject matter.
Figure 14:
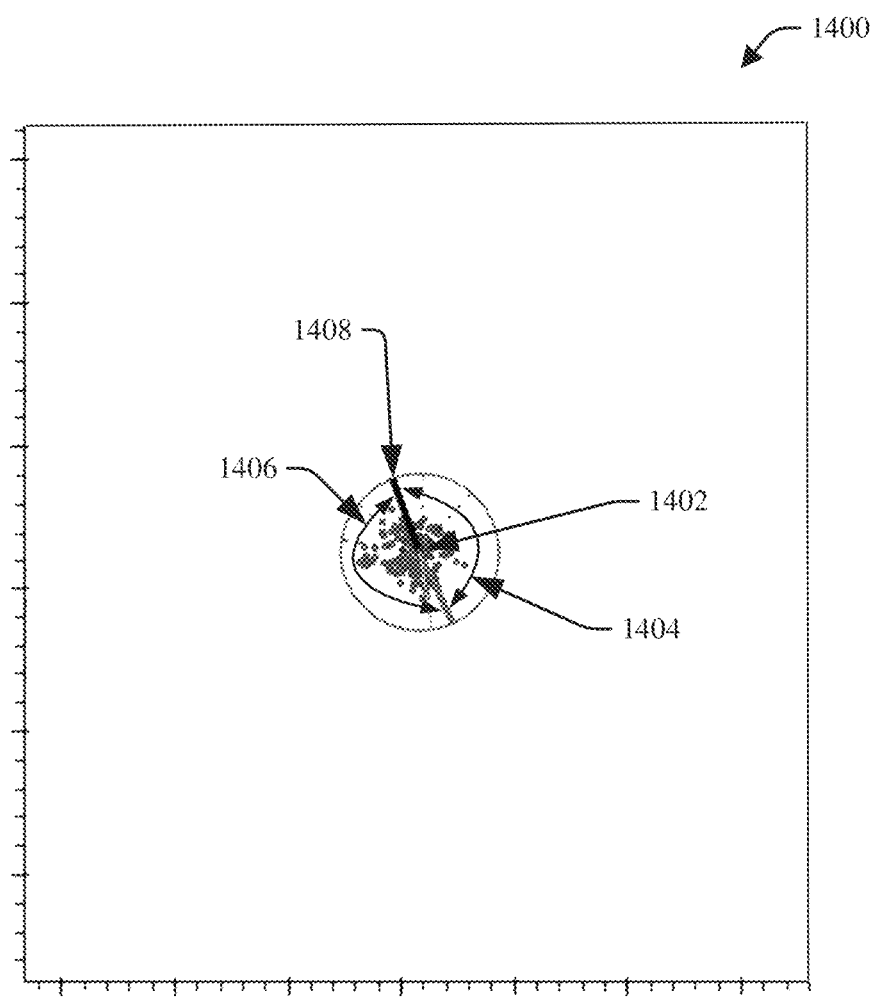
FIG. 14 presents a diagram of another example map plot that can indicate a cell that can be determined to be an omni cell, in accordance with various aspects and embodiments of the disclosed subject matter.

Referring to FIGS. 9-14 (along with FIGS. 1 and 2), FIGS. 9 and 10 present diagrams of example map plots 900 and 1000, respectively, that can indicate a recorded azimuth associated with a cell that can be determined to be validated, FIGS. 11 and 12 are diagrams of example map plots 1100 and 1200, respectively, that can indicate a recorded azimuth associated with a cell that can be determined to be invalid, and FIGS. 13 and 14 are diagrams of example map plots 1300 and 1400, respectively, that can indicate a cell that can be determined to be an omni cell, in accordance with various aspects and embodiments of the disclosed subject matter.

With regard to FIG. 9, FIG. 9 illustrates a diagram of an example map plot 900 that can indicate a recorded azimuth associated with a cell that can be determined to be validated (e.g., by the CAMC 120), in accordance with various aspects and embodiments of the disclosed subject matter. The example map plot 900 comprises a cell data point 902 that can represent a cell at a validated cell location (e.g., as validated by the CAMC 120). The example map plot 900 also comprises a plurality of device data points, including device data points in a first region 904 of the map plot 900, device data points in a second region 906 of the map plot 900, device data points in a third region 908 of the map plot 900, device data points in a fourth region 910 (e.g., demarcated by the smaller circle) of the map plot 900, and device data points in a fifth region 912 (e.g., demarcated by the larger circle) of the map plot 900, wherein the respective device data points (e.g., respective location data associated with respective communication devices) can represent respective locations of respective communication devices associated with the cell.

As part of the cell azimuth estimation and validation analysis, the CAMC 120 (e.g., the estimator component 122 of the CAMC 120) can analyze the device data points in the various regions (e.g., 904, 906, 908, 910, and 912), and, based at least in part on the results of the analysis, the CAMC 120 can filter out communication devices that are determined to be too close to the cell and too far away from the cell, as more fully described herein. Accordingly, the CAMC 120 can, for example, filter out the device data points in the fourth region 910 and the fifth region 912.

Also, as part of the cell azimuth estimation and validation analysis, the CAMC 120 can analyze the cell data point 902 and the device data points in the first region 904, second region 906, and third region 908, and, based at least in part on the results of such analysis, the CAMC 120 can determine respective cell-to-device azimuths associated with the respective communication devices, as more fully described herein. As a further result of such analysis, the CAMC 120 also can determine (e.g., calculate) a first percentile (e.g., p(10%)) of the respective cell-to-device azimuths and a second percentile (e.g., p(90%)) of the respective cell-to-device azimuths, wherein the first percentile line 914 can represent the location of the first percentile boundary (e.g., cut off point) in the example map plot 900, and the second percentile line 916 can represent the location of the second percentile boundary in the example map plot 900. As can be observed in the example map plot 900, a portion of the device data points can be located in the second region 906, and can be at or below the first percentile, as represented by the first percentile line 914, and another portion of the device data points can be located in the third region 908, and can be at or above the second percentile, as represented by the second percentile line 916, with still another portion of the device data points being located in the first region 904 between (e.g., within the interval of) the first percentile line 914 and the second percentile line 916.

In some embodiments, the CAMC 120 can determine the estimated azimuth associated with the cell as a function of (e.g., equal to) the sum of (the first percentile of the respective cell-to-device azimuths plus the second percentile of the respective cell-to-device azimuths) divided by two (e.g., the estimated azimuth of the cell=([p(10%)+p(90%)]/2)), wherein the estimated azimuth 918 associated with the cell is located as shown on the example map plot 900. For illustrative purposes (e.g., comparative purposes), the median azimuth 920 associated with the cell is located as shown on the example map plot 900, wherein the median azimuth 920 can be determined based on the respective cell-to-device azimuths associated with the respective communication devices represented by the device data points in the first region 904, second region 906, and third region 908.

The CAMC 120 also can receive recorded cell azimuth data, which can be representative of a recorded azimuth associated with the cell, from a desired data source. Based at least in part on the recorded cell azimuth data, the recorded azimuth 922 associated with the cell can be located as shown on the example map plot 900. It is noted, that, in this instance, in the example map plot 900, the median azimuth 920 associated with the cell and the recorded azimuth 922 associated with the cell are very close to each other and overlap to some extent, which is the reason that the two lines (e.g., line of the median azimuth 920 and line of the recorded azimuth 922) almost appear to be a single line in the example map plot 900. It also is noted that, while the median azimuth 920 happens to be a little bit closer to the recorded azimuth 922 than the estimated azimuth 918 is, an estimated azimuth often can be closer to a recorded azimuth than a median azimuth, and, accordingly, often can be more accurate than the median azimuth, in instances where the recorded azimuth can be validated as accurate.

As can be observed from the example map plot 900, and as can be determined (e.g., by the validator component 124) from analysis of the recorded azimuth 922 associated with the cell in relation to the estimated azimuth 918 associated with the cell and the first percentile and second percentile of the respective cell-to-device azimuths, the recorded azimuth 922 is relatively close to the estimated azimuth 918, and, accordingly, the azimuth difference between the recorded azimuth 922 and the estimated azimuth 918 satisfies (e.g., is less than or equal to) the defined threshold azimuth difference. Based on this factor alone, the validator component 124 can determine that the recorded azimuth 922 can be validated as accurate (assuming there is no other recorded azimuth associated with the cell that is more accurate than the recorded azimuth). As also can be observed from the example map plot 900, and as can be determined (e.g., by the validator component 124) from such analysis, the recorded azimuth 922 associated with the cell is located within the desired cell azimuth interval (e.g., between the first percentile line 914 and the second percentile line 916, wherein, for example, the desired cell azimuth interval=[p(10%), p(90%)]). Based on this factor alone, the validator component 124 also can determine that the recorded azimuth 922 can be validated as accurate (assuming there is no other recorded azimuth associated with the cell that is more accurate than the recorded azimuth). Thus, even though the recorded azimuth 922 only has to satisfy one of the two factors (e.g., tests) in order to be validated, the recorded azimuth 922 here actually satisfied both factors.

Turning to FIG. 10, FIG. 10 depicts a diagram of another example map plot 1000 that can indicate a recorded azimuth associated with a cell that can be determined to be validated, in accordance with various aspects and embodiments of the disclosed subject matter. The example map plot 1000 comprises a cell data point 1002 that can represent a cell at a validated cell location (e.g., as validated by the CAMC 120). The example map plot 1000 also can comprise a plurality of device data points, including respective device data points in a first region 1004, a second region 1006, a third region 1008, a fourth region 1010 (e.g., demarcated by the smaller circle), and a fifth region 1012 (e.g., demarcated by the larger circle) of the map plot 1000, wherein the respective device data points (e.g., respective location data associated with respective communication devices) can represent respective locations of respective communication devices associated with the cell.

As part of the cell azimuth estimation and validation analysis, the estimator component 122 can analyze the device data points in the various regions (e.g., 1004, 1006, 1008, 1010, and 1012), and, based at least in part on the results of the analysis, the estimator component 122 can filter out communication devices that are determined to be too close to the cell and too far away from the cell, as more fully described herein. Accordingly, the estimator component 122 can filter out the device data points in the fourth region 1010 and the fifth region 1012.

Also, as part of the cell azimuth estimation and validation analysis, the estimator component 122 can analyze the cell data point 1002 and the device data points in the first region 1004, second region 1006, and third region 1008, and, based at least in part on the results of such analysis, the estimator component 122 can determine respective cell-to-device azimuths associated with the respective communication devices located in those regions (e.g., 1004, 1006, and 1008), as more fully described herein. As a further result of such analysis, the estimator component 122 also can determine a first percentile (e.g., p(10%)) of the respective cell-to-device azimuths and a second percentile (e.g., p(90%)) of the respective cell-to-device azimuths, wherein the first percentile line 1014 can represent the location of the first percentile boundary in the example map plot 1000, and the second percentile line 1016 can represent the location of the second percentile boundary in the example map plot 1000. As can be observed in the example map plot 1000, a portion of the device data points can be located in the second region 1006, and can be at or below the first percentile, as represented by the first percentile line 1014, and another portion of the device data points can be located in the third region 1008, and can be at or above the second percentile, as represented by the second percentile line 1016, with still another portion of the device data points being located in the first region 1004 between (e.g., within the interval of) the first percentile line 1014 and the second percentile line 1016.

In some embodiments, the estimator component 122 can determine the estimated azimuth associated with the cell as a function of (e.g., equal to) the sum of (the first percentile of the respective cell-to-device azimuths plus the second percentile of the respective cell-to-device azimuths) divided by two, wherein the estimated azimuth 1018 associated with the cell is located as shown on the example map plot 1000. For illustrative purposes (e.g., comparative purposes), the median azimuth 1020 associated with the cell is located as shown on the example map plot 1000, wherein the median azimuth 1020 can be determined based on the respective cell-to-device azimuths associated with the respective communication devices represented by the device data points in the first region 1004, second region 1006, and third region 1008.

The validator component 124 can receive recorded cell azimuth data, which can be representative of a recorded azimuth associated with the cell, from a desired data source. Based at least in part on the recorded cell azimuth data, the recorded azimuth 1022 associated with the cell can be located as shown on the example map plot 1000.

As can be observed from the example map plot 1000, and as can be determined (e.g., by the validator component 124) from analysis of the recorded azimuth 1022 associated with the cell in relation to the estimated azimuth 1018 associated with the cell and the first percentile and second percentile of the respective cell-to-device azimuths, the recorded azimuth 1022 is relatively close to the estimated azimuth 1018, and, accordingly, the azimuth difference between the recorded azimuth 1022 and the estimated azimuth 1018 satisfies (e.g., is less than or equal to) the defined threshold azimuth difference. Based on this factor (e.g., test) alone, the validator component 124 can determine that the recorded azimuth 1022 can be validated as accurate (assuming there is no other recorded azimuth associated with the cell that is more accurate than the recorded azimuth). As also can be observed from the example map plot 1000, and as can be determined (e.g., by the validator component 124) from such analysis, the recorded azimuth 1022 associated with the cell is located within the desired cell azimuth interval (e.g., between the first percentile line 1014 and the second percentile line 1016, wherein, for example, the desired cell azimuth interval=[p (10%), p(90%)]). Based on this factor alone, the validator component 124 also can determine that the recorded azimuth 1022 can be validated as accurate (assuming there is no other recorded azimuth associated with the cell that is more accurate than the recorded azimuth). Thus, even though the recorded azimuth 1022 only has to satisfy one of the two factors (e.g., tests) in order to be validated, the recorded azimuth 1022 here actually satisfied both factors.

FIG. 11 presents a diagram of an example map plot 1100 that can indicate a recorded azimuth associated with a cell that can be determined to be invalid, in accordance with various aspects and embodiments of the disclosed subject matter. The example map plot 1100 can comprise a cell data point 1102 that can represent a cell at a validated cell location (e.g., as validated by the CAMC 120). The example map plot 1100 also can comprise a plurality of device data points, including respective device data points in a first region 1104, a second region 1106, a third region 1108, a fourth region 1110 (e.g., demarcated by the smaller circle) and a fifth region 1112 (e.g., demarcated by the larger circle) of the map plot 1100, wherein the respective device data points (e.g., respective location data associated with respective communication devices) can represent respective locations of respective communication devices associated with the cell.

As part of the cell azimuth estimation and validation analysis, the estimator component 122 can analyze the device data points in the various regions (e.g., 1104, 1106, 1108, 1110, and 1112). Based at least in part on the results of the analysis, the estimator component 122 can filter out communication devices that are determined to be too close to the cell and too far away from the cell, as more fully described herein. Accordingly, the estimator component 122 can filter out the device data points in the fourth region 1110 and the fifth region 1112.

Also, as part of the cell azimuth estimation and validation analysis, the estimator component 122 can analyze the cell data point 1102 and the device data points in the first region 1104, second region 1106, and third region 1108, and, based at least in part on the results of such analysis, the estimator component 122 can determine respective cell-to-device azimuths associated with the respective communication devices located in those regions (e.g., 1104, 1106, and 1108), as more fully described herein. As a further result of such analysis, the estimator component 122 can determine a first percentile (e.g., p(10%)) of the respective cell-to-device azimuths and a second percentile (e.g., p(90%)) of the respective cell-to-device azimuths, wherein the first percentile line 1114 can represent the location of the first percentile boundary in the example map plot 1100, and the second percentile line 1116 can represent the location of the second percentile boundary in the example map plot 1100. As can be observed in the example map plot 1100, a portion of the device data points can be located in the second region 1106, and can be at or below the first percentile, as represented by the first percentile line 1114, and another portion of the device data points can be located in the third region 1108, and can be at or above the second percentile, as represented by the second percentile line 1116, with still another portion of the device data points being located in the first region 1104 between (e.g., within the interval of) the first percentile line 1114 and the second percentile line 1116.

In some embodiments, the estimator component 122 can determine the estimated azimuth associated with the cell as a function of the sum of (the first percentile of the respective cell-to-device azimuths plus the second percentile of the respective cell-to-device azimuths) divided by two, wherein the estimated azimuth 1118 associated with the cell is located as shown on the example map plot 1100. For illustrative purposes (e.g., comparative purposes), the median azimuth 1120 associated with the cell is located as shown on the example map plot 1100, wherein the median azimuth 1120 can be determined based on the respective cell-to-device azimuths associated with the respective communication devices represented by the device data points in the first region 1104, second region 1106, and third region 1108. It is noted, that, in this instance, in the example map plot 1100, the estimated azimuth 1118 associated with the cell and the median azimuth 1120 associated with the cell are very close to each other and significantly overlap, which is the reason that the two lines (e.g., line of the estimated azimuth 1118 and line of the median azimuth 1120) almost appear to be a single line in the example map plot 1100.

The validator component 124 can receive recorded cell azimuth data, which can be representative of a recorded azimuth associated with the cell, from a desired data source. Based at least in part on the recorded cell azimuth data, the recorded azimuth 1122 associated with the cell can be located as shown on the example map plot 1100.

As can be observed from the example map plot 1100, and as can be determined (e.g., by the validator component 124) from analysis of the recorded azimuth 1122 associated with the cell in relation to the estimated azimuth 1118 associated with the cell and the first percentile and second percentile of the respective cell-to-device azimuths, the recorded azimuth 1122 is located very far away from the estimated azimuth 1118, and, accordingly, the azimuth difference between the recorded azimuth 1122 and the estimated azimuth 1118 does not satisfy (e.g., is greater than) the defined threshold azimuth difference. As also can be observed from the example map plot 1100, and as can be determined (e.g., by the validator component 124) from such analysis, the recorded azimuth 1122 associated with the cell is not located within the desired cell azimuth interval (e.g., between the first percentile line 1114 and the second percentile line 1116, wherein, for example, the desired cell azimuth interval=[p (10%), p(90%)]). Based on the recorded azimuth 1122 not satisfying the azimuth difference test and not satisfying the test relating to the desired cell azimuth interval, the validator component 124 can determine that the recorded azimuth 1122 is invalid as being inaccurate.

FIG. 12 illustrates a diagram of another example map plot 1200 that can indicate a recorded azimuth associated with a cell that can be determined to be invalid, in accordance with various aspects and embodiments of the disclosed subject matter. The example map plot 1200 can comprise a cell data point 1202 that can represent a cell at a validated cell location (e.g., as validated by the CAMC 120). The example map plot 1200 also can comprise a plurality of device data points, including respective device data points in a first region 1204, a second region 1206, a third region 1208, a fourth region 1210 (e.g., demarcated by the smaller circle), and a fifth region 1212 (e.g., demarcated by the larger circle) of the map plot 1200, wherein the respective device data points can represent respective locations of respective communication devices associated with the cell.

As part of the cell azimuth estimation and validation analysis, the estimator component 122 can analyze the device data points in the various regions (e.g., 1204, 1206, 1208, 1210, and 1212). Based at least in part on the results of the analysis, the estimator component 122 can filter out communication devices that are determined to be too close to the cell and too far away from the cell, as more fully described herein. Accordingly, the estimator component 122 can filter out the device data points in the fourth region 1210 and the fifth region 1212.

Also, as part of the cell azimuth estimation and validation analysis, the estimator component 122 can analyze the cell data point 1202 and the device data points in the first region 1204, second region 1206, and third region 1208, and, based at least in part on the results of such analysis, the estimator component 122 can determine respective cell-to-device azimuths associated with the respective communication devices located in those regions (e.g., 1204, 1206, and 1208), as more fully described herein. As a further result of such analysis, the estimator component 122 can determine a first percentile (e.g., p(10%)) of the respective cell-to-device azimuths and a second percentile (e.g., p(90%)) of the respective cell-to-device azimuths, wherein the first percentile line 1214 can represent the location of the first percentile boundary in the example map plot 1200, and the second percentile line 1216 can represent the location of the second percentile boundary in the example map plot 1200. As can be observed in the example map plot 1200, a portion of the device data points can be located in the second region 1206, and can be at or below the first percentile, as represented by the first percentile line 1214, and another portion of the device data points can be located in the third region 1208, and can be at or above the second percentile, as represented by the second percentile line 1216, with still another portion of the device data points being located in the first region 1204 between (e.g., within the interval of) the first percentile line 1214 and the second percentile line 1216.

In some embodiments, the estimator component 122 can determine the estimated azimuth associated with the cell as a function of the sum of (the first percentile of the respective cell-to-device azimuths plus the second percentile of the respective cell-to-device azimuths) divided by two, wherein the estimated azimuth 1218 associated with the cell is located as shown on the example map plot 1200. For illustrative purposes (e.g., comparative purposes), the median azimuth 1220 associated with the cell is located as shown on the example map plot 1200, wherein the median azimuth 1220 can be determined based on the respective cell-to-device azimuths associated with the respective communication devices represented by the device data points in the first region 1204, second region 1206, and third region 1208. It is noted, that, in this instance, in the example map plot 1200, the estimated azimuth 1218 and the median azimuth are very close to each other and significantly overlap, which is the reason that the two lines (e.g., line of the estimated azimuth 1218 and line of the median azimuth 1220) almost appear to be a single line in the example map plot 1200.

The validator component 124 can receive recorded cell azimuth data, which can be representative of a recorded azimuth associated with the cell, from a desired data source. Based at least in part on the recorded cell azimuth data, the recorded azimuth 1222 associated with the cell can be located as shown on the example map plot 1200.

As can be observed from the example map plot 1200, and as can be determined (e.g., by the validator component 124) from analysis of the recorded azimuth 1222 in relation to the estimated azimuth 1218 and the first percentile and second percentile of the respective cell-to-device azimuths, the recorded azimuth 1222 is located very far away from the estimated azimuth 1218, and, accordingly, the azimuth difference between the recorded azimuth 1222 and the estimated azimuth 1218 does not satisfy (e.g., is greater than) the defined threshold azimuth difference. As also can be observed from the example map plot 1200, and as can be determined (e.g., by the validator component 124) from such analysis, the recorded azimuth 1222 associated with the cell is not located within the desired cell azimuth interval (e.g., between the first percentile line 1214 and the second percentile line 1216, wherein, for example, the desired cell azimuth interval=[p(10%), p(90%)]). Based on the recorded azimuth 1222 not satisfying the azimuth difference test and not satisfying the test relating to the desired cell azimuth interval, the validator component 124 can determine that the recorded azimuth 1222 is invalid as being inaccurate.

FIG. 13 depicts a diagram of an example map plot 1300 that can indicate a cell that can be determined to be an omni cell, in accordance with various aspects and embodiments of the disclosed subject matter. The example map plot 1300 can comprise a cell data point 1302 that can represent a cell at a validated cell location (e.g., as validated by the CAMC 120). The example map plot 1300 also can comprise a plurality of device data points, including respective device data points in a first region 1304 and a second region 1306 of the map plot 1300, wherein the respective device data points can represent respective locations of respective communication devices associated with the cell. As can be observed in the map plot 1300, the respective data points in the regions 1304 and 1306 can surround the cell data point 1302, which can indicate that the communication devices are in various locations that surround the cell.

As part of the analysis, the CAMC 120 can analyze the device data points in the regions 1304 and 1306. Based at least in part on the results of the analysis, the CAMC 120 can determine that the communication devices surround the cell in virtually any direction, as more fully described herein. Accordingly, the CAMC 120 can determine that the cell associated with the cell data point 1302 is an omni cell. Since the cell is an omni cell, it is not necessary or particularly useful to validate the recorded azimuth 1308 associated with the cell.

FIG. 14 presents a diagram of another example map plot 1400 that can indicate a cell that can be determined to be an omni cell, in accordance with various aspects and embodiments of the disclosed subject matter. The example map plot 1400 can comprise a cell data point 1402 that can represent a cell at a validated cell location (e.g., as validated by the CAMC 120). The example map plot 1400 also can comprise a plurality of device data points, including respective device data points in a first region 1404 and a second region 1406 of the map plot 1400, wherein the respective device data points can represent respective locations of respective communication devices associated with the cell. As can be observed in the map plot 1400, the respective data points in the regions 1404 and 1406 can surround the cell data point 1402, which can indicate that the communication devices are in various locations that surround the cell.

As part of the analysis, the CAMC 120 can analyze the device data points in the regions 1404 and 1406. Based at least in part on the results of the analysis, the CAMC 120 can determine that the communication devices surround the cell in virtually any direction, as more fully described herein. Accordingly, the CAMC 120 can determine that the cell associated with the cell data point 1402 is an omni cell. Since the cell is an omni cell, it is not necessary or particularly useful to validate the recorded azimuth 1408 associated with the cell.

The disclosed subject matter, by employing the CAMC 120 to estimate the locations of nodes and associated cells, based at least in part on TA measurement data and location data associated with communication devices, using the disclosed location estimation algorithms (e.g., smallTA algorithm, linear regression algorithm, and/or other machine learning algorithms), and validating potential cell locations of cells (e.g., estimated cell locations and recorded cell locations), based at least in part on TA measurement data and location data associated with communication devices, using the disclosed validation algorithms, such as described herein, can desirably (e.g., accurately, or at least substantially accurately) determine locations of cells. For example, the CAMC 120 can desirably and accurately determine or estimate locations of cells with median errors of approximately 50 meters, which can be significantly better than traditional techniques for determining cell locations, as some traditional techniques for determining cell locations can have undesirable errors on the order of 300 meters or more. The disclosed subject matter, by utilizing the CAMC 120 and techniques described herein, can involve relatively low resource usage, and the disclosed subject matter can utilize existing network measurements (e.g., TA measurement data, and AGPS, GPS, and/or IoT geolocation data) to estimate and validate cell locations, and thus, can incur no additional or incremental burden on network data collection. Also, the location estimation algorithms and validation algorithms disclosed herein can be relatively easy to implement with relatively low resource usage (e.g., computing resource usage and/or time resource usage).

Also, the disclosed subject matter, by employing the CAMC 120 to estimate the azimuths of cells, based at least in part on the location data associated with communication devices and the validated locations associated with cells, using the disclosed azimuth estimation techniques and algorithms, and validating recorded cell azimuths associated with cells, based at least in part on analysis of estimated azimuths and recorded azimuths associated with cells, such as described herein, can desirably (e.g., accurately, or at least substantially accurately) estimate azimuths associated with cells. For example, the CAMC 120 can desirably and accurately estimate azimuths associated with cells with a median error of 9 degrees and a $75^{th}$ percentile error of 17 degrees. The CAMC 120 can utilize the estimated cell azimuths and the disclosed validation algorithms, such as described herein, to desirably (e.g., accurately) validate recorded azimuths associated with cells. The disclosed subject matter, by utilizing the CAMC 120 and techniques described herein, can involve relatively low resource usage, and the disclosed subject matter can utilize existing network measurements (e.g., AGPS, GPS, and/or IoT geolocation data) to estimate and validate cell azimuths, and thus, can incur no additional or incremental burden on network data collection. Also, the cell azimuth estimation algorithms and validation algorithms disclosed herein can be relatively easy to implement with relatively low resource usage (e.g., computing resource usage and/or time resource usage).

Further, since the disclosed subject matter can be collected by the CAMC 120 consistently from the live communication network 102, the CAMC 120 can monitor (e.g., monitor in real time of substantially real time) any change (e.g., adding, moving, removing, or adjusting) of cells in the communication network 102, and can maintain up-to-date, or at least substantially up-to-date, cell location information and cell azimuth information associated with the cells. Furthermore, the disclosed subject matter, by employing the CAMC 120 and the associated cell location estimation and validation techniques and algorithms and cell azimuth estimation and validation techniques and algorithms, such as described herein, can have desirable scalability, and such techniques and algorithms described herein can be scaled up for use with regard to virtually any communication network of virtually any desired size, and with regard to virtually any number of communication networks. For example, the disclosed subject matter, including the CAMC 120, can quickly evaluate cell azimuths (e.g., recorded cell azimuths) from various data sources and identify inaccurate cell azimuth information or validate accurate cell azimuth information. The cell azimuth estimation and validation techniques and algorithms can desirably and easily be integrated with the cell location estimation and validation techniques and algorithms to provide complete (e.g., location and azimuth) cell validation information.

The disclosed subject matter also can have various commercial benefits. For instance, the disclosed subject matter, by employing the CAMC 120 and associated techniques and algorithms, as described herein, can provide cost savings (e.g., financial cost savings, time cost saving, and/or other cost savings), as the disclosed subject matter can desirably (e.g., effectively, efficiently, and accurately) estimate cell locations (e.g., by providing ML estimated cell locations), validate various cell locations and associated cell location data sources, estimate cell azimuths, and validate recorded cell azimuths associated with cell azimuth data sources. This can significantly reduce the amount of manual labor associated with having people (e.g., technicians, contractors, or other persons) travel to cell sites or potential cell sites. Further, the disclosed subject matter, by employing the CAMC 120 and associated techniques and algorithms, as described herein, can enable desirable (e.g., accurate, efficient, and effective) communication network planning and design, and E911 dispatch operations. For instance, the disclosed subject matter can benefit RAN planning and design by providing desirably accurate cell location information and cell azimuth information, which can reduce the amount of time and the amount of financial cost involved in planning and designing RANs. The disclosed subject matter also can aid and provide benefit in the deployment of the 5G or other next generation network. Also, with regard to E911 operations, the disclosed subject matter, by providing desirably accurate cell location information and cell azimuth information, can enable an E911 dispatch team to desirably and accurately identify PSAP call routing/caller location, during an E911 call (e.g., where GPS or other location coordinates of a communication device are not available), and provide desired emergency assistance in a more timely (e.g., quicker) manner. The disclosed subject matter also can centralize different cell location information and cell azimuth information for use by downstream applications.

Figure 15:
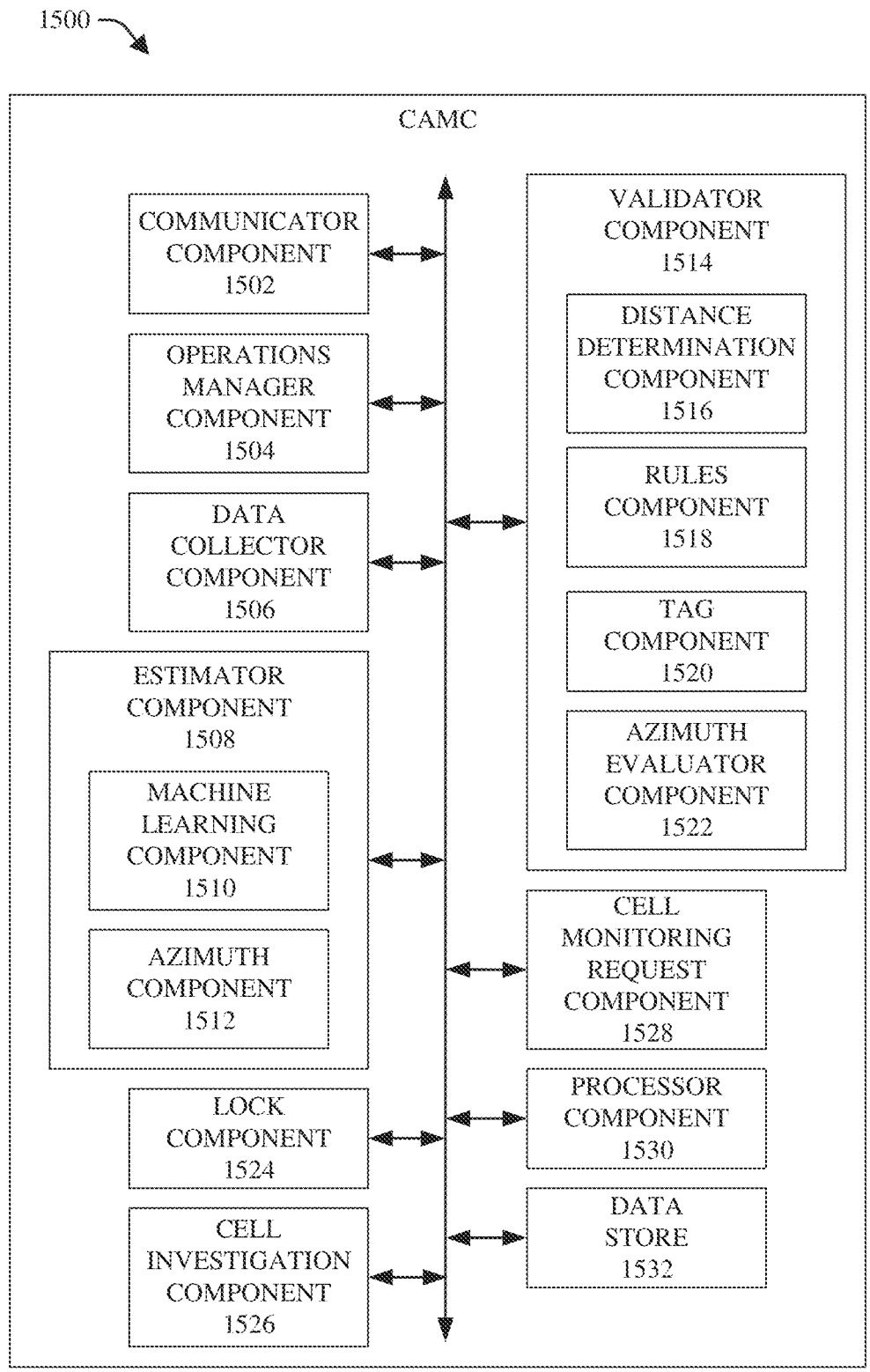
FIG. 15 illustrates a block diagram of the example cell attribute management component (CAMC), in accordance with various aspects and embodiments of the disclosed subject matter.

FIG. 15 illustrates a block diagram of the example CAMC 500, in accordance with various aspects and embodiments of the disclosed subject matter. The CAMC 1500 can include a communicator component 1502, an operations manager component 1504, a data collector component 1506, an estimator component 1508, which can include a machine learning component 1510 and an azimuth component 1512. The CAMC 1500 also can include a validator component 1514 that can include a distance determination component 1516, a rules component 1518, a tag component 1520, and an azimuth evaluator component 1522. The CAMC 1500 further can include a lock component 1524, a cell investigation component 1526, a cell monitoring request component 1528, a processor component 1530, and a data store 1532.

The communicator component 1502 can communicate (e.g., transmit and receive) information, including information relating to cell location determinations and cell azimuth determinations, such as information relating to estimating locations of cells, validating potential cell locations (e.g., an estimated cell location, or a recorded cell location) of cells, estimating azimuths of cells, and validating azimuths (e.g., recorded azimuths) of cells. For instance, the communicator component 1502 can receive data relating to the location of communication devices (e.g., TA measurement data, AGPS or GPS location data, IoT geolocation data, or other location-related data) associated with cells and/or receive data relating to recorded locations and/or recorded azimuths associated with cells. The communicator component 1502 also can transmit information to other components or devices (e.g., CLAPC, network devices of the communication network, or other components or devices) associated with the CAMC 1500. For instance, the communicator component 1502 can transmit information relating to a cell location of a cell (e.g., cell location information relating to an estimated cell location and/or a recorded cell location, cell azimuth information relating to an estimated azimuth and/or recorded azimuth associated with a cell, and/or tag information relating to cell location accuracy or validation, cell azimuth accuracy or validation, and/or locking of cell location information or cell azimuth information), information relating to initiating cell location or azimuth investigations, and/or information relating to cell monitoring requests.

The operations manager component 1504 can control (e.g., manage) operations associated with the CAMC 1500. For example, the operations manager component 1504 can facilitate generating instructions to have components of the CAMC 1500 perform operations, and can communicate respective instructions to respective components (e.g., communicator component 1502, data collector component 1506, estimator component 1508, . . . , a validator component 1514, . . . , lock component 1524, cell investigation component 1526, cell monitoring request component 1528, processor component 1530, and/or data store 1532) of the CAMC 1500 to facilitate performance of operations by the respective components of the CAMC 1500 based at least in part on the instructions, in accordance with the defined cell attribute management criteria and cell attribute management algorithms (e.g., machine learning algorithms, estimation algorithms, validation algorithms, and/or other algorithms, as disclosed, defined, recited, or indicated herein by the methods, systems, and techniques described herein). The operations manager component 1504 also can facilitate controlling data flow between the respective components of the CAMC 1500 and controlling data flow between the CAMC 1500 and another component(s) or device(s) (e.g., CLAPC, network devices of the communication network, data sources, applications, or other component or device) associated with (e.g., connected to) the CAMC 1500.

The data collector component 1506 can collect and aggregate data, including, for example, call trace records (e.g., TA measurement data from call trace records) and location data (e.g., AGPS or GPS location data, or IoT geolocation data) associated with communication devices, and can store such data in the data store 1532. The data collector component 1506 also can receive or obtain data, such as data relating to recorded cell locations or recorded azimuths associated with cells, from the CLAPC or data sources that can store (e.g., record) cell locations or azimuths associated with cells.

The estimator component 1508 can estimate cell locations of cells based at least in part on the results of analyzing location-related data associated with communication devices, in accordance with the defined cell attribute management criteria, as more fully described herein. In accordance with various embodiments, the estimator component 1508 can employ a smallTA algorithm, a linear regression algorithm, and/or other machine learning algorithms to facilitate estimating the locations of nodes (e.g., base stations) and cells associated with the nodes. The machine learning component 1510 can employ the machine learning techniques and algorithms, including, for example, the linear regression algorithm and/or other techniques and algorithms, such as described herein, to facilitate estimating the locations of the nodes and associated cells, in accordance with the defined cell attribute management criteria.

In some embodiments, the estimator component 1508 can employ the azimuth component 1512 to estimate an azimuth associated with a cell based at least in part on the results of analyzing location-related data associated with communication devices and validated location data associated with a cell, in accordance with the defined cell attribute management criteria, as more fully described herein. The azimuth component 1512 can filter data, such as location-related data associated with communication devices, to remove location-related data associated with communication devices (e.g., outlier communication devices) that are determined to be too close to or too far away from a cell, based at least in part on defined threshold distance values. The azimuth component 1512 also can determine (e.g., calculate) cell-to-device azimuths associated with communication devices with regard to remaining subgroup of communication devices (e.g., after the filtering of the outlier communication devices). The azimuth component 1512 also can determine a desired azimuth interval based at least in part on a first percentile of cell-to-device azimuths and second percentile of cell-to-device azimuths associated with the remaining subgroup of communication devices. The azimuth component 1512 further can determine (e.g., calculate) an estimated azimuth associated the cell based at least in part on (e.g., as a function of) the first percentile and the second percentile of cell-to-device azimuths associated with the remaining subgroup of communication devices, as more fully described herein.

The validator component 1514 can validate and/or determine the accuracy of estimated locations of cells and recorded locations of cells (e.g., obtained from the CLAPC), based at least in part on the results of analyzing the estimated cell locations, recorded cell locations, and/or location-related data, in accordance with the defined cell attribute management criteria and associated algorithms (e.g., validation algorithms), as more fully described herein. The validator component 1514 can employ the distance determination component 1516 to determine (e.g., calculate) D_REs, DDs, and/or UBs of ERR, where such determinations can be utilized to facilitate determining how accurate a potential cell location (e.g., estimated cell location or recorded cell location) is. The validator component 1514 can utilize the rules component 1518 to implement (e.g., apply and/or enforce) a set of rules and respective threshold levels (e.g., defined threshold distances, defined threshold DD percentile value, and/or defined threshold UB percentile value) associated with respective rules, such as more fully described herein.

The tag component 1520 can associate (e.g., link or assign) respective tags with respective cell location information (e.g., estimated cell location information or recorded cell location information) based at least in part on the respective validation results of respective cell location validations performed with regard to respective potential cell locations by the validator component 1514. For instance, if a potential cell location is validated and flagged as good, the tag component 1520 can associate an accurate tag with the potential cell location; if a potential cell location (e.g., the best or most accurate cell location of those under evaluation) is validated and flagged as fine, the tag component 1520 can associate an acceptable tag with the potential cell location; if a potential cell location(s) is validated and flagged as bad (e.g., if all of the potential cell locations of a cell are determined to be bad), the tag component 1520 can associate an inaccurate tag with the potential cell location(s); or if a potential cell location(s) is validated and flagged as uncertain (e.g., if there is not enough data to support a decision regarding cell location validation), the tag component 1520 can associate an uncertain tag with the potential cell location (s). If a potential cell location is tagged as accurate, the tag component 1520 also can associate a lock tag with the potential cell location to facilitate locking the cell location information to facilitate preventing any undesired (e.g., unwanted, inadvertent, or unexpected) changes to the cell location information.

The azimuth evaluator component 1522 can evaluate (e.g., compare) an estimated azimuth associated with a cell and a recorded azimuth associated with the cell to facilitate determining whether the recorded azimuth can be validated as accurate (or good). For instance, based at least in part on the evaluation, the azimuth evaluator component 1522 can determine whether an azimuth difference between the recorded azimuth and the estimated azimuth associated with the cell satisfies (e.g., is less than or equal to) a defined threshold azimuth difference. The azimuth evaluator component 1522 also can evaluate (e.g., compare) the recorded azimuth to a desired azimuth interval, which can be determined based at least in part on the first percentile and the second percentile of cell-to-device azimuths associated with the remaining subgroup of communication devices, as more fully described herein. The azimuth evaluator component 1522 can determine whether the recorded azimuth is located within the desired azimuth interval. The azimuth evaluator component 1522 can determine whether the recorded azimuth can be validated as accurate based at least in part on the results of whether the azimuth difference satisfies the defined threshold azimuth difference and/or whether the recorded azimuth is located within the desired azimuth interval, as more fully described herein.

The validator component 1514, employing the azimuth evaluator component 1522, can determine whether the recorded azimuth associated the cell can be validated as accurate, or invalid as inaccurate, based at least in part on the evaluation results of the evaluations by the azimuth evaluator component 1522. The CAMC 1500 also can determine whether a cell is an omni cell based at least in part on an analysis of the validated cell location of a cell and the location data associated with the communication devices associated with the cell, wherein, as disclosed herein, determination or validation of an azimuth of an omni cell can be deemed unnecessary, since the omni cell can be omnidirectional and can serve communication devices in all or substantially all directions.

The tag component 1520 can associate (e.g., link or assign) a tag with a recorded azimuth associated with a cell (e.g., recorded cell azimuth data associated with the cell) based at least in part on the validation results of a cell azimuth validation performed with regard to recorded azimuth by the validator component 1514. For instance, if a recorded azimuth associated with a cell is validated and flagged as accurate or good, the tag component 1520 can associate a validated, accurate, or good tag with the recorded azimuth; or if a recorded azimuth is determined to be inaccurate or bad, the tag component 1520 can associate an invalid, inaccurate, or bad tag with the recorded azimuth. If a recorded azimuth associated with a cell is tagged as validated, accurate, or good, the tag component 1520 also can associate a lock tag with the recorded azimuth to facilitate locking the recorded azimuth (e.g., the recorded cell azimuth data associated with the cell) to facilitate preventing any undesired (e.g., unwanted, inadvertent, or unexpected) changes to the recorded azimuth.

The lock component 1524, in conjunction with the tag component 1520, can facilitate locking cell location information for a potential cell location (e.g., estimated cell location information or recorded cell location information) that has been determined to be and tagged as accurate based at least in part on the results of the cell location validation. The lock component 1524 can lock the cell location information or can indicate, in part via the lock tag, that the cell location information is to be locked to prevent undesired changes. If changes to the cell location information are desired (e.g., when a cell is removed from a location or moved to another location), the lock component 1524, or another component or device, can unlock the cell location information to facilitate making desired changes to the cell location information for the cell.

The lock component 1524, in conjunction with the tag component 1520, also can facilitate locking validated recorded cell azimuth data associated with a validated recorded azimuth associated with a cell (e.g., a cell with a validated cell location) that has been determined to be and tagged as validated, accurate, or good based at least in part on the results of the cell azimuth validation. The lock component 1524 can lock the validated recorded cell azimuth data or can indicate, in part via the lock tag, that the validated recorded cell azimuth data is to be locked to prevent undesired changes. If changes to the validated recorded cell azimuth data are desired (e.g., when a cell is removed from a location or moved to another location), the lock component 1524, or another component or device, can unlock the validated recorded cell azimuth data to facilitate making desired changes to the validated recorded cell azimuth data associated with the cell.

With regard to the cell investigation component 1526, in some embodiments, the cell investigation component 1526 can initiate a cell investigation of a location of a cell, for example, when the cell location has been tagged as bad, based at least in part on the results of the cell location validation performed with regard to the cell by the validator component 1514. The cell investigation can include a manual or automated investigation on map or a physical visit to the estimated cell location, recorded cell location, or other potential location of the cell, such as described herein. Based at least in part on the results of the cell investigation of the location of a cell, the cell investigation component 1526 can be employed to provide update information regarding the cell location of the cell to the CLAPC, and the CLAPC can update the cell location information for the cell based at least in part on such update information. For instance, if the cell investigation results in an accurate, or a more accurate or complete, location of a cell, the update information from the cell investigation can include updated cell location information regarding the accurate, or more accurate or complete, cell location.

In certain embodiments, the cell investigation component 1526 can initiate a cell investigation of an azimuth associated with a cell, for example, when the recorded cell azimuth(s) has been tagged as invalid, inaccurate, or bad, and no recorded cell azimuth has been tagged as validated, accurate, or good, based at least in part on the results of the cell azimuth validation performed with regard to the cell by the validator component 1514. The cell investigation can include a manual or automated investigation on map or a physical visit to the validated cell location of the cell, such as described herein. Based at least in part on the results of the cell investigation of the azimuth of a cell, the cell investigation component 1526 can provide update information regarding the cell azimuth of the cell to the CLAPC, and the CLAPC can update the cell azimuth information for the cell based at least in part on such update information. For instance, if the cell investigation results in an accurate, or more accurate or complete (e.g., more accurately detailed), azimuth of a cell, the update information from the cell investigation can include updated cell azimuth information regarding the accurate, or more accurate or complete, cell azimuth of the cell.

The cell monitoring request component 1528 can initiate a cell monitoring request, for example, if a cell location of a cell has been tagged as uncertain, to have the cell monitored for a desired (e.g., longer) period of time to collect data (e.g., additional location-related data) relating to the cell and have further analysis performed on such data (e.g., by the CAMC 1500). In response to the cell monitoring request, the CAMC 1500 and/or other components or devices (e.g., base station) can obtain or collect additional data, including location-related data, associated with communication devices that are associated with the cell or associated node (e.g., base station) for a desired period of time. The CAMC 1500 can analyze the additional data to facilitate estimating the location of the cell and validating the location of the cell, in accordance with the defined cell attribute management criteria.

The processor component 1530 can work in conjunction with the other components (e.g., communicator component 1502, operations manager component 1504, data collector component 1506, estimator component 1508, . . . , a validator component 1514, . . . , lock component 1524, cell investigation component 1526, cell monitoring request component 1528, and/or data store 1532) to facilitate performing the various functions of the CAMC 1500. The processor component 1530 can employ one or more processors, microprocessors, or controllers that can process data, such as information relating to communication devices, call trace records (e.g., TA measurement data from call trace records), location data (e.g., AGPS or GPS location data, and/or IoT geolocation data) associated with communication devices, network conditions, cell location information, cell location estimation, cell location validation, cell azimuth estimation, cell azimuth information, cell azimuth validation, metadata, parameters, defined threshold levels or values, azimuth intervals, rules associated with cell location or azimuth validation, cell location or azimuth tags, cell monitoring, cell investigations, traffic flows, policies, defined cell attribute management criteria, algorithms (e.g., smallTA algorithm, linear regression algorithm, machine learning algorithms, estimation algorithms, validation algorithms, or other algorithms), protocols, interfaces, tools, and/or other information, to facilitate operation of the CAMC 1500, as more fully disclosed herein, and control data flow between the CAMC 1500 and other components (e.g., a base station or other network component or device of the communication network, CLAPC and/or data sources, applications, or other component or device) associated with the CAMC 1500.

The data store 1532 can store data structures (e.g., user data, metadata), code structure(s) (e.g., modules, objects, hashes, classes, procedures) or instructions, information relating to communication devices, call trace records (e.g., TA measurement data from call trace records), location data (e.g., AGPS or GPS location data, and/or IoT geolocation data) associated with communication devices, network conditions, cell location information, cell location estimation, cell location validation, cell azimuth estimation, cell azimuth information, cell azimuth validation, metadata, parameters, defined threshold levels or values, azimuth intervals, rules associated with cell location or azimuth validation, cell location or azimuth tags, cell monitoring, cell investigations, traffic flows, policies, defined cell attribute management criteria, algorithms (e.g., smallTA algorithm, linear regression algorithm, machine learning algorithms, estimation algorithms, validation algorithms, or other algorithms), protocols, interfaces, tools, and/or other information, to facilitate controlling operations associated with the CAMC 1500. In an aspect, the processor component 1530 can be functionally coupled (e.g., through a memory bus) to the data store 1532 in order to store and retrieve information desired to operate and/or confer functionality, at least in part, to the communicator component 1502, operations manager component 1504, data collector component 1506, estimator component 1508, a validator component 1514, lock component 1524, cell investigation component 1526, cell monitoring request component 1528, processor component 1530 and/or data store 1532, or other component or device, and/or substantially any other operational aspects of the CAMC 1500.

Described herein are systems, methods, articles of manufacture, and other embodiments or implementations that can facilitate estimating locations of cells and validating cell locations (e.g., estimated cell locations and/or recorded cell locations from data sources) of cells of a communication network, as more fully described herein. The estimating locations of cells and validating cell locations of cells of a communication network, and/or other features of the disclosed subject matter, can be implemented in connection with any type of device with a connection to, or attempting to connect to, the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 16:
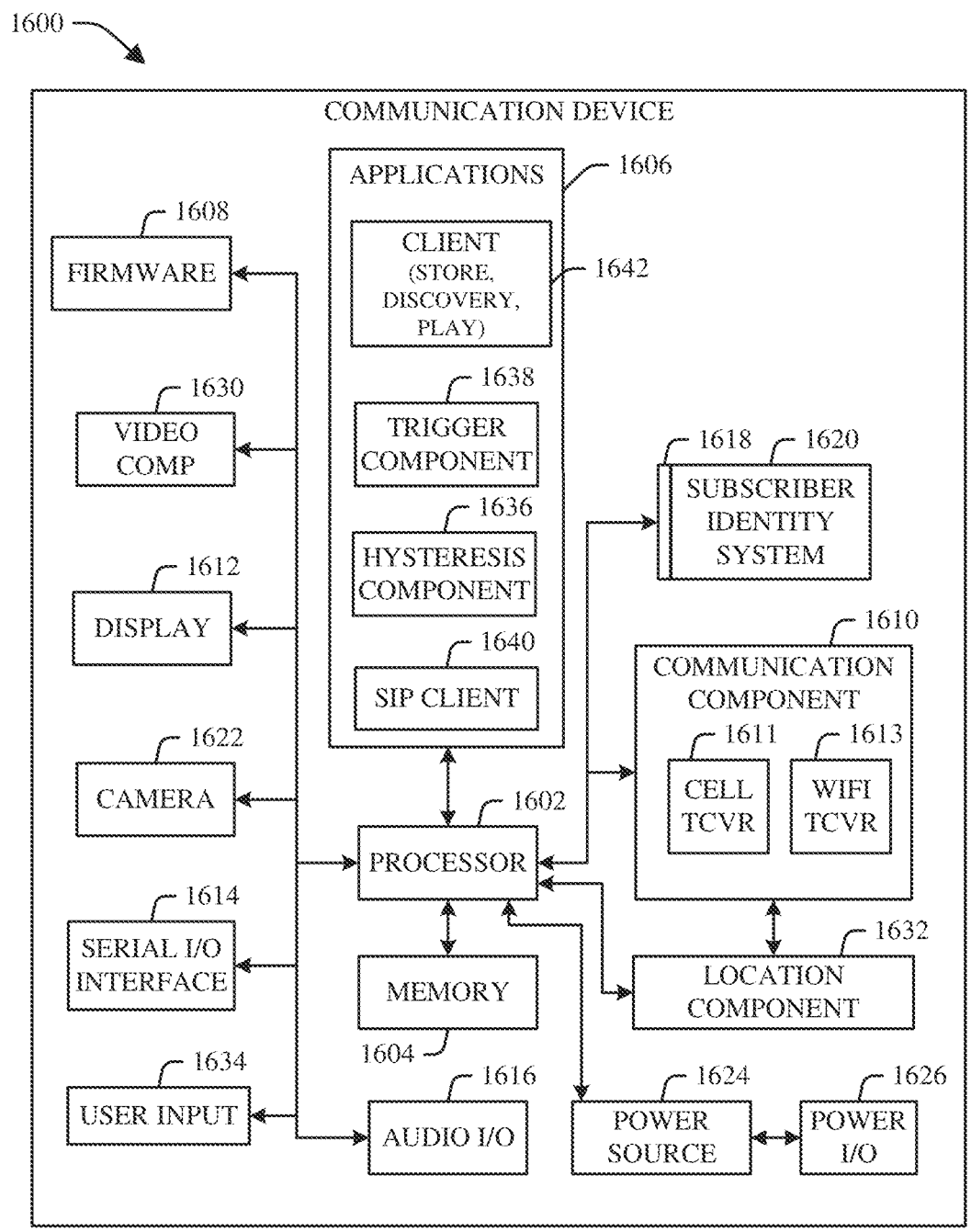
FIG. 16 depicts a block diagram of an example communication device operable to engage in a system architecture that facilitates wireless communications according to one or more embodiments described herein.

Referring now to FIG. 16, depicted is an example block diagram of an example communication device 1600 (e.g., wireless or mobile phone, electronic pad or tablet, electronic eyewear, electronic watch, or other electronic bodywear, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 1600 can include a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the communication device 1600. A communication component 1610 interfaces to the processor 1602 to facilitate wired/wireless communication with external systems, e.g., cellular networks, VoIP networks, and so on. Here, the communication component 1610 can also include a suitable cellular transceiver 1611 (e.g., a GSM transceiver) and/or an unlicensed transceiver 1613 (e.g., Wi-Fi, WiMax) for corresponding signal communications. The communication device 1600 can be a device such as a cellular telephone, a PDA with mobile communications capabilities, and messaging-centric devices. The communication component 1610 also facilitates communications reception from terrestrial radio networks (e.g., broadcast), digital satellite radio networks, and Internet-based radio services networks.

The communication device 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The communication device 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the communication device 1600, and updated by downloading data and software.

The communication device 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the communication device 1600 and IP-based multimedia content can be received in either an encoded or a decoded format.

A video processing component 1622 (e.g., a camera) can be provided for decoding encoded multimedia content. The video processing component 1622 can aid in facilitating the generation, editing, and sharing of video quotes. The communication device 1600 also includes a power source 1624 in the form of batteries and/or an AC power subsystem, which power source 1624 can interface to an external power system or charging equipment (not shown) by a power I/O component 1626.

The communication device 1600 can also include a video component 1630 for processing video content received and, for recording and transmitting video content. For example, the video component 1630 can facilitate the generation, editing and sharing of video quotes. A location tracking component 1632 facilitates geographically locating the communication device 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1636 when the Wi-Fi transceiver 1613 detects the beacon of the access point. A SIP client 1640 enables the communication device 1600 to support SIP protocols and register the subscriber with the SIP registrar server. The applications 1606 can also include a client 1642 that provides at least the capability of discovery, play and store of multimedia content, for example, music.

The communication device 1600, as indicated above related to the communication component 1610, includes an indoor network radio transceiver 1613 (e.g., Wi-Fi transceiver). This function supports the indoor radio link, such as IEEE 802.11, for the dual-mode GSM device (e.g., communication device 1600). The communication device 1600 can accommodate at least satellite radio services through a device (e.g., handset device) that can combine wireless voice and digital radio chipsets into a single device (e.g., single handheld device).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 17-25. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 17:
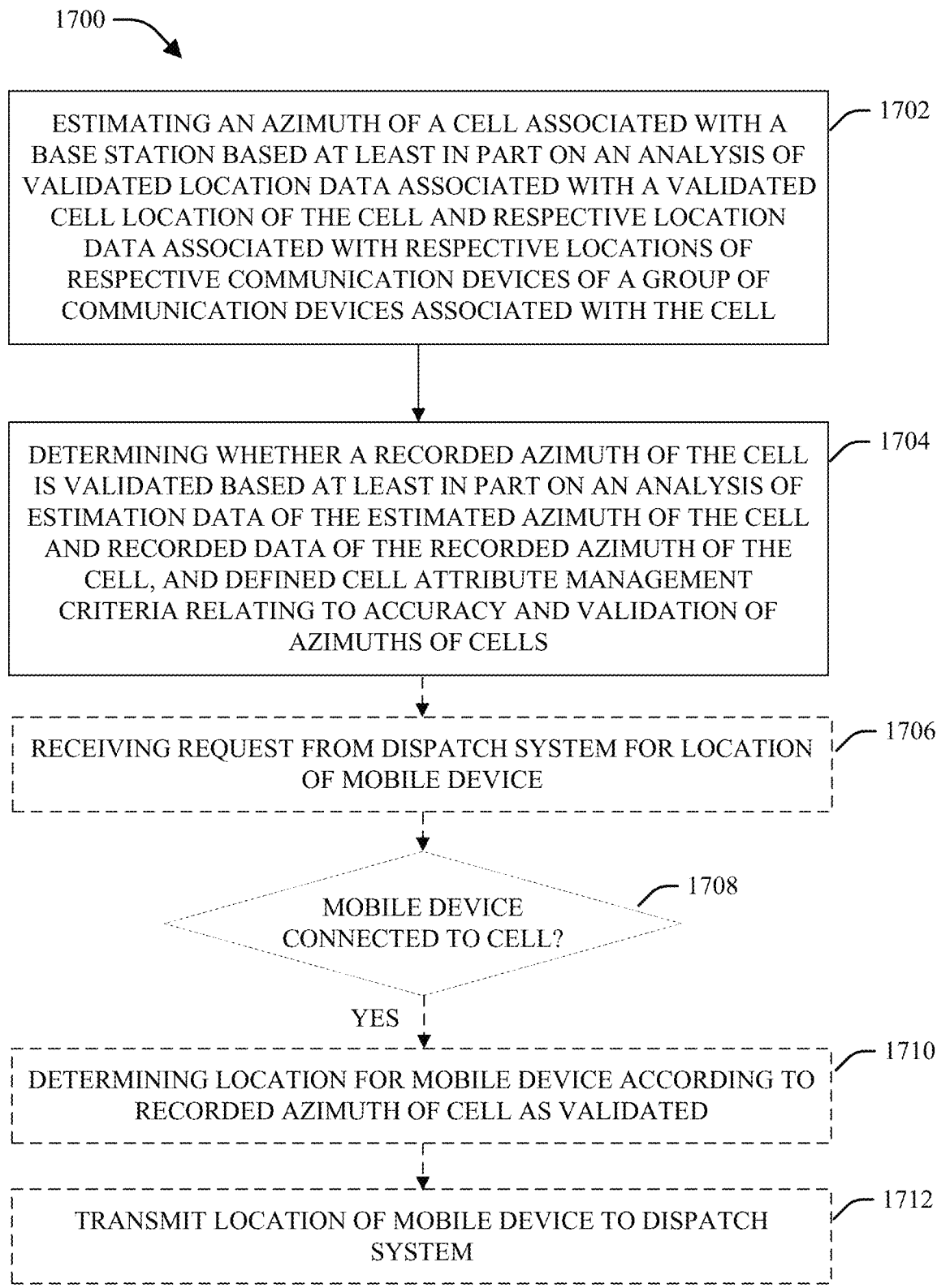
FIG. 17 illustrates a flow chart of an example method that can estimate an azimuth of a cell and can utilize the estimated azimuth of the cell to facilitate determining whether a recorded azimuth of the cell can be validated, in accordance with various aspects and embodiments of the disclosed subject matter.

FIG. 17 illustrates a flow chart of an example method 1700 that can estimate an azimuth of a cell and can utilize the estimated azimuth of the cell to facilitate determining whether a recorded azimuth of the cell can be validated, in accordance with various aspects and embodiments of the disclosed subject matter. The method 1700 can be employed by, for example, a system that can include the CAMC, a processor component (e.g., of or associated with the CAMC), and/or a data store (e.g., of or associated with the CAMC).

At 1702, an azimuth of a cell associated with a base station can be estimated based at least in part on an analysis of validated location data associated with a validated cell location of the cell and respective location data associated with respective locations of respective communication devices of a group of communication devices associated with the cell. The CAMC can determine and validate a cell location (e.g., the validated cell location) of the cell, as more fully described herein. The CAMC can estimate the azimuth (e.g., estimated azimuth) of the cell based at least in part on the results of the analysis of the validated location data associated with the validated cell location of the cell and the respective location data associated with the respective locations of the respective communication devices of the group of communication devices associated with the cell, as more fully described herein.

At 1704, a determination can be made regarding whether a recorded azimuth of the cell is validated based at least in part on an analysis of estimation data of the estimated azimuth of the cell and recorded data of the recorded azimuth of the cell, and defined cell attribute management criteria relating to accuracy and validation of azimuths of cells. The CAMC can receive the recorded data (e.g., recorded cell azimuth data) regarding one or more recorded azimuths of the cell from one or more data sources (e.g., one or more data source device associated with one or more data sources). The CAMC can analyze the estimation data of the estimated azimuth of the cell and the recorded data of the one or more recorded azimuths of the cell, and can apply the defined cell attribute management criteria relating to accuracy and validation of azimuths of cells during the analysis of the estimation data and the recorded data, as more fully described herein. The CAMC can determine whether any of the one or more recorded azimuths of the cell can be validated based at least in part on the results of the analysis of the estimation data and the recorded data, and the application of the defined cell attribute management criteria during such analysis, as more fully described herein. If the CAMC determines that more than one recorded azimuth of the cell potentially can qualify as being a validated azimuth for the cell, the CAMC can determine the recorded azimuth of the one or more potentially qualifying recorded azimuths that is the most accurate recorded azimuth, and can select that recorded azimuth as the validated recorded azimuth based at least in part on the results of the analysis of the estimation data and the recorded data, and the application of the defined cell attribute management criteria during such analysis, as more fully described herein.

If the CAMC can validate a recorded azimuth, the CAMC can tag the recorded azimuth as validated (e.g., validated or verified as accurate). If the CAMC is not able to validate a recorded azimuth, the CAMC can tag that recorded azimuth as invalid or inaccurate. If the CAMC determines that a cell is an omni cell, the CAMC can tag the cell as an omni cell. During an E911 dispatch operation, a mobility E911 call from a mobile communication device can route to a serving public safety answering point (PSAP) based on the location and azimuth of the cell site that handles the E911 call (Step 1706 and Step 1708). Also, with regard to E911 operations, the disclosed subject matter, by providing desirably accurate cell location information and cell azimuth information, can enable an E911 dispatch team to desirably and accurately identify PSAP call routing/caller location (Step 1710), during an E911 call (e.g., where GPS or other location coordinates of a communication device are not available), and provide desired emergency assistance in a more timely (e.g., quicker) manner (Step 1712).

Figure 18:
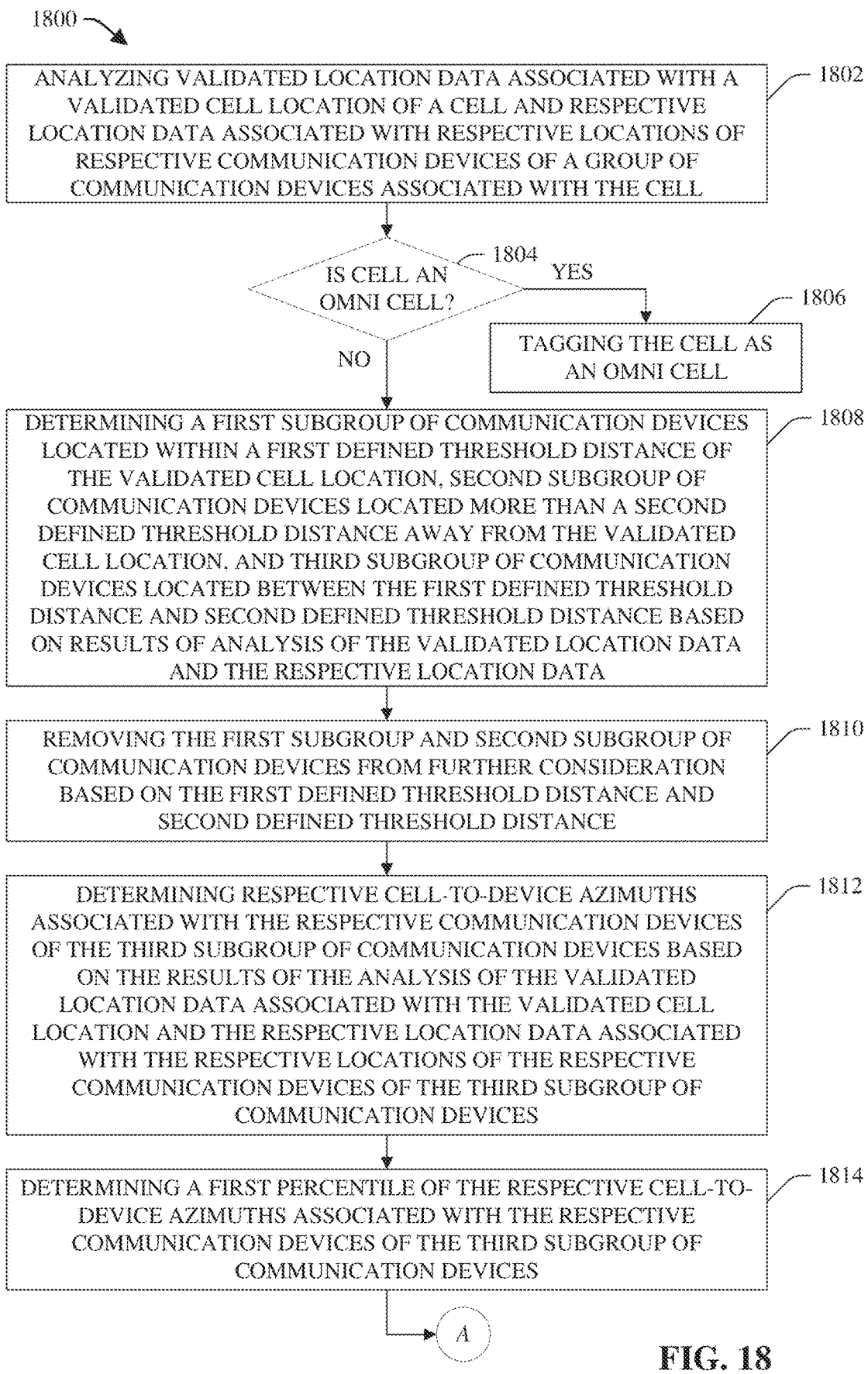
FIGS. 18-20 illustrate a flow chart of another example method that can estimate an azimuth of a cell and can utilize the estimated azimuth of the cell to facilitate determining whether a recorded azimuth of the cell can be validated, in accordance with various aspects and embodiments of the disclosed subject matter.
Figure 19:
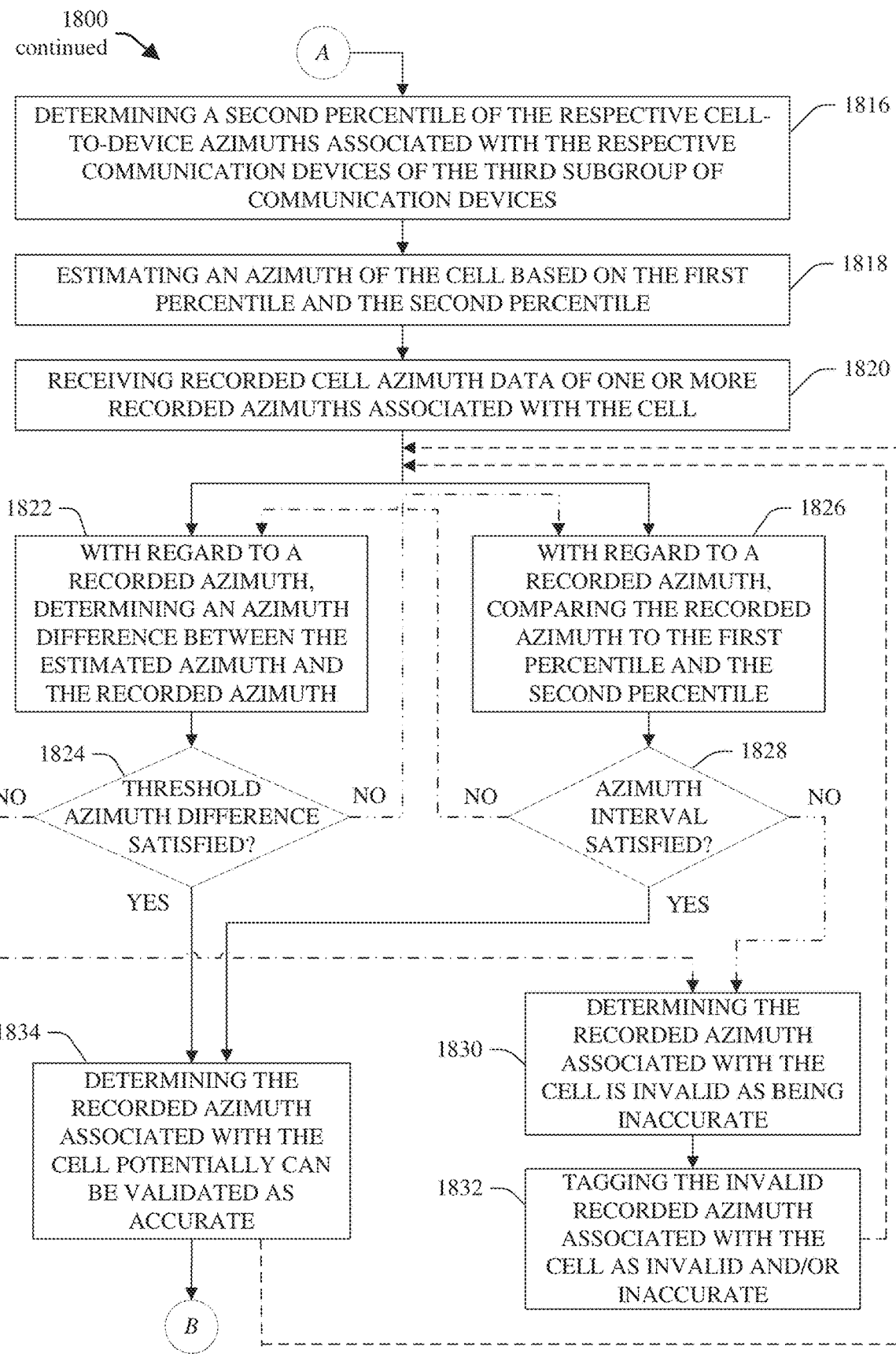
Figure 20:
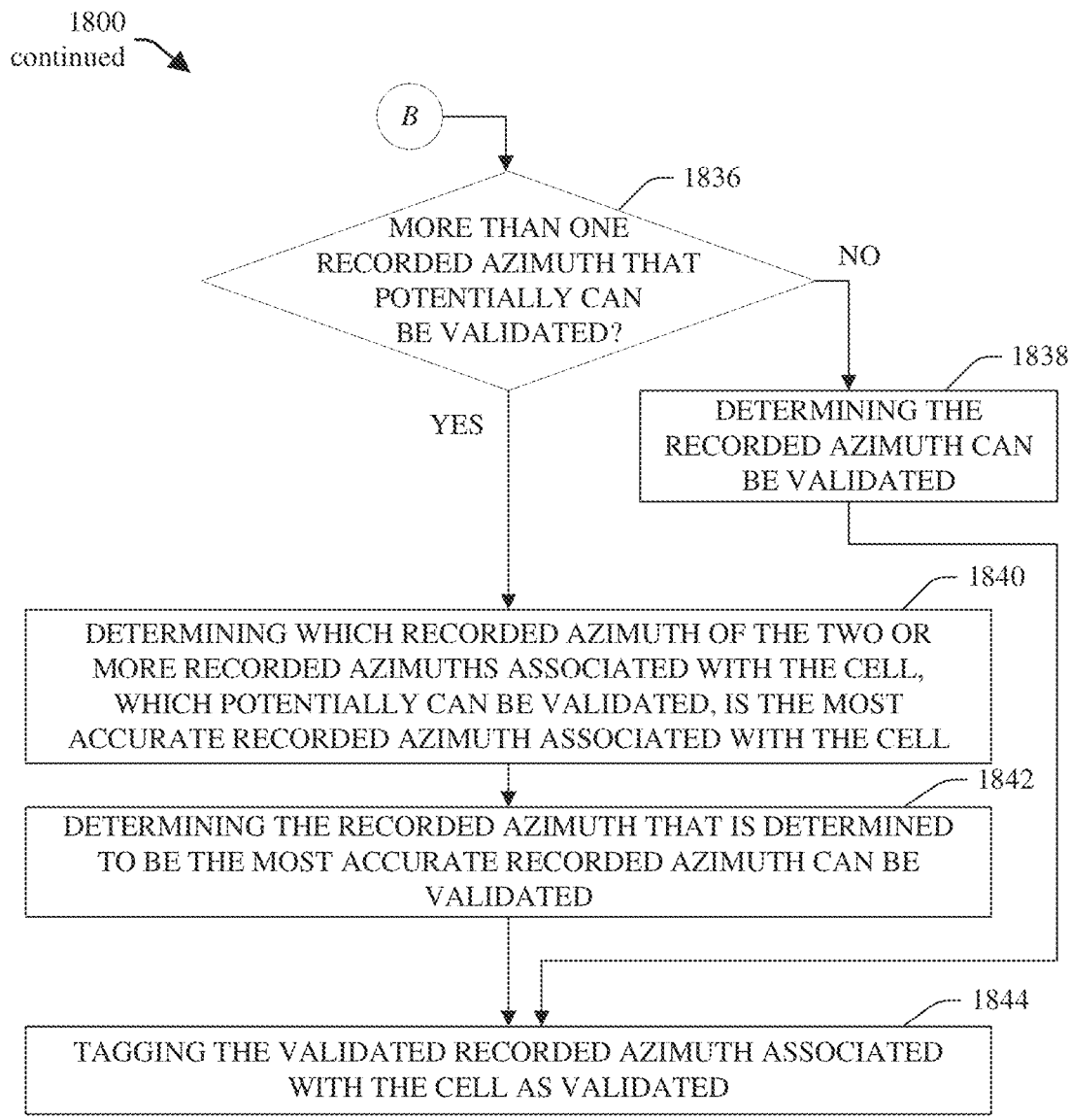

FIGS. 18-20 illustrates a flow chart of another example method 1800 that can estimate an azimuth of a cell and can utilize the estimated azimuth of the cell to facilitate determining whether a recorded azimuth of the cell can be validated, in accordance with various aspects and embodiments of the disclosed subject matter. The method 1800 can be employed by, for example, a system that can include the CAMC, a processor component (e.g., of or associated with the CAMC), and/or a data store (e.g., of or associated with the CAMC).

At 1802, validated location data associated with a validated cell location of a cell and respective location data associated with respective locations of respective communication devices of a group of communication devices associated with the cell can be analyzed. The CAMC can determine and validate a cell location (e.g., the validated cell location) of the cell, which can be one cell of one or more cells that can be associated with a base station, as more fully described herein. The CAMC can analyze the validated location data associated with the validated cell location of the cell and the respective location data associated with the respective locations of the respective communication devices.

At 1804, a determination can be made regarding whether the cell is an omni cell based at least in part on the results of the analysis of the validated location data associated with the validated cell location of the cell and the respective location data associated with the respective locations of the respective communication devices. The CAMC can determine whether the cell is an omni cell based at least in part on the results of such analysis.

If it is determined that the cell is an omni cell, at 1806, the cell can be tagged as an omni cell. If, based at least in part on the analysis, the CAMC determines that the cell is an omni cell, the CAMC can tag the cell as omni (e.g., as an omni cell). The CAMC can store information regarding the cell, including the tag (e.g., tag information or metadata that indicates the cell is an omni cell), in the CLAPC.

Referring again reference numeral 1804, if, at 1804, it is determined that the cell is not an omni cell, the method 1800 can proceed to reference numeral 1808 and can proceed from that point. If, based at least in part on the analysis, the CAMC determines that the cell is not an omni cell, the CAMC can continue to perform other operations of the method 1800.

At 1808, a first subgroup of communication devices located within a first defined threshold distance of the validated cell location of the cell, a second subgroup of communication devices located more than a second defined threshold distance away from the validated cell location of the cell, and a third subgroup of communication devices located between the first distance and the second distance can be determined based at least in part on the results of the analysis of the validated location data and the respective location data. For instance, based at least in part on such analysis results, the CAMC can determine the first subgroup of communication devices located within the first distance of the validated cell location of the cell, the second subgroup of communication devices located more than the second distance away from the validated cell location of the cell, and the third subgroup of communication devices located between the first distance and the second distance.

At 1810, the first subgroup of communication devices and the second subgroup of communication devices of the group of communication devices can be removed from further consideration based at least in part on the first defined threshold distance and the second defined threshold distance, in accordance with the defined cell attribute management criteria. The CAMC can remove or filter out the first subgroup of communication devices and the second subgroup of communication devices from consideration, in accordance with the defined cell attribute management criteria, which, in part, can indicate that communication devices that are too close (e.g., within the first defined threshold distance) to and too far (e.g., more than the second defined threshold distance) away from the validated cell location of the cell are to be removed from consideration (e.g., as outlier communication devices) with regard to estimating the azimuth of the cell or determining whether a recorded azimuth can be validated.

At 1812, respective cell-to-device azimuths associated with the respective communication devices of the third subgroup of communication devices can be determined based at least in part on the results of the analysis of the validated location data associated with the validated cell location of the cell and the respective location data associated with the respective locations of the respective communication devices of the third subgroup of communication devices. The CAMC can determine (e.g., calculate) the respective cell-to-device azimuths associated with the respective communication devices of the third subgroup based at least in part on the analysis results.

At 1814, a first percentile of the respective cell-to-device azimuths associated with the respective communication devices of the third subgroup of communication devices can be determined. At this point, the method 1800 can proceed to reference point A, wherein the method 1800 can proceed from reference point A, as depicted in FIG. 19 and described herein.

At 1816, a second percentile of the respective cell-to-device azimuths associated with the respective communication devices of the third subgroup of communication devices can be determined. The CAMC can determine (e.g., calculate) the first percentile (e.g., lower) and the second percentile (e.g., higher) of the respective cell-to-device azimuths associated with the respective communication devices of the third subgroup of communication devices, in accordance with the defined cell attribute management criteria, which can indicate or specify the first percentile and the second percentile to be utilized in such determination. In accordance with various embodiments, the first percentile can be in a first range that can extend from a fifth percentile (e.g., p(5%)) to a twentieth percentile (e.g., p(20%)), and wherein the second percentile can be in a second range that can extend from an eightieth percentile (e.g., p(80%)) to a ninety-fifth percentile (e.g., p(95%)).

At 1818, an azimuth of the cell can be estimated based at least in part on the first percentile of the respective cell-to-device azimuths and the second percentile of the respective cell-to-device azimuths. In some embodiments, the CAMC can estimate the azimuth of the cell (e.g., can determine or calculate the estimated azimuth of the cell) based at least in part on (e.g., as a function of) the first percentile of the respective cell-to-device azimuths and the second percentile of the respective cell-to-device azimuths (e.g., can determine the estimated azimuth of the cell as being equal to the combination (e.g., the sum) of (the first percentile of the respective cell-to-device azimuths plus the second percentile of the respective cell-to-device azimuths) divided by two).

At 1820, recorded cell azimuth data of one or more recorded azimuths associated with the cell can be received. The CAMC can receive the recorded cell azimuth data of the one or more recorded azimuths associated with the cell from one or more data sources. In accordance with various embodiments, the CAMC (or a component, such as or including a database associated with the CAMC) can receive the recorded cell azimuth data, or one or more portions thereof, from the one or more data sources.

In some embodiments, the method 1800 can proceed from reference numeral 1820 to reference numeral 1822 or can proceed from reference numeral 1820 to reference numeral 1826. In certain embodiments, if desired, the operation at reference numeral 1822 (and associated operations thereafter) and the operation at reference numeral 1826 (and associated operations thereafter) can be performed in parallel or concurrently (e.g., simultaneously or substantially simultaneously).

At 1822, with regard to each recorded azimuth (or each of one or more desired recorded azimuths) of the one or more recorded azimuths associated with the cell, an azimuth difference between the estimated azimuth and the recorded azimuth associated with the cell can be determined based at least in part on an analysis of the estimation data and the recorded cell azimuth data. The CAMC can determine (e.g., calculate) the azimuth difference between the estimated azimuth and the recorded azimuth associated with the cell based at least in part on the results of the analysis of the estimation data and the recorded cell azimuth data.

At 1824, with regard to each recorded azimuth (or each of one or more desired recorded azimuths) of the one or more recorded azimuths associated with the cell, a determination can be made regarding whether the azimuth difference is less than or equal to (e.g., satisfies) a defined threshold azimuth difference. For each (or each of one or more desired recorded azimuths) recorded azimuth of the one or more recorded azimuths associated with the cell, the CAMC can determine whether the azimuth difference is less than or equal to a defined threshold azimuth difference based at least in part on the results of comparing the azimuth difference to the defined threshold azimuth difference. The CAMC can determine or select the defined threshold azimuth difference to apply based at least in part on the defined cell attribute management criteria.

With regard to each recorded azimuth (or each of one or more desired recorded azimuths) of the one or more recorded azimuths associated with the cell, if, at 1824, it is determined that the azimuth difference associated with the cell is less than or equal to the defined threshold azimuth difference, the method 1800 can proceed to reference numeral 1834, wherein a determination can be made that the recorded azimuth associated with the cell potentially can be validated as accurate, as more fully described herein. For instance, with regard to a recorded azimuth, if the CAMC determines that the azimuth difference is less than or equal to (e.g., satisfies) the defined threshold azimuth difference, the CAMC can determine that the recorded azimuth associated with the cell potentially can be validated as accurate, as more fully described herein.

If, instead, at 1824, with regard to a recorded azimuth, it is determined that the azimuth difference is greater than the defined threshold azimuth difference, the method 1800 can proceed to reference numeral 1826, wherein the recorded azimuth can be compared to the first percentile of the respective cell-to-device azimuths and the second percentile of the respective cell-to-device azimuths, as more fully described herein, and the method 1800 can proceed from that point. For instance, with regard to a recorded azimuth, if the CAMC determines that the azimuth difference is greater than (e.g., does not satisfy) the defined threshold azimuth difference, the CAMC can proceed to comparing the recorded azimuth to the first percentile of the respective cell-to-device azimuths and the second percentile of the respective cell-to-device azimuths, as more fully described herein.

At 1826, with regard to each recorded azimuth (or each of one or more desired recorded azimuths) of the one or more recorded azimuths associated with the cell, the recorded azimuth associated with the cell can be compared to the first percentile of the respective cell-to-device azimuths and the second percentile of the respective cell-to-device azimuths associated with the respective communication devices of the third subgroup of communication devices. For each recorded azimuth (or each of one or more desired recorded azimuths) of the one or more recorded azimuths associated with the cell, the CAMC can compare the recorded azimuth associated with the cell to the first percentile of the respective cell-to-device azimuths and the second percentile of the respective cell-to-device azimuths associated with the respective communication devices of the third subgroup of communication devices. (A desired recorded azimuth can be, for example, a recorded azimuth that is still under evaluation. For instance, if a recorded azimuth already has been determined to be potentially validated as accurate (e.g., due to the azimuth difference satisfying the defined threshold azimuth difference), it is not necessary to evaluate such recorded azimuth by comparing such recorded azimuth to the azimuth interval, and evaluation of such recorded azimuth can be bypassed.)

At 1828, based at least in part on the results of the comparing, a determination can be made regarding whether the recorded azimuth associated with the cell is located between (e.g., satisfies) the azimuth interval of the first percentile of the respective cell-to-device azimuths and the second percentile of the respective cell-to-device azimuths associated with the respective communication devices of the third subgroup of communication devices. For each recorded azimuth of the one or more recorded azimuths associated with the cell, the CAMC can determine whether the recorded azimuth associated with the cell is located between the azimuth interval (e.g., the desired azimuth interval) the first percentile of the respective cell-to-device azimuths and the second percentile of the respective cell-to-device azimuths associated with the respective communication devices of the third subgroup of communication devices.

With regard to each recorded azimuth (or each of one or more desired recorded azimuths) of the one or more recorded azimuths associated with the cell, if, at 1828, it is determined that the recorded azimuth associated with the cell is located between (e.g., satisfies) the azimuth interval of the first percentile of the respective cell-to-device azimuths and the second percentile of the respective cell-to-device azimuths, the method 1800 can proceed to reference numeral 1834, wherein a determination can be made that the recorded azimuth associated with the cell potentially can be validated as accurate, as more fully described herein. For instance, with regard to a recorded azimuth, if the CAMC determines that the recorded azimuth associated with the cell is located between (e.g., satisfies) the azimuth interval of the first percentile of the respective cell-to-device azimuths and the second percentile of the respective cell-to-device azimuths, the CAMC can determine that the recorded azimuth associated with the cell potentially can be validated as accurate, as more fully described herein.

In other embodiments, as an alternative to the method 1800 proceeding from reference numeral 1820 to reference numeral 1822 and reference numeral 1824, and, if it is determined that the azimuth difference associated with a cell is greater than the defined threshold azimuth difference, from reference numeral 1824 to reference numeral 1826 and reference numeral 1828, the method 1800 can, instead, proceed from reference numeral 1820 to reference numeral 1826 and reference numeral 1828, and, if it is determined that the recorded azimuth associated with the cell is not located between the first percentile of the respective cell-to-device azimuths and the second percentile of the respective cell-to-device azimuths, from reference numeral 1828 to reference numeral 1822 and reference numeral 1824 to determine the azimuth difference associated with the cell and determine whether the azimuth difference satisfies (e.g., is less than or equal to) the defined threshold azimuth difference.

At this point, the method 1800 can proceed from reference numeral 1828 to reference numeral 1830, or alternatively, can proceed from reference numeral 1824 to reference numeral 1830 (e.g., if the method 1800 has not already proceeded to reference numeral 1834).

At 1830, with regard to each recorded azimuth (or each of one or more desired recorded azimuths) of the one or more recorded azimuths associated with the cell, in response to determining that the azimuth difference is greater than the defined threshold azimuth difference and determining that the recorded azimuth associated with the cell is not located between the first percentile of the respective cell-to-device azimuths and the second percentile of the respective cell-to-device azimuths, a determination can be made that the recorded azimuth associated with the cell is invalid as being inaccurate. With regard to each recorded azimuth (or each of one or more desired recorded azimuths) of the one or more recorded azimuths associated with the cell, in response to determining that the azimuth difference is greater than the defined threshold azimuth difference and determining that the recorded azimuth associated with the cell is not located between the first percentile of the respective cell-to-device azimuths and the second percentile of the respective cell-to-device azimuths, the CAMC can determine that the recorded azimuth associated with the cell is invalid as being inaccurate.

At 1832, the invalid recorded azimuth associated with the cell can be tagged as invalid and/or inaccurate. If the CAMC determines that a recorded azimuth associated with the cell is invalid as being inaccurate, the CAMC can tag such recorded azimuth as being invalid and/or inaccurate. The CAMC can store information regarding the invalid recorded azimuth associated with the cell, including the recorded cell azimuth data associated with the invalid recorded azimuth and the tag (e.g., tag information or metadata that indicates the invalid recorded azimuth is invalid, inaccurate, and/or bad), in the CLAPC. At this point, if there is another recorded azimuth associated with the cell, the method 1800 can return to reference numeral 1822 and can proceed from that point.

Referring again to reference numerals 1824 and 1828, as disclosed herein, with regard to each recorded azimuth of the one or more recorded azimuths associated with the cell, in response to determining (e.g., at 1824) that the azimuth difference is less than or equal to the defined threshold azimuth difference or in response to determining (e.g., at 1828) that the recorded azimuth associated with the cell is located between the first percentile of the respective cell-to-device azimuths and the second percentile of the respective cell-to-device azimuths, at 1834, a determination can be made that the recorded azimuth associated with the cell potentially can be validated as accurate. For instance, with regard to a recorded azimuth associated with the cell, if the CAMC determines that the azimuth difference satisfies (e.g., is less than or equal to) the defined threshold azimuth difference, or if the CAMC determines that the recorded azimuth associated with the cell satisfies the azimuth interval (e.g., is located between the first percentile of the respective cell-to-device azimuths and the second percentile of the respective cell-to-device azimuths), the CAMC can determine that the recorded azimuth associated with the cell potentially can be validated as accurate.

At this point, if there is another recorded azimuth associated with the cell to consider (e.g., to evaluate), the method 1800 can return to reference numeral 1822 or alternatively reference numeral 1826 and can proceed from that point. Otherwise, if it is determined that there is not another recorded azimuth associated with the cell to consider, at this point, the method 1800 can proceed to reference point B, wherein the method 1800 can proceed from reference point B, as depicted in FIG. 20 and described herein.

At 1836, determining whether there is more than one recorded azimuth associated with the cell that potentially can be validated. The CAMC can analyze the validation-related results associated with the one or more recorded azimuths associated with the cell to determine whether there is more than one recorded azimuth associated with the cell that potentially can be validated.

If it is determined that only one recorded azimuth associated with the cell potentially can be validated, at 1838, a determination can be made that the one recorded azimuth associated with the cell can be validated as accurate. If the CAMC determines that there is only one recorded azimuth associated with the cell potentially can be validated, the CAMC can determine that the one recorded azimuth associated with the cell can be validated as accurate.

Referring again to reference numeral 1836, if, at 1836, it is determined that there is more than one recorded azimuth associated with the cell that potentially can be validated, at 1840, a determination can be made regarding which recorded azimuth of the two or more recorded azimuths associated with the cell, which potentially can be validated, is the most accurate recorded azimuth associated with the cell, based at least in part on the analysis of the two or more recorded azimuths associated with the cell, the estimated azimuth of the cell, the first percentile of the respective cell-to-device azimuths associated with the respective communication devices of the third subgroup of communication devices, and the second percentile of the respective cell-to-device azimuths associated with the respective communication devices of the third subgroup of communication devices. At 1842, the recorded azimuth of the two or more recorded azimuths associated with the cell that is determined to be the most accurate recorded azimuth can be determined to be validated as being accurate. For instance, if the CAMC determines that there is more than one recorded azimuth associated with the cell that potentially can be validated, the CAMC can determine which recorded azimuth of the two or more recorded azimuths associated with the cell, which potentially can be validated, is the most accurate recorded azimuth associated with the cell, based at least in part on the analysis (e.g., further analysis) of the two or more recorded azimuths associated with the cell, the estimated azimuth of the cell, the first percentile of the respective cell-to-device azimuths associated with the respective communication devices of the third subgroup of communication devices, and the second percentile of the respective cell-to-device azimuths associated with the respective communication devices of the third subgroup of communication devices. The CAMC can determine that the most accurate recorded azimuth of the two or more recorded azimuths associated with the cell is to be validated as being accurate.

In accordance with various embodiments, the method 1800 can proceed from reference numeral 1838 or reference numeral 1842 to reference numeral 1844. At 1844, the validated recorded azimuth associated with the cell can be tagged as validated and/or accurate. The CAMC can tag the validated recorded azimuth associated with the cell as validated and/or accurate. The CAMC can store information regarding the validated recorded azimuth associated with the cell, including the recorded cell azimuth data associated with the validated recorded azimuth and the tag (e.g., tag information or metadata that indicates the validated recorded azimuth is validated as being accurate or good), in the CLAPC.

Figure 21:
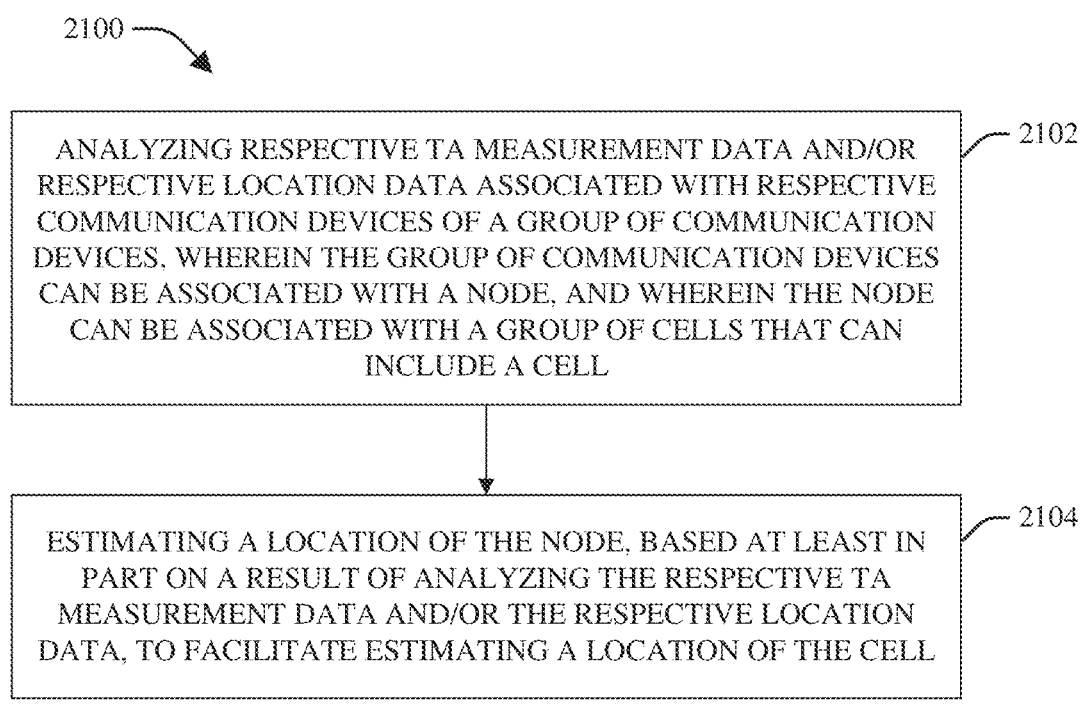
FIG. 21 illustrates a flow chart of an example method that can estimate a location of a node to facilitate estimating a location of a cell associated with the node, in accordance with various aspects and embodiments of the disclosed subject matter.

FIG. 21 illustrates a flow chart of an example method 2100 that can estimate a location of a node (e.g., base station) to facilitate estimating a location of a cell associated with the node, in accordance with various aspects and embodiments of the disclosed subject matter. The method 2100 can be employed by, for example, a system that can include the CAMC, a processor component (e.g., of or associated with the CAMC), and/or a data store (e.g., of or associated with the CAMC).

At 2102, respective TA measurement data and/or respective location data associated with respective communication devices of a group of communication devices can be analyzed, wherein the group of communication devices can be associated with a node, and wherein the node can be associated with a group of cells that can include a cell. The group of communication devices can be associated with (e.g., connected to, served by, reporting information to, detected by, or otherwise associated with) a node (e.g., base station) that can comprise or be associated with a group of cells, which can include one or more cells (e.g., co-located cells), such as the cell. The CAMC can receive the respective TA measurement data and/or the respective location data associated with the respective communication devices from the respective communication devices or from a network device(s) (e.g., base station or other network device) of the communication network. The CAMC can analyze the respective TA measurement data and/or the respective location data associated with the respective communication devices.

At 2104, a location of the node can be estimated, based at least in part on a result of analyzing the respective TA measurement data and/or the respective location data, to facilitate estimating a location of the cell. Based at least in part on the result of analyzing the respective TA measurement data and/or the respective location data associated with the respective communication devices, the CAMC can estimate the location of the node to facilitate estimating the location of the cell, as more fully described herein. Using the estimated location of the cell, the CAMC also can validate, or at least attempt to validate, the estimated location of the cell or a recorded cell location of the cell, which can be obtained from the CLAPC or other data source by the CAMC, as more fully described herein.

Figure 22:
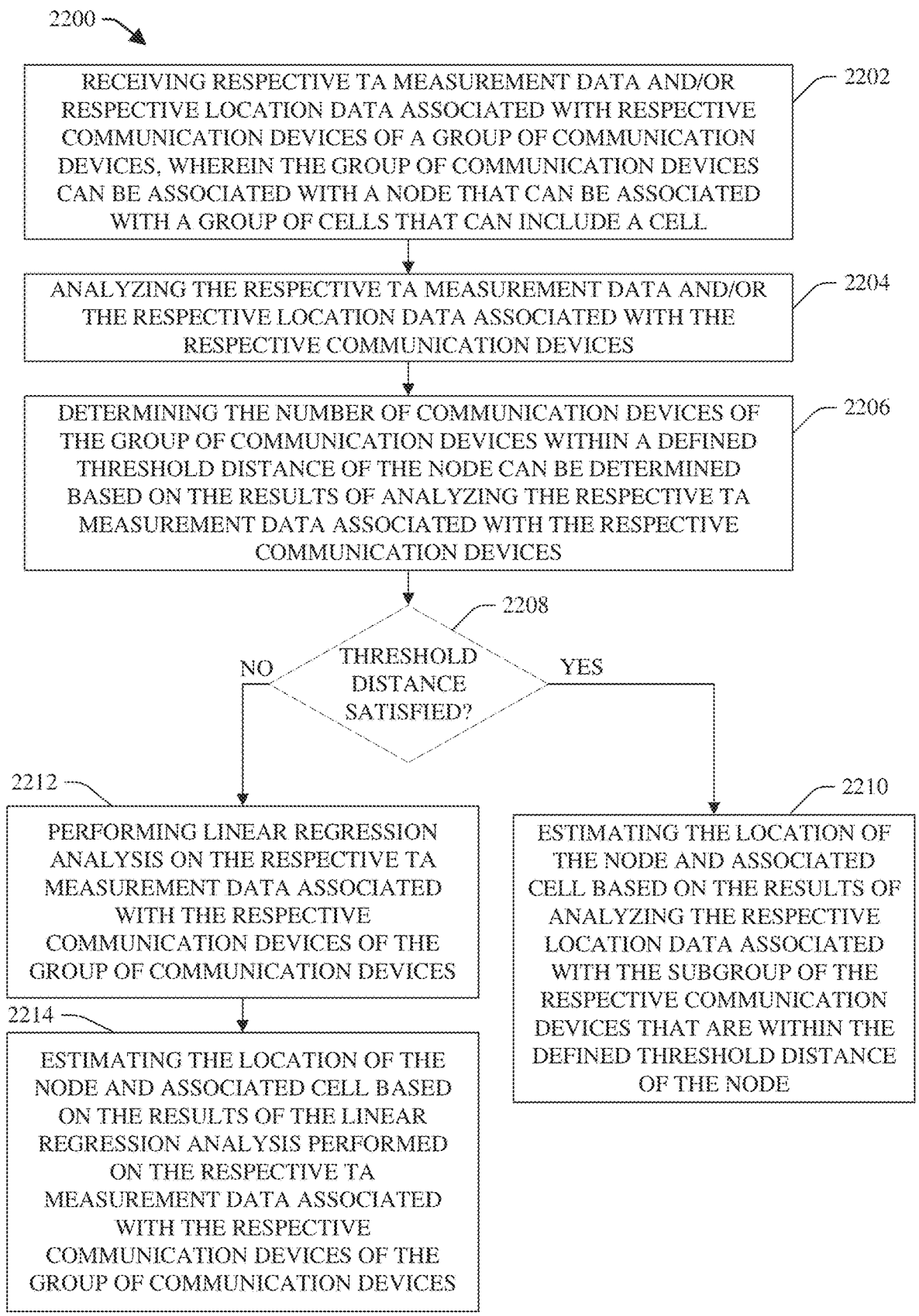
FIG. 22 depicts a flow chart of another example method that can estimate a location of a node to facilitate estimating a location of a cell associated with the node, in accordance with various aspects and embodiments of the disclosed subject matter.

FIG. 22 depicts a flow chart of another example method 2200 that can estimate a location of a node (e.g., base station) to facilitate estimating a location of a cell associated with the node, in accordance with various aspects and embodiments of the disclosed subject matter. The method 2200 can be employed by, for example, a system that can include the CAMC, a processor component (e.g., of or associated with the CAMC), and/or a data store (e.g., of or associated with the CAMC).

At 2202, respective TA measurement data and/or respective location data associated with respective communication devices of a group of communication devices can be received, wherein the group of communication devices can be associated with a node, and wherein the node can be associated with a group of cells that can include a cell. The group of communication devices can be associated with (e.g., connected to, served by, reporting information to, detected by, or otherwise associated with) a node (e.g., base station). The node can include or be associated with a group of cells, which can include one or more cells, such as the cell.

The CAMC can receive (e.g., via and/or associated base stations) the respective TA measurement data and/or the respective location data associated with the respective communication devices from the respective communication devices or from a network device(s) of the communication network. For instance, the CAMC can receive respective TA measurement data associated with some or all of the respective communication devices from a network device(s) of the communication network, wherein respective call trace records associated with the respective communication devices can include the respective TA measurement data. The CAMC also can receive respective location data (e.g., GPS or AGPS location data, and/or IoT geolocation data) from some or all of the respective communication devices. The CAMC can aggregate or combine the respective TA measurement data and/or the respective location data associated with the respective communication devices based at least in part on respective device identifiers and respective time data (e.g., timestamp data) associated with the respective communication devices.

At 2204, the respective TA measurement data and/or the respective location data associated with the respective communication devices can be analyzed. The CAMC can analyze the respective TA measurement data and/or the respective location data associated with the respective communication devices.

At 2206, the number of communication devices of the group of communication devices within a defined threshold distance of the node can be determined based at least in part on the results of analyzing the respective TA measurement data associated with the respective communication devices.

At 2208, a determination can be made regarding whether the number of communication devices within the defined threshold distance of the node satisfies a defined threshold value (e.g., defined threshold number of communication devices, or defined threshold percentage of communication devices of the group of communication devices). The CAMC can determine whether the number of communication devices within the defined threshold distance of the node (e.g., base station) satisfies (e.g., meets or exceeds) the defined threshold value (e.g., number or percentage), wherein the defined threshold value can be determined and/or set (e.g., by the CAMC) in accordance with the defined cell attribute management criteria.

In response to determining that the number of communication devices within the defined threshold distance of the node satisfies the defined threshold value, at 2210, the location of the node, and the associated cell, can be estimated based at least in part on the results of analyzing the respective location data associated with the subgroup of the respective communication devices that are within the defined threshold distance of the node. In response to determining that the number of communication devices within the defined threshold distance of the node satisfies the defined threshold value, the CAMC can estimate the location of the node, and accordingly, the associated cell, based at least in part on the results of analyzing the respective location data (e.g., AGPS data, GPS data, or IoT geolocation data) associated with the subgroup of the respective communication devices that are determined to be within the defined threshold distance of the node. In some embodiments, based at least in part on the results of analyzing the respective location data of the respective communication devices of the subgroup of communication devices, the CAMC can estimate the location of the node and associated cell as a function of the median (or average) of the respective locations (e.g., AGPS, GPS, or IoT locations) of the respective communication devices of the subgroup in relation to the node.

Referring again to reference numeral 2208, if, at 2208, it is determined that the number of communication devices within the defined threshold distance of the node does not satisfy the defined threshold value, at 2212, linear regression analysis can be performed on the respective TA measurement data associated with the respective communication devices of the group of communication devices to facilitate estimating the location of the node and associated cell. In response to determining that the number of communication devices within the defined threshold distance of the node does not satisfy the defined threshold value, the CAMC can perform the linear regression analysis on the respective TA measurement data associated with the respective communication devices of the group of communication devices, in accordance with (e.g., using or applying) the defined linear regression analysis algorithm, to facilitate estimating the location of the node and associated cell, as more fully described herein. In some embodiments, the CAMC can utilize machine learning techniques or algorithms in connection with performing the linear regression analysis.

At 2214, the location of the node and associated cell can be estimated based at least in part on the results of the linear regression analysis performed on the respective TA measurement data associated with the respective communication devices of the group of communication devices. The CAMC can estimate the location of the node, and accordingly, the associated cell, based at least in part on the results of the linear regression analysis performed on the respective TA measurement data associated with the respective communication devices, as more fully described herein.

Figure 23:
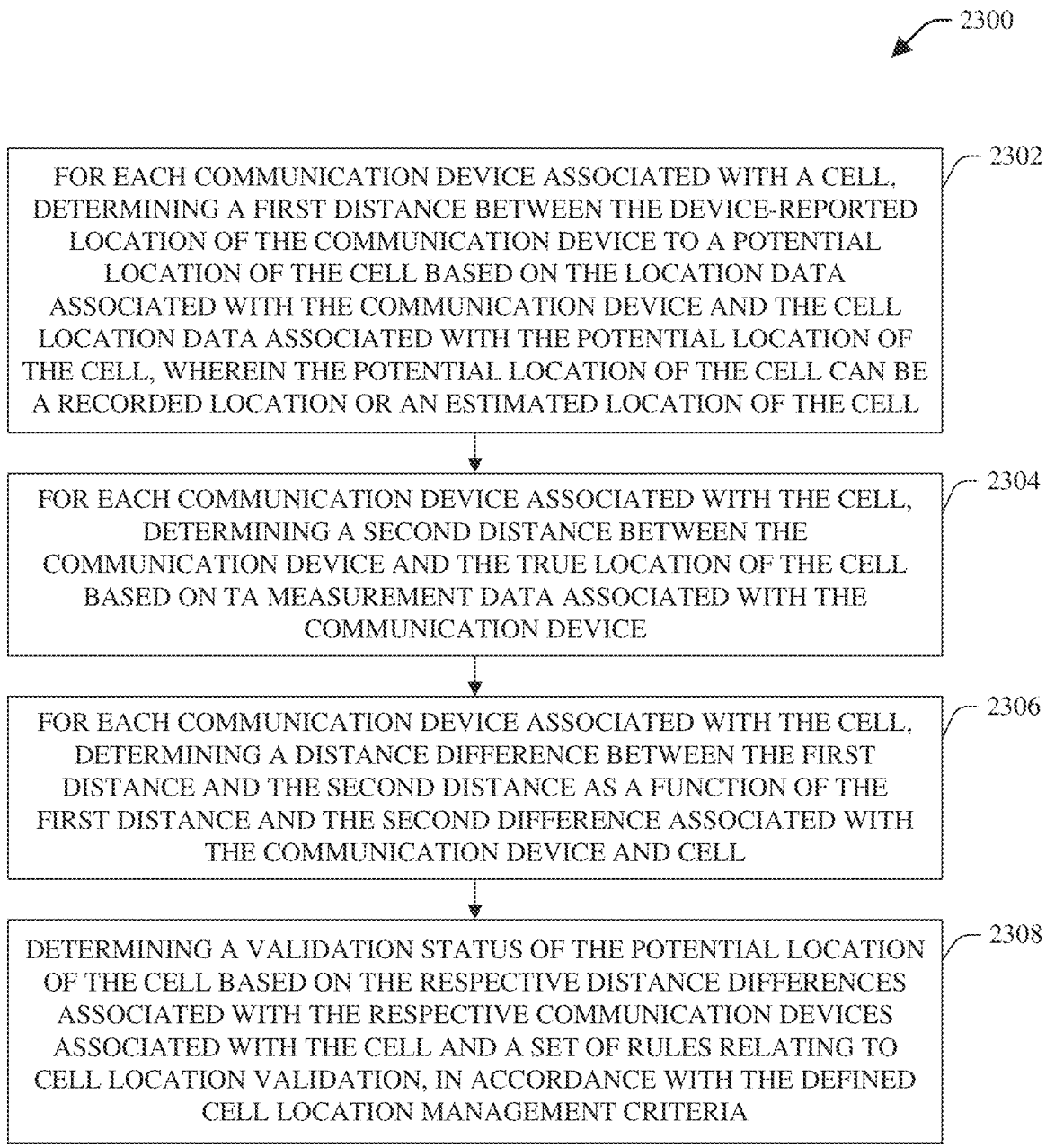
FIG. 23 presents a flow chart of an example method that can determine distance differences between a recorded or estimated location of a cell and respective locations of respective communication devices of a group of communication devices associated with the cell, to facilitate determining a validation status of the recorded location and/or estimated location of the cell, in accordance with various aspects and embodiments of the disclosed subject matter.

FIG. 23 presents a flow chart of an example method 2300 that can determine distance differences between a recorded or estimated location of a cell and respective locations of respective communication devices of a group of communication devices associated with the cell, to facilitate determining a validation status of the recorded location and/or estimated location of the cell, in accordance with various aspects and embodiments of the disclosed subject matter. The method 2300 can be employed by, for example, a system that can include the CAMC, a processor component (e.g., of or associated with the CAMC), and/or a data store (e.g., of or associated with the CAMC).

At 2302, for each communication device associated with a cell, a first distance between the device-reported location of the communication device to a potential location of the cell can be determined based at least in part on the location data associated with the communication device and the cell location data associated with the potential location of the cell, wherein the potential location of the cell can be a recorded location of the cell or an estimated location of the cell. For each communication device associated with the cell, the CAMC can determine (e.g., calculate) the first distance, D1, between the device-reported location of the communication device to the potential location of the cell based at least in part on the location data (e.g., AGPS or GPS location data) associated with the communication device and the cell location data associated with the potential location of the cell.

At 2304, for each communication device associated with the cell, a second distance between the communication device and the true location of the cell can be determined based at least in part on TA measurement data associated with the communication device. The TA measurement data associated with the communication device can be reported between the communication device and the cell at the true cell location. For each communication device associated with the cell, the CAMC can determine the second distance, D2, between the communication device and the true location of the cell as a function of the TA measurement data associated with the communication device and a multipath effect value that can represent the multipath effect associated with the communication device.

At 2306, for each communication device associated with the cell, a distance difference between the first distance and the second distance can be determined as a function of the first distance and the second difference associated with the communication device and cell. For each communication device associated with the cell, the CAMC can determine (e.g., calculate) the distance difference (DD) between the first distance and the second distance as a function of the first distance and the second difference associated with the communication device and cell. For example, the CAMC can determine the distance difference as the absolute value of the difference between the first distance and the second distance associated with the communication device and cell. The absolute value of the distance difference between the first distance and the second difference can be less than or equal to the amount of error in distance between the potential location of the cell (e.g., recorded location of the cell or estimated location of the cell) and the true location of the cell, wherein such error in distance also can be referred to as ERR.

At 2308, a validation status of the potential location of the cell can be determined based at least in part on the respective distance differences associated with the respective communication devices associated with the cell and a set of rules relating to cell location validation, in accordance with the defined cell attribute management criteria. The CAMC can determine the validation status of the potential location of the cell (e.g., recorded location of the cell or estimated location of the cell) based at least in part on the respective distance differences associated with the respective communication devices associated with the cell and the set of rules, as more fully described herein. The CAMC can determine the validation status based at least in part on the result of determining which rule, if any, of the rule set is satisfied.

For instance, the CAMC can determine (e.g., calculate) the respective upper bounds (UBs) of ERR associated with the respective communication devices based at least in part on (e.g., as a function of) the respective first distances and the respective TA measurement data (and a defined distance factor) associated with the respective communication devices, as more fully described herein. If the CAMC determines that the respective UBs of ERR associated with a portion of the respective communication devices in a defined percentile (e.g., a bottom or lower end percentile, such as 1 percentile, which can be the bottom 1% of the UB values associated with the communication devices, or another desired percentile value) satisfy the defined threshold distance (e.g., 150 meters, or other desired distance greater than or less than 150 meters) associated with a first rule of the set of rules, the CAMC can determine that the potential (e.g., recorded or estimated) location of the cell is good, can flag the potential location of the cell as being good, and can tag the potential location of the cell as accurate.

If the CAMC determines that one or more of the respective UBs of ERR associated with the portion of the respective communication devices in the defined percentile do not satisfy the defined threshold distance associated with the first rule, the CAMC can determine that further analysis is to be performed to facilitate determining whether the potential cell location is to be flagged as good and tagged as accurate, is to be flagged as fine and tagged as acceptable, is to be flagged as bad and tagged as unacceptable, or is to be flagged and tagged as uncertain, based at least in part on the set of rules, as more fully described herein.

Figure 24:
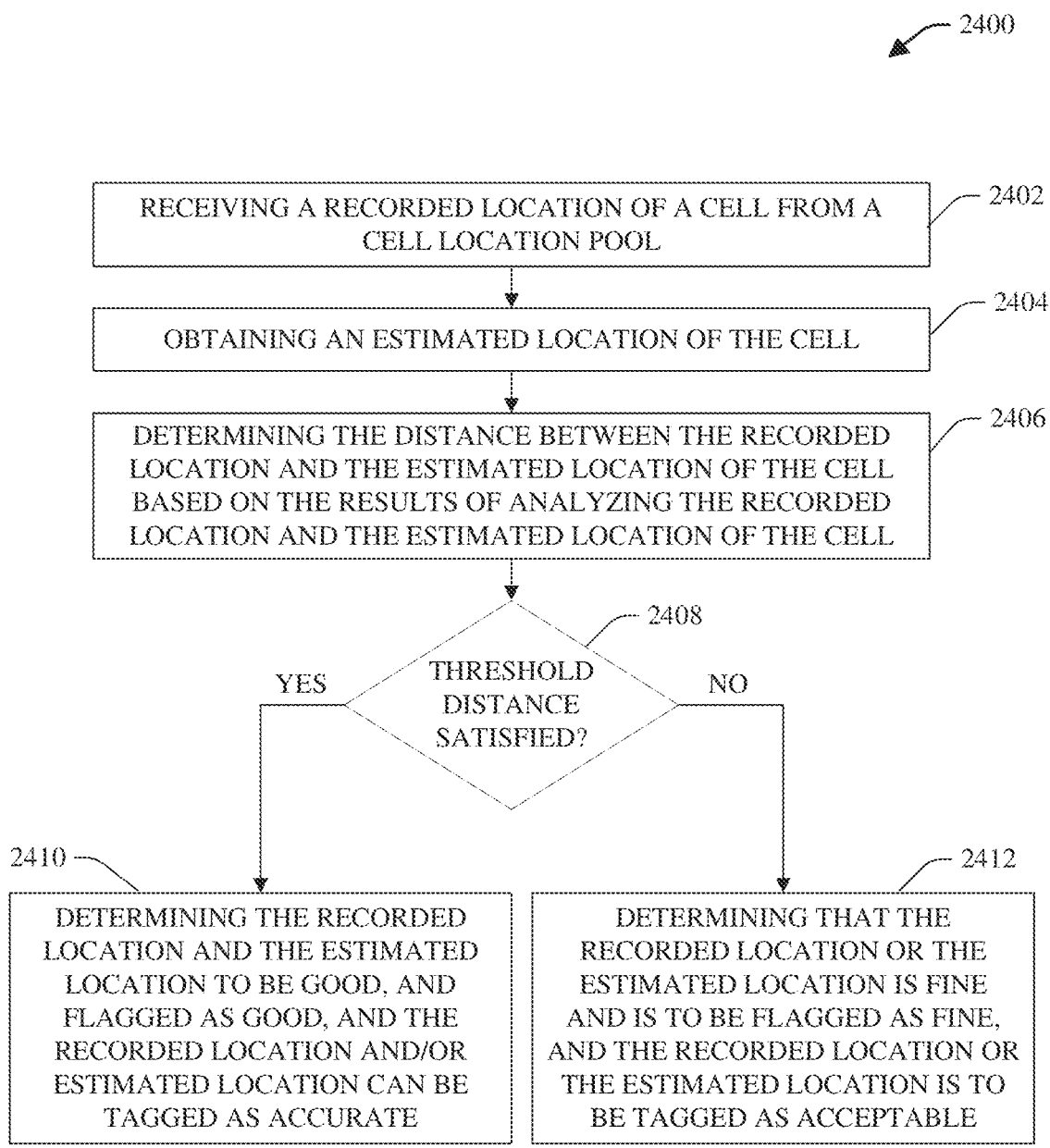
FIG. 24 illustrates a flow chart of an example method that can determine a distance between a recorded location of a cell and an estimated location of the cell to facilitate determining a validation status of the recorded location and/or estimated location of the cell, in accordance with various aspects and embodiments of the disclosed subject matter.

FIG. 24 illustrates a flow chart of an example method 2400 that can determine a distance between a recorded location of a cell and an estimated location of the cell to facilitate determining a validation status of the recorded location and/or estimated location of the cell, in accordance with various aspects and embodiments of the disclosed subject matter. The method 2400 can be employed by, for example, a system that can include the CAMC, a processor component (e.g., of or associated with the CAMC), and/or a data store (e.g., of or associated with the CAMC). The method 2400 can facilitate cross validation of the recorded location and the estimated location of the cell, as well as facilitate determining a validation status of the recorded location and/or estimated location of the cell.

The method 2400 can be utilized, for example, in instances where the CAMC determines that one or more of the respective UBs of ERR associated with the portion of the respective communication devices in the defined percentile (e.g., a bottom or lower end percentile, such as 1 percentile) do not satisfy the defined threshold distance associated with the first rule, and the CAMC determines that one or more of the respective distance differences (DDs) associated with a second portion of the respective communication devices in a second defined percentile (e.g., another lower end percentile, such as the $25^{th}$ percentile) do not satisfy a second defined threshold distance associated with a second rule of the set of rules, as more fully described herein.

At 2402, a recorded location of a cell can be received from a cell location pool. The CAMC can receive the recorded location of the cell from the cell location pool of the CLAPC.

At 2404, an estimated location of the cell can be obtained. The CAMC can obtain (e.g., retrieve) the estimated location of the cell from a data store (e.g., when the estimated cell location already has been determined) of the CAMC or can obtain the estimated location of the cell by determining the estimated location. For instance, the CAMC can determine the estimated location of the cell, as more fully described herein, and can store the estimated location of the cell in the data store and/or can subsequently (e.g., immediately or substantially immediately) use the estimated location of the cell to facilitate determining a validation status of the recorded location and/or estimated location of the cell.

At 2406, the distance between the recorded location and the estimated location of the cell can be determined based at least in part on the results of analyzing the recorded location and the estimated location of the cell. The CAMC can analyze the recorded location of the cell and the estimated location of the cell. Based at least in part on the results of the analysis, the CAMC can determine (e.g., calculate) the distance between the recorded location of the cell and the estimated location of the cell (the D_RE).

At 2408, a determination can be made regarding whether the distance between the recorded location and the estimated location of the cell satisfies a defined threshold distance. The CAMC can determine whether the distance between the recorded location and the estimated location of the cell satisfies (e.g., is equal to or less than) the defined threshold distance based at least in part on the result of comparing the distance to the defined threshold distance, wherein a defined rule (e.g., first rule of the set of rules) can specify the defined threshold distance to be applied. The CAMC can determine or set the defined threshold distance (e.g., defined threshold D_RE) based at least in part on the defined cell attribute management criteria (e.g., the defined rule specified by the defined cell attribute management criteria). In some embodiments, the defined threshold distance can be 150 meters; and, in other embodiments, the defined threshold distance can be less than or more than 150 meters, as indicated or specified by the defined cell attribute management criteria.

In response to determining that the distance between the recorded location and the estimated location of the cell satisfies the defined threshold distance, at 2410, the recorded location and the estimated location can be determined to be, and flagged as, good, and the recorded location and/or estimated location can be tagged as accurate. In response to determining that the distance between the recorded location and the estimated location of the cell satisfies the defined threshold distance, the CAMC can determine that the recorded location and the estimated location are good, can flag the recorded location and/or estimated location as being good, and can tag the recorded location and/or estimated location as accurate.

Referring again to reference numeral 2408, if, at 2408, it is determined that the distance between the recorded location and the estimated location of the cell does not satisfy (e.g., exceeds) the defined threshold distance, at 2412, the recorded location or the estimated location can be determined to be, and flagged as, fine, and the recorded location or estimated location can be tagged as acceptable. In response to determining that the distance between the recorded location and the estimated location of the cell does not satisfy the defined threshold distance, the CAMC can determine that the recorded location or the estimated location is fine, and is to be flagged as fine, and the recorded location or estimated location can be tagged as acceptable, as more fully described herein. With regard to multiple potential cell locations being evaluated, if more than one potential cell location is able to be flagged as fine, the CAMC can determine the best (e.g., more accurate) cell location of those potential cell locations, and can flag the best cell location as fine and tag that best cell location as acceptable, wherein the best cell location can be associated with the best data source, which can be the estimator component and its estimated cell location or a data source associated with a recorded data source.

Figure 25:
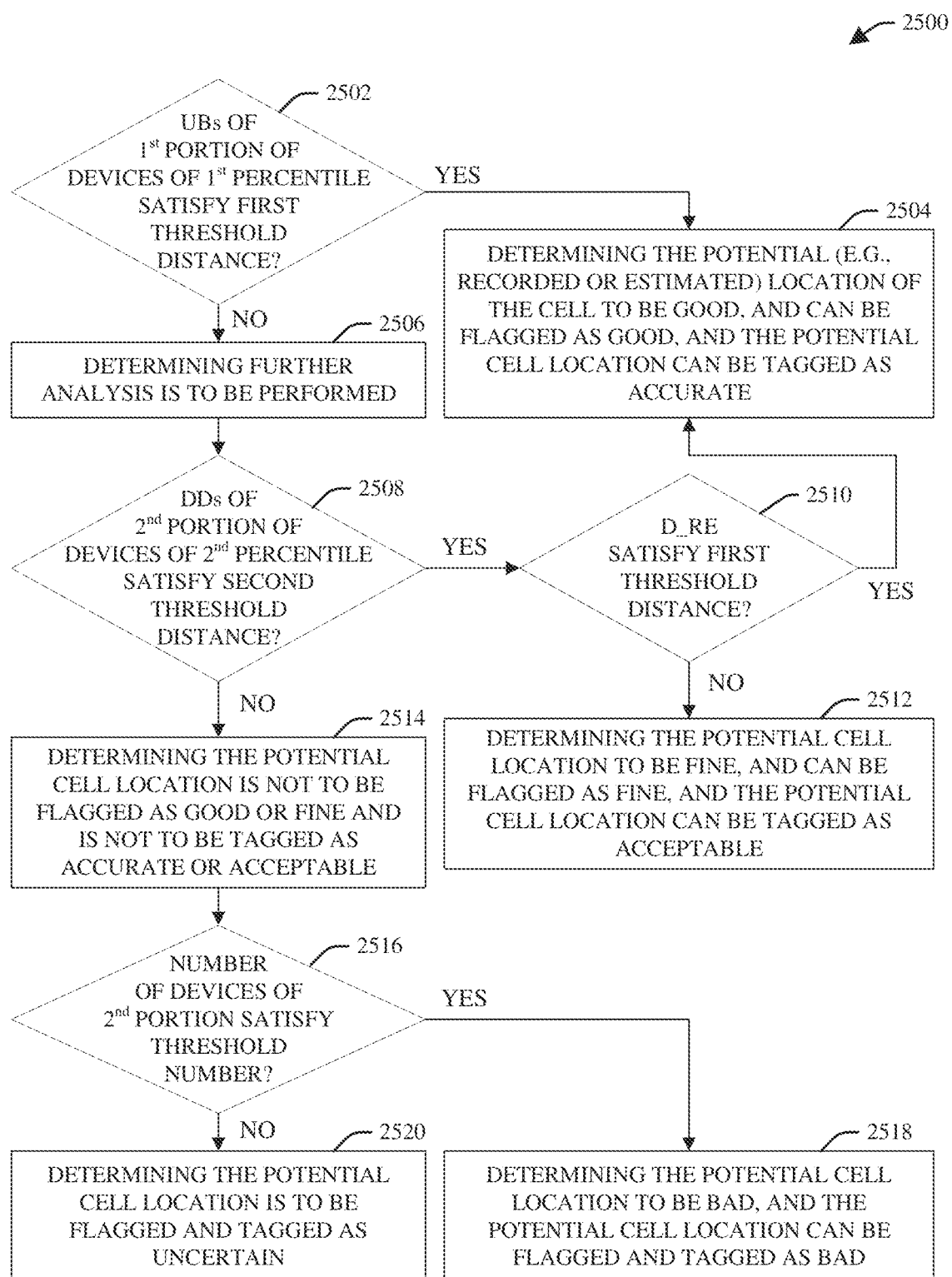
FIG. 25 illustrates a flow chart of an example method that can determine a validation status of a recorded location and/or an estimated location of a cell based at least in part on the distance between the recorded location and the estimated location, and/or distance differences between the recorded and/or estimated location of the cell and respective locations of respective communication devices of a group of communication devices associated with the cell, to facilitate determining a validation status of the recorded location and/or estimated location of the cell, in accordance with various aspects and embodiments of the disclosed subject matter.

FIG. 25 illustrates a flow chart of an example method 2500 that can determine a validation status of a recorded location and/or an estimated location of a cell based at least in part on the distance between the recorded location and the estimated location, and/or distance differences between the recorded and/or estimated location of the cell and respective locations of respective communication devices of a group of communication devices associated with the cell, to facilitate determining a validation status of the recorded location and/or estimated location of the cell, in accordance with various aspects and embodiments of the disclosed subject matter. The method 2500 can be employed by, for example, a system that can include the CAMC, a processor component (e.g., of or associated with the CAMC), and/or a data store (e.g., of or associated with the CAMC).

At 2502, a determination can be made regarding whether respective UBs of ERR associated with a first portion of the respective communication devices in a first defined percentile satisfy the first defined threshold distance associated with a first rule of a set of rules. The CAMC can determine (e.g., calculate) the respective UBs of ERR associated with the respective communication devices based at least in part on (e.g., as a function of) respective first distances and respective TA measurement data (and a defined distance factor, such as, e.g., 78 m) associated with the respective communication devices, as more fully described herein. The CAMC can determine whether the respective UBs of ERR associated with the first portion of the respective communication devices in the first defined percentile (e.g., a bottom or lower end percentile, such as 1 percentile, or another desired percentile value) satisfy the first defined threshold distance associated with the first rule.

In response to determining that the respective UBs of ERR associated with the first portion of the respective communication devices in the first defined percentile satisfy the first defined threshold distance associated with the first rule, at 2504, the potential (e.g., recorded or estimated) location of the cell can be determined to be, and can be flagged as, good, and the potential location can be tagged as accurate. If the CAMC determines that the respective UBs of ERR associated with the first portion of the respective communication devices in the first defined percentile satisfy the defined threshold distance associated with the first rule, the CAMC can determine that the potential (e.g., recorded or estimated) location of the cell is good, can flag the potential location of the cell as being good, and can tag the potential location of the cell as accurate. Accordingly, the potential location of the cell can have a validation status of accurate.

Referring again to reference numeral 2502, if, at 2502, it is determined that one or more of the respective UBs of ERR associated with the first portion of the respective communication devices in the first defined percentile do not satisfy the first defined threshold distance associated with the first rule, at 2506, a determination can be made that further analysis is to be performed to facilitate determining a validation status of the recorded location and/or estimated location of the cell. If the CAMC determines that one or more of the respective UBs of ERR associated with the first portion of the respective communication devices in the first defined percentile do not satisfy the first defined threshold distance associated with the first rule, the CAMC can determine that further analysis is to be performed to facilitate determining a validation status of the recorded location and/or estimated location of the cell based at least in part on the set of rules.

At 2508, a determination can be made regarding whether respective distance differences (DDs) associated with a second portion of the respective communication devices in a second defined percentile satisfy a second defined threshold distance associated with a second rule of the set of rules. The CAMC can analyze (e.g., compare) the respective distance differences associated with the second portion of the respective communication devices in a second defined percentile (e.g., another lower end percentile, such as the $25^{th}$ percentile, which can be the bottom 25% of the respective distance differences associated with the respective communication devices, or other desired percentile value) satisfy the second defined threshold distance associated with the second rule. Based at least in part on the analysis results, the CAMC can determine whether the respective distance differences associated with the second portion of the respective communication devices in the second defined percentile satisfy (e.g., are less than or equal to) the second defined threshold distance associated with the second rule. In accordance with various embodiments, the second defined threshold distance can be the same as the first defined threshold distance (e.g., 150 meters (or other desired distance)) or different from the first defined threshold distance, as indicated or specified by the defined cell attribute management criteria.

In response to determining that the respective distance differences associated with the second portion of the respective communication devices in the second defined percentile satisfy the second defined threshold distance associated with the second rule, at 2510, a determination can be made regarding whether the distance between the recorded location of a cell and the estimated location of the cell (D_RE) satisfies a first defined threshold distance associated with the first rule. To facilitate determining the validation status of the potential cell location, if the CAMC determines that the respective distance differences associated with the second portion of the respective communication devices in the second defined percentile satisfy the second defined threshold distance associated with the second rule, the CAMC can determine whether the distance between the recorded location of the cell and the estimated location of the cell (D_RE) satisfies the first defined threshold distance associated with the first rule. For example, the CAMC can compare the distance between the recorded location and the estimated location of the cell to the first defined threshold distance (e.g., 150 meters, or other desired distance greater than or less than 150 meters), which can be indicated or specified by the first rule, in accordance with the defined cell attribute management criteria. Based at least in part on the results of the comparison, the CAMC can determine whether the distance between the recorded location and the estimated location of the cell satisfies the first defined threshold distance associated with the first rule.

If it is determined that the distance between the recorded location of the cell and the estimated location of the cell (D_RE) satisfies the first defined threshold distance associated with the first rule, the method 2500 can proceed from reference numeral 2510 to reference numeral 2504, wherein the potential (e.g., recorded or estimated) location of the cell can be determined to be, and can be flagged as, good, and the potential location can be tagged as accurate. For instance, if the CAMC determines that the distance between the recorded location of the cell and the estimated location of the cell (D_RE) satisfies the first defined threshold distance associated with the first rule, the CAMC can determine that the potential (e.g., recorded or estimated) location of the cell is good, can flag the potential location of the cell as being good, and can tag the potential location of the cell as accurate. Accordingly, the potential location of the cell can have a validation status of accurate.

Referring again to reference numeral 2510, if, at 2510, it is determined that the distance between the recorded location and the estimated location of the cell (D_RE) does not satisfy (e.g., exceeds) the first defined threshold distance associated with the first rule, at 2512, the potential (e.g., recorded or estimated) location of the cell can be determined to be, and can be flagged as, fine, and the potential location can be tagged as acceptable. If the CAMC determines that the distance between the recorded location and the estimated location of the cell does not satisfy the first defined threshold distance, the CAMC can determine that the potential (e.g., recorded or estimated) location of the cell is fine, can flag the potential location of the cell as being fine, and can tag the potential location of the cell as acceptable. With regard to multiple potential cell locations being evaluated, if more than one potential cell location is able to be flagged as fine, the CAMC can determine the best (e.g., more accurate) cell location of those potential cell locations, and can flag the best cell location as fine and tag that best cell location as acceptable, wherein the best cell location can be associated with the best data source, which can be the estimator component and its estimated cell location or a data source associated with a recorded data source. Accordingly, the potential location of the cell can have a validation status of acceptable.

Referring again to reference numeral 2508, if, at 2508, it is determined that one or more of the respective distance differences associated with the second portion of the respective communication devices in the second defined percentile do not satisfy the second defined threshold distance associated with the second rule, at 2514, it can be determined that the potential location of the cell is not to be flagged as good or fine and is not to be tagged as accurate or acceptable. If the CAMC determines that one or more of the respective distance differences associated with the second portion of the respective communication devices in the second defined percentile do not satisfy the second defined threshold distance associated with the second rule, the CAMC can determine that the potential location of the cell is not to be labeled or flagged as good or fine and is not to be tagged as accurate or acceptable. When determining whether to flag a potential cell location associated with the cell as fine (after determining that no potential cell location associated with the cell is to be flagged as good), the CAMC can perform such cell location validation with regard to each of the potential cell locations of a cell to determine whether any of the potential cell locations can be flagged as fine. The CAMC also can determine that further analysis is to be performed to facilitate determining whether the potential cell location is to be flagged as bad and tagged as unacceptable, or is to be flagged and tagged as uncertain, based at least in part on another rule (e.g., third rule) of the set of rules.

At 2516, a determination can be made regarding whether the number of communication devices in the second portion of communication devices in the second defined percentile satisfies a defined threshold number of communication devices associated with a third rule of the set of rules. The CAMC can determine the number of communication devices in the second portion of communication devices in the second defined percentile, based at least in part on the analysis results. Further, based at least in part on the analysis results, the CAMC can determine whether the number of communication devices in the second portion of communication devices in the second defined percentile satisfies (e.g., meets or exceeds) the defined threshold number (e.g., 30 or other desired number less than or greater than 30) of communication devices associated with the third rule. The defined threshold number can be indicated or specified by the defined cell attribute management criteria.

In response to determining that the number of communication devices in the second portion of communication devices in the second defined percentile satisfies the defined threshold number associated with the third rule, at 2518, the potential (e.g., recorded or estimated) location of the cell can be determined to be bad, and the potential location can be flagged and tagged as bad. If the CAMC determines that the respective distance differences associated with the second portion of the respective communication devices in the second defined percentile satisfy the second defined threshold distance associated with the second rule, the CAMC can determine that the potential (e.g., recorded or estimated) location of the cell is bad or unacceptable, can flag and tag the potential location of the cell as being bad or unacceptable. Accordingly, the potential location of the cell can have a validation status of bad or unacceptable.

Referring again to reference numeral 2516, if, at 2516, it is determined that the number of communication devices in the second portion of communication devices in the second defined percentile does not satisfy the defined threshold number associated with the third rule, at 2520, it can be determined that the potential location of the cell is to be flagged and tagged as uncertain. If the CAMC determines that the number of communication devices in the second portion of communication devices in the second defined percentile does not satisfy (e.g., is not greater than or equal to) the defined threshold number associated with the third rule, the CAMC can determine that the potential location of the cell is to be flagged and tagged as uncertain. Accordingly, the potential location of the cell can have a validation status of uncertain.

Figure 26:
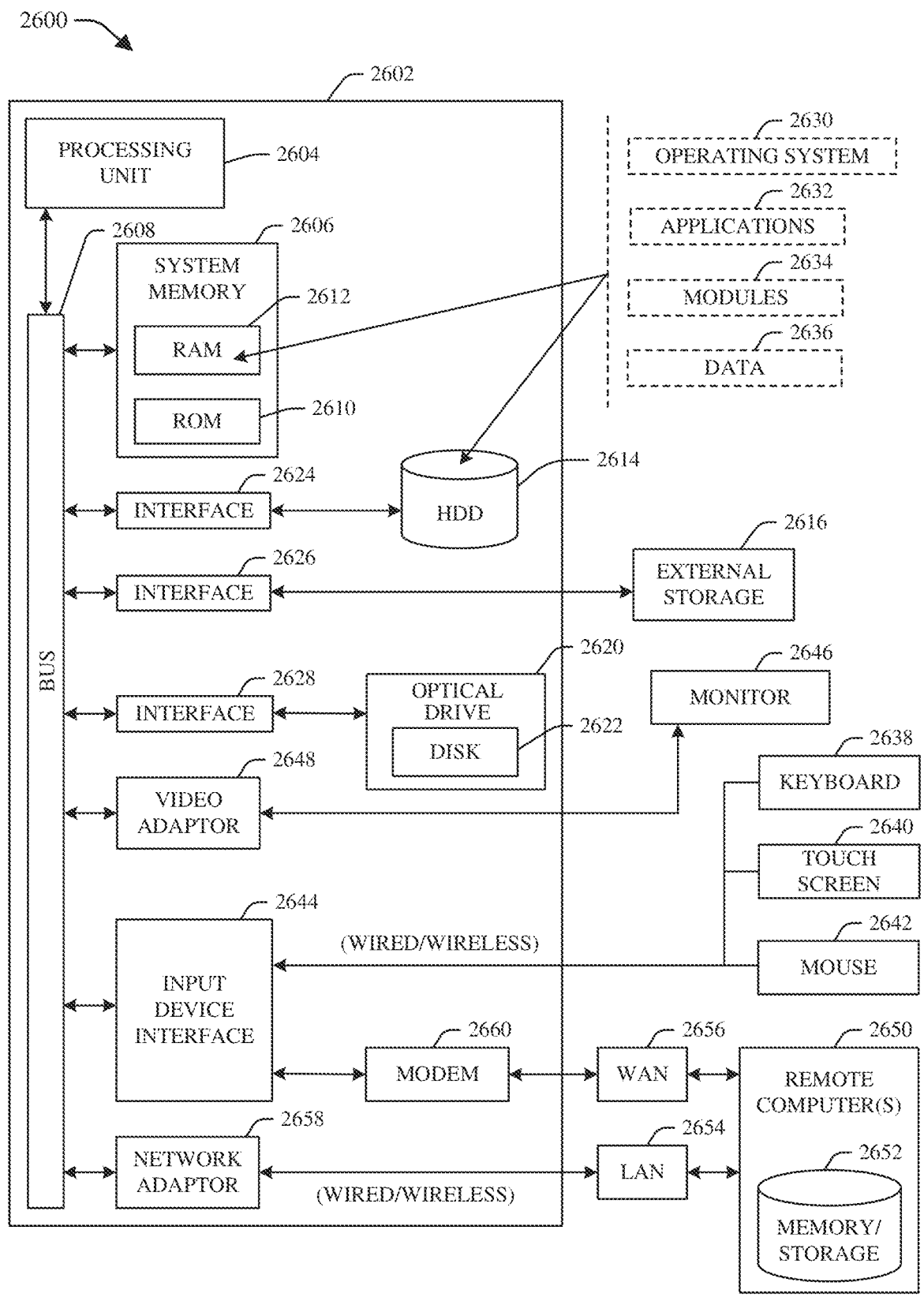
FIG. 26 is a schematic block diagram illustrating a suitable computing environment in which the various embodiments of the embodiments described herein can be implemented.

In order to provide additional context for various embodiments described herein, FIG. 26 and the following discussion are intended to provide a brief, general description of a suitable computing environment 2600 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, or other entities (e.g., computer or machine related entities), that can perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 26, the example environment 2600 for implementing various embodiments of the aspects described herein includes a computer 2602, the computer 2602 including a processing unit 2604, a system memory 2606 and a system bus 2608. The system bus 2608 couples system components including, but not limited to, the system memory 2606 to the processing unit 2604. The processing unit 2604 can be any of various commercially available processors. Dual microprocessors and other multi-processor architectures can also be employed as the processing unit 2604.

The system bus 2608 can be any of several types of bus structure that can further interconnect to a memory bus (with or without a memory controller), a peripheral bus, and a local bus using any of a variety of commercially available bus architectures. The system memory 2606 includes ROM 2610 and RAM 2612. A basic input/output system (BIOS) can be stored in a non-volatile memory such as ROM, erasable programmable read only memory (EPROM), EEPROM, which BIOS contains the basic routines that help to transfer information between elements within the computer 2602, such as during startup. The RAM 2612 can also include a high-speed RAM such as static RAM for caching data.

The computer 2602 further includes an internal hard disk drive (HDD) 2614 (e.g., EIDE, SATA), one or more external storage devices 2616 (e.g., a magnetic floppy disk drive (FDD) 2616, a memory stick or flash drive reader, a memory card reader, or other storage device) and an optical disk drive 2620 (e.g., which can read or write from a CD-ROM disc, a DVD, a BD, or other optical disk drive). While the internal HDD 2614 is illustrated as located within the computer 2602, the internal HDD 2614 can also be configured for external use in a suitable chassis (not shown). Additionally, while not shown in environment 2600, a solid state drive (SSD) could be used in addition to, or in place of, an HDD 2614. The HDD 2614, external storage device(s) 2616 and optical disk drive 2620 can be connected to the system bus 2608 by an HDD interface 2624, an external storage interface 2626 and an optical drive interface 2628, respectively. The interface 2624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2612, including an operating system 2630, one or more application programs 2632, other program modules 2634 and program data 2636. All or portions of the operating system, applications, modules, and/or data can also be cached in the RAM 2612. The systems and methods described herein can be implemented utilizing various commercially available operating systems or combinations of operating systems.

Computer 2602 can optionally comprise emulation technologies. For example, a hypervisor (not shown) or other intermediary can emulate a hardware environment for operating system 2630, and the emulated hardware can optionally be different from the hardware illustrated in FIG. 26. In such an embodiment, operating system 2630 can comprise one virtual machine (VM) of multiple VMs hosted at computer 2602. Furthermore, operating system 2630 can provide runtime environments, such as the Java runtime environment or the .NET framework, for applications 2632. Runtime environments are consistent execution environments that allow applications 2632 to run on any operating system that includes the runtime environment. Similarly, operating system 2630 can support containers, and applications 2632 can be in the form of containers, which are lightweight, standalone, executable packages of software that include, e.g., code, runtime, system tools, system libraries and settings for an application.

Further, computer 2602 can be enable with a security module, such as a trusted processing module (TPM). For instance with a TPM, boot components hash next in time boot components, and wait for a match of results to secured values, before loading a next boot component. This process can take place at any layer in the code execution stack of computer 2602, e.g., applied at the application execution level or at the operating system (OS) kernel level, thereby enabling security at any level of code execution.

A user can enter commands and information into the computer 2602 through one or more wired/wireless input devices, e.g., a keyboard 2638, a touch screen 2640, and a pointing device, such as a mouse 2642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2604 through an input device interface 2644 that can be coupled to the system bus 2608, but can be connected by other interfaces, such as a parallel port, an IEEE 1394 serial port, a game port, a USB port, an IR interface, a BLUETOOTH™ interface, or other type of interface.

A monitor 2646 or other type of display device can be also connected to the system bus 2608 via an interface, such as a video adapter 2648. In addition to the monitor 2646, a computer typically includes other peripheral output devices (not shown), such as speakers, printers, or other peripheral output device.

The computer 2602 can operate in a networked environment using logical connections via wired and/or wireless communications to one or more remote computers, such as a remote computer(s) 2650. The remote computer(s) 2650 can be a workstation, a server computer, a router, a personal computer, portable computer, microprocessor-based entertainment appliance, a peer device or other common network node, and typically includes many or all of the elements described relative to the computer 2602, although, for purposes of brevity, only a memory/storage device 2652 is illustrated. The logical connections depicted include wired/wireless connectivity to a local area network (LAN) 2654 and/or larger networks, e.g., a wide area network (WAN) 2656. Such LAN and WAN networking environments are commonplace in offices and companies, and facilitate enterprise-wide computer networks, such as intranets, all of which can connect to a global communications network, e.g., the Internet.

When used in a LAN networking environment, the computer 2602 can be connected to the local network 2654 through a wired and/or wireless communication network interface or adapter 2658. The adapter 2658 can facilitate wired or wireless communication to the LAN 2654, which can also include a wireless access point (AP) disposed thereon for communicating with the adapter 2658 in a wireless mode.

When used in a WAN networking environment, the computer 2602 can include a modem 2660 or can be connected to a communications server on the WAN 2656 via other means for establishing communications over the WAN 2656, such as by way of the Internet. The modem 2660, which can be internal or external and a wired or wireless device, can be connected to the system bus 2608 via the input device interface 2644. In a networked environment, program modules depicted relative to the computer 2602 or portions thereof, can be stored in the remote memory/storage device 2652. It will be appreciated that the network connections shown are example and other means of establishing a communications link between the computers can be used.

When used in either a LAN or WAN networking environment, the computer 2602 can access cloud storage systems or other network-based storage systems in addition to, or in place of, external storage devices 2616 as described above. Generally, a connection between the computer 2602 and a cloud storage system can be established over a LAN 2654 or WAN 2656, e.g., by the adapter 2658 or modem 2660, respectively. Upon connecting the computer 2602 to an associated cloud storage system, the external storage interface 2626 can, with the aid of the adapter 2658 and/or modem 2660, manage storage provided by the cloud storage system as it would other types of external storage. For instance, the external storage interface 2626 can be configured to provide access to cloud storage sources as if those sources were physically connected to the computer 2602.

The computer 2602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other type of equipment), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other version of IEEE 802.11) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other mobile or non-mobile network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, base station, cell, RAN, communication network, cell attribute management component (CAMC), estimator component, validator component, machine learning component, processor component, data store, or other component or device), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   estimating, by a system comprising a processor, an azimuth of a cell associated with a base station based on a first analysis of validated location data associated with a validated cell location of the cell and respective location data associated with respective locations of respective devices of a group of devices associated with the cell, wherein the azimuth is an estimated azimuth;
   determining, by the system, whether a recorded azimuth of the cell is validated based on a second analysis of estimation data representative of the estimated azimuth of the cell and recorded data representative of the recorded azimuth of the cell, wherein the recorded azimuth of the cell that is validated is usable to facilitate enhancing accuracy of determining device locations;
   receiving, by the system, a request from a dispatch system for location information for a mobile device; and
   responsive to determining that the mobile device is communicatively coupled to the cell associated with the base station:
      determining, by the system, the location information for the mobile device according to the recorded azimuth of the cell that is validated; and
      transmitting, by the system, the location information for the mobile device to the dispatch system.

2. The method of claim 1, further comprising:
   based on the first analysis of the validated location data associated with the validated cell location of the cell and the respective location data associated with the respective locations of the respective devices of the group of devices, determining, by the system, a first subgroup of the group of devices within a first distance of the cell, a second subgroup of the group of devices located more than a second distance away from the cell, and a third subgroup of the group of devices located more than the first distance away from the cell and within the second distance of the cell, wherein the respective location data comprises first location data associated with the first subgroup of devices, second location data associated with the second subgroup of devices, and third location data associated with the third subgroup of devices; and
   filtering, by the system, out the first location data and the second location data from the respective location data.

3. The method of claim 2, further comprising:
   based on the first analysis of the validated location data associated with the validated cell location of the cell and the third location data associated with the respective locations of the respective devices of the third subgroup of devices associated with the cell, determining, by the system, respective cell-to-device azimuths associated with the respective devices of the third subgroup of devices;
   determining, by the system, a first percentile of the respective cell-to-device azimuths associated with the respective devices of the third subgroup of devices;
   determining, by the system, a second percentile of the respective cell-to-device azimuths associated with the respective devices of the third subgroup of devices; and
   determining, by the system, the estimated azimuth of the cell based on the first percentile of the respective cell-to-device azimuths and the second percentile of the respective cell-to-device azimuths.

4. The method of claim 3, wherein the determining of the estimated azimuth of the cell based on the first percentile of the respective cell-to-device azimuths and the second percentile of the respective cell-to-device azimuths comprises determining the estimated azimuth of the cell as being equal to half of a sum of the first percentile of the respective cell-to-device azimuths plus the second percentile of the respective cell-to-device azimuths, wherein the first percentile is in a first range extending from a fifth percentile to a twentieth percentile, and wherein the second percentile is in a second range extending from an eightieth percentile to a ninety-fifth percentile.

5. The method of claim 3, further comprising:
   determining, by the system, an azimuth difference between the estimated azimuth and the recorded azimuth based on the second analysis of the estimation data and the recorded data, wherein the recorded data representative of the recorded azimuth of the cell is received from a data source device; and
   determining, by the system, whether the azimuth difference is less than or equal to a defined threshold azimuth difference.

6. The method of claim 5, further comprising:
   as part of the second analysis, comparing, by the system, the recorded azimuth of the cell to the first percentile of the respective cell-to-device azimuths associated with the respective devices of the third subgroup of devices and the second percentile of the respective cell-to-device azimuths associated with the respective devices of the third subgroup of devices; and based on the comparing, determining, by the system, whether the recorded azimuth of the cell is located between the first percentile of the respective cell-to-device azimuths and the second percentile of the respective cell-to-device azimuths.

7. The method of claim 6, further comprising:

in response to determining that the azimuth difference is less than or equal to the defined threshold azimuth difference or in response to determining that the recorded azimuth of the cell is located between the first percentile of the respective cell-to-device azimuths and the second percentile of the respective cell-to-device azimuths:
- determining, by the system, that the recorded azimuth is validated,
- generating, by the system, validated tag data that indicates that the recorded azimuth of the cell is validated, and
- storing, by the system, the validated tag data associated with the recorded azimuth of the cell in a cell location and azimuth pool database; or in response to determining that the azimuth difference is greater than the defined threshold azimuth difference and determining that the recorded azimuth of the cell is not located between the first percentile of the respective cell-to-device azimuths and the second percentile of the respective cell-to-device azimuths:
- determining, by the system, that the recorded azimuth is invalid as inaccurate,
- generating, by the system, invalid tag data that indicates that the recorded azimuth of the cell is invalid and inaccurate, and
- storing, by the system, the invalid tag data associated with the recorded azimuth of the cell in the cell location and azimuth pool database.

8. The method of claim 1, further comprising:

in response to determining that the recorded azimuth of the cell is invalid based on the second analysis, generating, by the system, manual investigation data representative of a manual investigation of the cell to be initiated to facilitate determining a validated azimuth of the cell.

9. The method of claim 1, further comprising:

determining, by the system, that the cell is an omni cell based on the first analysis indicating that the respective locations of the respective devices substantially surround the cell;

in response to determining that the cell is the omni cell, generating, by the system, omni tag data that indicates the cell is the omni cell; and storing, by the system, the omni tag data associated with the omni cell in a cell location and azimuth pool data store.

10. The method of claim 1, further comprising:

analyzing, by the system, respective timing advance measurement data associated with the respective devices of the group of devices and the respective location data associated with the respective devices; and estimating, by the system, a first location of the base station, based on a result of the analyzing of the respective timing advance measurement data and the respective location data, to facilitate estimating a second location of the cell associated with the base station.

11. The method of claim 10, wherein a recorded location of the cell is received from a data source device, and wherein the method further comprises:

determining, by the system, the second location of the cell or the recorded location of the cell is the validated cell location of the cell based on the second location of the cell, the recorded location of the cell, or the respective timing advance measurement data associated with the respective devices, and based on a group of defined threshold location-related accuracy values that indicate which cell location of the cell is the validated cell location of the cell.

12. A system, comprising:

a processor; and a memory that stores executable instructions that, when executed by the processor, facilitate performance of operations, comprising:
- determining an estimated azimuth value of a cell associated with network equipment based on a first analysis of verified location information associated with a verified cell location of the cell and respective location information associated with respective locations of respective user equipment of a group of user equipment associated with the cell;
- determining whether a recorded azimuth value of the cell is verified as accurate based on a second analysis of estimation information of the estimated azimuth value of the cell and recorded information of the recorded azimuth value of the cell, wherein the recorded azimuth value of the cell that is verified is usable to facilitate increasing accuracy of determining user equipment locations in connection with emergency assistance communications to lessen response time associated with the emergency assistance communications;
- receiving a request from a dispatch system for location information for a mobile device; and
- responsive to determining that the mobile device is communicatively coupled to the cell associated with the network equipment:
  - determining the location information for the mobile device according to the recorded azimuth of the cell that is validated; and
  - transmitting the location information for the mobile device to the dispatch system.

13. The system of claim 12, wherein the operations further comprise:

based on the first analysis of the verified location information associated with the verified cell location of the cell and the respective location information associated with the respective locations of the respective user equipment of the group of user equipment, determining a first subgroup of the group of user equipment within a first distance of the cell, a second subgroup of the group of user equipment located further than a second distance away from the cell, and a third subgroup of the group of user equipment located further than the first distance away from the cell and within the second distance of the cell, wherein the respective location information comprises first location information associated with the first subgroup of user equipment, second location information associated with the second subgroup of user equipment, and third location information associated with the third subgroup of user equipment; and filtering the respective location information to remove the first location information and the second location information from the respective location information to generate the third location information associated with the third subgroup of user equipment.

14. The system of claim 12, wherein the operations further comprise:
based on the first analysis of the verified location information associated with the verified cell location of the cell and the third location information associated with the respective locations of the respective user equipment of the third subgroup of user equipment associated with the cell, determining respective cell-to-user equipment azimuth values associated with the respective user equipment of the third subgroup of user equipment;
determining a first percentile of the respective cell-to-user equipment azimuth values associated with the respective user equipment of the third subgroup of user equipment;
determining a second percentile of the respective cell-to-user equipment azimuth values associated with the respective user equipment of the third subgroup of user equipment; and
determining the estimated azimuth value of the cell as a function of the first percentile of the respective cell-to-user equipment azimuth values and the second percentile of the respective cell-to-user equipment azimuth values.

15. The system of claim 14, wherein the operations further comprise:
determining an azimuth value difference between the estimated azimuth value and the recorded azimuth value based on the second analysis of the estimation information and the recorded information; and
determining whether the azimuth value difference satisfies a defined threshold azimuth value difference.

16. The system of claim 15, wherein the operations further comprise:
as part of the second analysis, comparing the recorded azimuth value of the cell to the first percentile of the respective cell-to-user equipment azimuth values associated with the respective user equipment of the third subgroup of user equipment and the second percentile of the respective cell-to-user equipment azimuth values associated with the respective user equipment of the third subgroup of user equipment; and
based on the comparing, determining whether the recorded azimuth value of the cell is located between the first percentile of the respective cell-to-user equipment azimuth values and the second percentile of the respective cell-to-user equipment azimuth values.

17. The system of claim 16, wherein the operations further comprise:
in response to determining that the azimuth value difference satisfies the defined threshold azimuth value difference or in response to determining that the recorded azimuth value of the cell is located between the first percentile of the respective cell-to-user equipment azimuth values and the second percentile of the respective cell-to-user equipment azimuth values:
determining that the recorded azimuth value is verified as accurate,
generating verified tag information that indicates that the recorded azimuth value of the cell is verified as accurate, and
storing the verified tag information associated with the recorded azimuth value of the cell in a cell location and azimuth pool database; or in response to determining that the azimuth value difference does not satisfy the defined threshold azimuth value difference and determining that the recorded azimuth value of the cell is not located between the first percentile of the respective cell-to-user equipment azimuth values and the second percentile of the respective cell-to-user equipment azimuth values:
determining that the recorded azimuth value is inaccurate,
generating inaccurate azimuth value tag information that indicates that the recorded azimuth value of the cell is inaccurate, and
storing the inaccurate azimuth value tag information associated with the recorded azimuth value of the cell in the cell location and azimuth pool database.

18. The system of claim 12, wherein the operations further comprise:
determining that the cell is an omni cell based on the first analysis indicating that the respective locations of the respective user equipment substantially surround the cell;
in response to determining that the cell is an omni cell, generating omni tag information that indicates the cell is an omni cell; and
storing the omni tag information associated with the omni cell in a cell location and azimuth pool database.

19. A non-transitory machine-readable medium, comprising executable instructions that, when executed by a processor, facilitate performance of operations, comprising:
determining an estimated angular distance value of a cell associated with network equipment based on a first evaluation of validated location data representative of a validated cell location of the cell and respective location data representative of respective locations of respective devices of a group of devices associated with the cell;
determining whether a recorded angular distance value of the cell is validated as accurate based on a second evaluation of estimation data representative of the estimated angular distance value of the cell and recorded data representative of the recorded angular distance value of the cell;
receiving a request from a dispatch system for location information for a mobile device; and
responsive to determining that the mobile device is communicatively coupled to the cell associated with the base station:
determining the location information for the mobile device according to the recorded azimuth of the cell that is validated; and
transmitting the location information for the mobile device to the dispatch system.

20. The non-transitory machine-readable medium of claim 19, wherein the operations further comprise:
analyzing respective timing advance measurement data associated with the respective devices of the group of devices and the respective location data associated with the respective devices; and
estimating a first location of the network equipment, based on a result of the analyzing of the respective timing advance measurement data and the respective location data, to facilitate estimating a second location of the cell associated with the network equipment; and
determining that the second location of the cell or the recorded location of the cell is the validated cell location of the cell based on the second location of the cell, the recorded location of the cell, or the respective timing advance measurement data associated with the respective devices, and based on a group of defined threshold location-related accuracy values that relate to accuracy of cell locations of cells.

* * * * *